United States Patent [19]

Copperman

[11] Patent Number: 5,660,547
[45] Date of Patent: Aug. 26, 1997

[54] SCENARIO DEVELOPMENT SYSTEM FOR VEHICLE SIMULATORS

[75] Inventor: Norman S. Copperman, Palo Alto, Calif.

[73] Assignee: Atari Games Corporation, Milpitas, Calif.

[21] Appl. No.: 189,119

[22] Filed: Jan. 26, 1994

Related U.S. Application Data

[63] Continuation-in-part of Ser. No. 18,951, Feb. 17, 1993, abandoned.

[51] Int. Cl.[6] .................................................. G09B 9/04
[52] U.S. Cl. ........................ 434/29; 434/62; 434/63; 434/64; 364/410
[58] Field of Search ........................ 434/29, 62, 61, 434/69, 63, 65, 71; 364/410, 411

[56] References Cited

U.S. PATENT DOCUMENTS

| | | |
|---|---|---|
| 4,182,053 | 1/1980 | Allen et al. . |
| 4,384,338 | 5/1983 | Bennett . |
| 4,714,428 | 12/1987 | Bunker et al. . |
| 4,750,888 | 6/1988 | Allard et al. . |
| 4,811,245 | 3/1989 | Bunker et al. . |
| 4,852,152 | 7/1989 | Briggs et al. . |
| 4,952,152 | 8/1990 | Briggs et al. ............... 434/69 |
| 4,985,854 | 1/1991 | Wittenburg . |
| 5,005,147 | 4/1991 | Behensky et al. . |
| 5,005,148 | 4/1991 | Behensky et al. . |
| 5,021,772 | 6/1991 | King et al. . |
| 5,184,856 | 2/1993 | Langlais et al. . |
| 5,184,956 | 2/1993 | Langlais et al. ............... 434/69 |
| 5,269,687 | 12/1993 | Clott et al. ............... 434/69 |
| 5,354,202 | 10/1994 | Moncrief et al. . |
| 5,366,376 | 11/1994 | Copperman et al. . |

FOREIGN PATENT DOCUMENTS

| | | |
|---|---|---|
| 0483991 | 10/1991 | European Pat. Off. . |
| 0497327 | 1/1992 | European Pat. Off. . |
| 4221558 | 2/1993 | Germany ............... 434/69 |
| 2256586A | 12/1992 | United Kingdom . |
| 2256568 | 12/1992 | United Kingdom . |
| WO9202917 | 2/1992 | WIPO . |
| 0483991A2 | 5/1992 | WIPO . |
| 0497327A2 | 5/1992 | WIPO . |

OTHER PUBLICATIONS

"Race Drivin'" Operator's Manual, Copyright 1988, 1989, 1990 Altari Games Corporation.

*Primary Examiner*—Richard J. Apley
*Assistant Examiner*—Glenn E. Richman
*Attorney, Agent, or Firm*—Knobbe, Martens, Olson & Bear

[57] ABSTRACT

A vehicle simulator including a system for development of vehicle simulation scenarios. The vehicle simulation system includes simulated vehicle controls providing input signals to a computer, and feedback devices, including a video display, providing a user with feedback on the operation and location of the simulated vehicle as it is driven through a simulated universe. One aspect of the invention is a scenario development system which uses the vehicle controls, the computer and the output devices to enable a scenario developer to develop a simulation scenario which includes other programmed vehicles. The scenario developer can determine when and where the other programmed vehicles become active in a simulated universe in which the scenario takes place, as well as determine when and where the programmed vehicles leave the simulated universe. The scenario developer can also program the path of the programmed vehicles through the simulated universe by simply driving the programmed vehicles through the simulated universe using the vehicle controls and the feedback devices to define the path that the scenario developer wishes the programmed vehicle to travel.

39 Claims, 22 Drawing Sheets

Microfiche Appendix Included
(2 Microfiche, 65 Pages)

"SCENARIO_TIMER"

329
PROGRAM MENU 330

SCENARIO PATH TIME USED: 00:00:00 324

SCENARIO PATH TIME AVAILABLE: 2:12:27 326

NUMBER OF PATH: 0 330

| | |
|---|---|
| NEXT PATH ID # | 340a |
| ADD VEHICLE | 340b |
| SET STARTUP POSITION | 340c |
| SET PRIMARY LINKED STATION | 340d |
| SCENARIO START TIME: 00:00 | 340e |
| TIME PATH | 340f |
| TRAFFIC LIGHTS: PROGRAMMED | 340g |
| DELETE ALL PATHS | 340h |

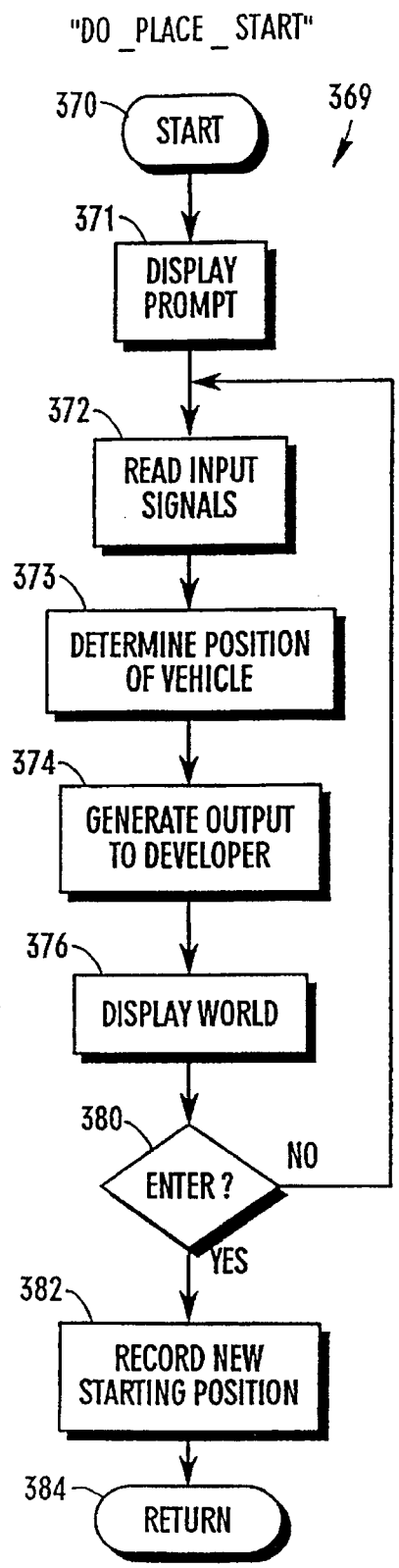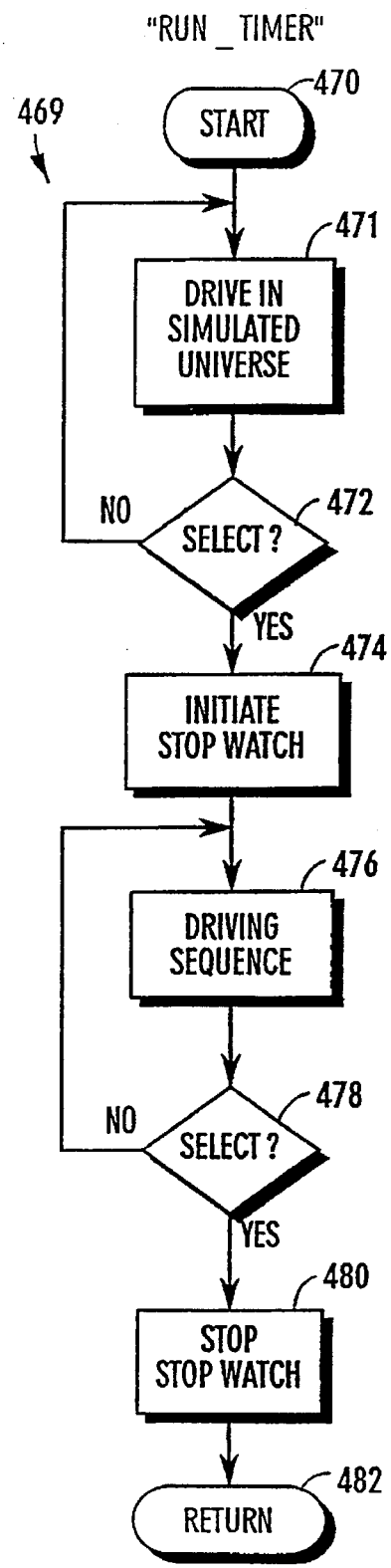
Fig. 12
Fig. 13

700 ← ↗ 702

TRAFFIC CONTROL MENU

| | |
|---|---|
| REPLAY TRAFFIC CONTROL | —704a |
| TRAFFIC CONTROL ENTRY #: 01 | —704b |
| TRAFFIC CONTROL TIME: 00:00 | —704c |
| TRAFFIC CONTROL DISTANCE: 00000 | —704d |
| SCENARIO START TIME: 00:00 | —704e |
| REPLAY VIEW: DRIVER'S EYE/SUSPECT OVERHEAD | —704f |
| DELETE CONTROL ENTRIES | —704g |

*FIG. 20*

SCENARIO DEVELOPMENT SYSTEM FOR VEHICLE SIMULATORS

RELATED APPLICATIONS

The present application is a continuation-in-part of application, U.S. Ser. No. 08/018,951 filed Feb. 17, 1993, now abandoned, entitled "SCENARIO DEVELOPMENT SYSTEM FOR VEHICLE SIMULATORS".

MICROFICHE APPENDIX

A microfiche appendix containing computer source code is attached. The microfiche appendix comprises two sheets of microfiche with a total of 65 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention generally relates to vehicle simulators and, more particularly, is concerned with a scenario development system for a vehicle simulator.

2. Background of the Invention

A vehicle simulator can be defined as a system that simulates the operating conditions of a vehicle in an environment. Typically, the simulator will include all of the controls that the vehicle being simulated would have and the simulator will try to simulate the operation of the vehicle as it would operate in the real world. For example, if the vehicle being simulated was an automobile, the simulator would typically include controls such as a steering wheel, a gear shift, brakes, and an accelerator, and the automobile would be simulated in an environment which usually includes a road.

Vehicle simulators provide the means to efficiently train operators of the vehicle without exposing the operator to the dangers associated with operating the vehicle in the real world. The simulator permits the operator to experience how the vehicle will operate in a given situation including those situations where the vehicle would otherwise be damaged like, for example, when the operator makes a mistake in his handling of the vehicle. The experience garnered though making mistakes on a simulator is invaluable when compared to the inherent risks of vehicle damage and operator injury associated with making a driving error in a real-life situation. As an example, in a police training application, a student can learn the limits of a police cruiser or guidelines for pursuing another vehicle, and be tested in these areas without any of the associated risks of real life training.

Nowadays, vehicle simulators are often implemented by using computers and computer driven video displays. Typically, these vehicle simulators include the standard vehicle controls and instruments for a specific vehicle, as well as a video display which represents to the user the world outside of the vehicle he is operating. In these types of simulators, the computer generates a scenario which requires the user to maneuver the vehicle within a simulated universe. Within this simulated universe, the computer also generates specific events such as random traffic patterns, oncoming traffic, cars pulling away from curves, etc., to thereby give the user the feeling of operating the vehicle in traffic and also to test the user's ability to respond appropriately to the computer generated events.

A major shortcoming of these simulators is that the number of scenarios and events contained within the simulator is limited. As a consequence, the user of simulator eventually repeatedly experience all of the events programmed in the simulator. Once a student has seen the same scenario or event a repeated number of times, the educational value of continued simulator operation is diminished.

An additional problem with presently known computer based simulators is that generally all of the scenarios and events are developed and incorporated into the simulator in software form prior to use of the simulator. Often, the person developing the scenario is not a person who would be most knowledgeable about what types of scenarios and events should be included in the vehicle simulator to maximize its educational benefit. For example, a computer programmer may have some idea as to what scenarios and events should be included in an automobile simulator that is intended to train police officers to pursue other vehicles. However, the programmer is certainly not as knowledgeable about the types of events that are likely to occur during such a pursuit as is an experienced police officer. The educational benefit derived from vehicle simulators will only be completely realized if the scenarios and events are as realistic as possible in that they closely approximate what the driver actually experiences in the real world. Accordingly, scenarios and events developed by individuals with no expertise in instruction of actual vehicle operation will likely not be as valuable as such scenarios and events developed by experienced instructors.

Generally, the instructor who provides guidance for the student users of vehicle simulators is very knowledgeable about the scenarios and events that the student is likely to encounter in the real world. For example, the operation of a simulator designed to train police officers to correctly operate vehicles in a city environment will include instruction by an experienced police officer. While this training officer may be knowledgeable about what occurs in the real world, he is generally unable to reprogram the simulator to be more realistic as the computer programs which drive vehicle simulators are usually extremely complex, hence, changing the programming for the simulation to make it more realistic or even adding additional events or scenarios to the simulator is usually beyond the ability of most training officers.

Hence, there is a need for a vehicle simulator in which the set of scenarios and events can be continuously and easily modified. Additionally, there is a need for a simulator that permits a person, who is not an expert in computer programming, to develop additional scenarios and events to occur during the simulation.

SUMMARY OF THE INVENTION

To meet the aforementioned needs, the present invention includes a system and method for creating simulation scenarios in a vehicle simulation system that is easily programmed by an instructor or a user who need not be experienced at computer programming. Generally, the system can be implemented in any vehicle simulator requiring a specific simulation scenario involving other vehicles. The developer or programmer of the scenario can use the vehicle controls and the simulator display to define the characteristics and movements of a number of programmed vehicles, as well as other fixed objects, in the simulated universe.

Specifically, the system of the present invention permits a scenario developer to sit at the controls of the simulator, select a desired type of vehicle to appear in a simulation scenario, view a simulated universe, and program characteristic such as the speed and path of the vehicle in the simulated universe by manipulating the controls of the simulator. Thus, the developer "drives" the programmed vehicle through the simulated universe in the manner in which the developer wants the vehicle to operate in the scenario he is creating. In this fashion, the developer of the simulation scenario can program a specific event, e.g. a car going through an intersection, by simply driving a car through the intersection in the simulation universe. The developer can program various separate events including different vehicles in this same fashion to thereby develop an entire scenario having multiple traffic events.

Similarly, the system of the present invention permits a scenario developer to position objects, e.g., stop signs and direction signs in the simulated universe for an automobile driving simulation, by selecting the object from a menu and using the simulator controls to move through the simulated universe to the position that the developer wishes the object to appear. In this fashion, the developer of a simulation can easily position objects in the simulated universe along the anticipated path of a subsequent user of the simulation system.

In one specific aspect of the present invention, the simulation system for training drivers to operate automobiles in traffic is programmed such that the movements of other vehicles, the positioning of objects, and the status of traffic lights in the simulated universe are defined by a scenario developer using the simulator controls. To program a vehicle to appear in a scenario for a student, the developer selects a type of automobile from a menu of automobile types, uses the simulator controls to drive the automobile to a position in the simulated universe, initiates a recording process, and drives the automobile along a path in the simulated universe in the manner the developer wishes the vehicle to appear when the simulation is running. This recording can be played back during simulation. Similarly, as mentioned above, the developer can also select an object, such as a road sign, from a menu, use the simulator controls to drive to the position in the simulated universe where the developer wants the object to appear, and initiates a process to record the presence of the object at that position for a specified period of time when the simulation is being used by a user or student.

In another aspect of the simulation system of the present invention, vehicles and objects programmed to appear in the simulated universe by the scenario developer are programmed to appear at a specific time on a scenario clock. The time on the scenario clock that the vehicle and objects appear in the simulated universe can be selected by the scenario developer so that the objects or vehicles appear in the simulated universe in close proximity to the vehicle being operated by a user or student when the simulation is being run. For example, in an automobile simulation, automobiles can be programmed to drive through intersections in front of the vehicle being operated by the student or other automobiles can be programmed to pull out from curbs.

Further, with the simulation system of the present invention, several different types of simulations can be developed. For example, the developer can develop one type of simulation where the student follows a pursued or rabbit vehicle through the simulated universe. In this type of simulation, the scenario clock can be programmed to increment in a variable fashion, depending upon the distance between the user's vehicle and the rabbit vehicle. Specifically, as the user's vehicle gets closer to the rabbit vehicle, the scenario clock increments at a faster rate. This causes the rabbit vehicle and all the other vehicles previously programmed to appear in the simulation to move faster. Conversely, as the user's vehicle falls further behind the rabbit vehicle, the scenario clock increments at a slower rate, causing the rabbit vehicle and all the other preprogrammed vehicles to move slower. Hence, the scenario clock increments at a time selected to maintain a pre-selected relative distance between the rabbit vehicle and the vehicle driven by the user. The developer knows that when the scenario is played for a student, the student driving an observer vehicle following the rabbit vehicle will always be a pre-selected relative distance behind the rabbit vehicle. Hence, when the developer is programming vehicles to appear in the simulation, the developer knows the approximate position the student will be in when the scenario is being played. Consequently, the developer can, for example, program a vehicle to drive directly at the position the pre-selected relative distance behind the rabbit vehicle. When the scenario is replayed for the student, the vehicle will appear to the student to drive directly towards the student, regardless of how fast the student drove the observer vehicle in the scenario.

In another aspect of the simulation system of the present invention, the developer can develop a simulation where the user or student will drive through the simulated universe following road signs or other directions. The developer, when developing the simulation can drive a phantom vehicle along the path which the developer intends the student to follow. When the simulation is run and the student maneuvers through the simulated universe on the intended path, the phantom vehicle driven by the developer during the development of the simulation is not shown. However, the scenario time clock, which determines when other programmed vehicles enter and leave the simulated universe, can be programmed to variably increment depending upon the distance between the vehicle driven by the student and the position of the phantom vehicle as driven by the developer during the development of the scenario. In other words, the scenario clock can be configured so that no matter how fast the user drives his vehicle, the scenario clock changes variably so that the user's vehicle is at substantially the same geographical position as the phantom vehicle at any given time shown on the scenario clock. Consequently, the developer can program other vehicles to appear or events to occur in the simulated universe in places which necessitate action, such as evasive action, by the user during the simulation and these events will occur at the appropriate time, forcing the user or student to take the necessary evasive action, regardless of how fast the student drives the vehicle during the simulation.

Furthermore, in another aspect of the present invention, the developer can also control the variable incrementing of the scenario clock using the scenario development system of the present invention. Specifically, while developing the scenario using the phantom vehicle, the developer can set a radial distance around the phantom vehicle that defines an area in which the scenario clock will increment at a default rate if the user is within this radius with his vehicle while the scenario is running. Using this feature, the developer of a simulation can selectively cause the scenario clock to speed up and slow down depending upon how close the user is to the phantom vehicle.

Additionally, in yet another aspect of the present invention, the scenario simulation system simulates operating an automobile through a city or suburban setting. The developer of the simulation can program traffic lights located at different intersections in the simulated universe to change states, e.g., change from red to green and vice-versa, at different times on the scenario clock by manipulating the simulated controls of the simulated vehicle and driving the simulated vehicle through the simulated universe to a position where the developer wishes to change the state of the lights. The developer then depresses an appropriate button to record the time on the scenario clock that the light state is supposed to change. In this fashion, the developer can easily program a scenario where the traffic lights change at different times on the scenario clock.

These and other object and aspects of the present invention will become more fully apparent from the following description and appended claims taken in conjunction with the accompanying drawings.

BRIEF DESCRIPTION OF THE DRAWINGS

FIG. 12 is a flow diagram of a preferred embodiment of the "do-place-start" function of FIG. 8, for setting the user's starting position in a simulation scenario under development using the vehicle simulation system of the present invention.

FIG. 13 is a flow diagram of a preferred embodiment of the "run_timer" function of FIG. 8, for timing the distance between two locations within the simulated universe using the vehicle simulation system of the present invention.

FIG. 20 is a diagram of a traffic control menu provided by the vehicle simulation system of the present invention which allows the developer to set a traffic control distance which affects the incrementing of the scenario clock and the relative positions of the programmed vehicles and the student's vehicle in the simulated universe.

DETAILED DESCRIPTION OF THE PREFERRED EMBODIMENTS

Reference is now made to the drawings wherein like numerals refer to like parts throughout. This application is a continuation-in-part of application Ser. No. 08/018,951 filed Feb. 17, 1993, which is hereby incorporated by reference in its entirety.

It should be understood that a driver training or vehicle simulation system 100 as hereinafter described is applicable to any type of vehicle that is operated by a human. The present invention includes simulations which are easily generalized to driver training systems for all kinds of simulated vehicles and all types of vehicle operation.

I. SYSTEM OVERVIEW

Figure 1:
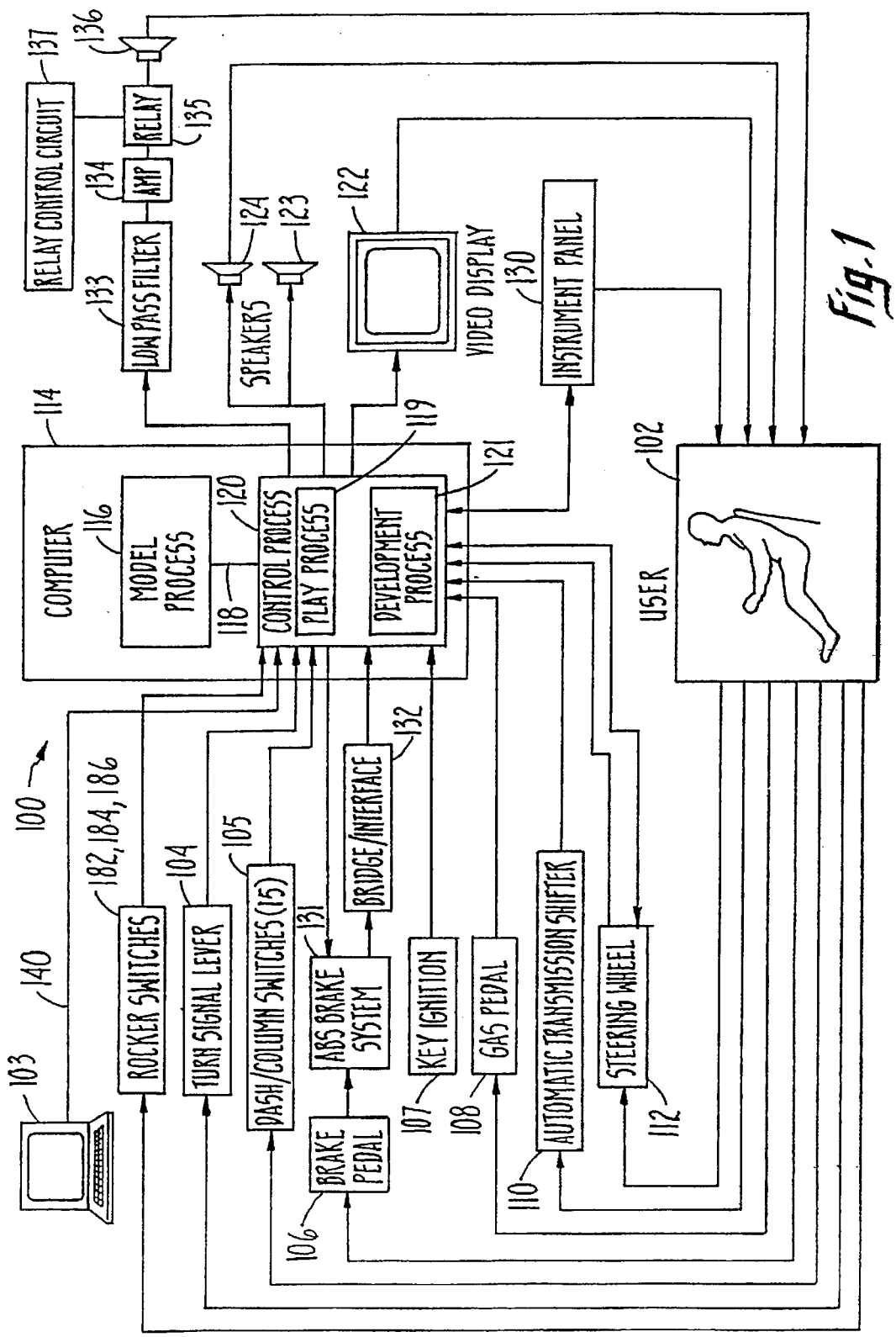
FIG. 1 is a block diagram of one presently preferred embodiment of a vehicle simulation system of the present invention including a scenario development process.

FIG. 1 is a block diagram illustrating one presently preferred embodiment of the driver training or vehicle simulation system 100 of the present invention. The system 100 is preferably operated by a user 102 (shown schematically), such as a student who desires to improve driving performance or a scenario developer who intends to develop a new scenario for the student.

A more specific embodiment of the system 100 as presented in the following figures and description comprises a vehicle simulator for driver training such as training police officers to drive police cars in realistic conditions.

Specifically, the vehicle simulator is used to train students to either drive a pre-selected course and respond to events occurring in the simulated universe or, to pursue vehicles through a simulated universe. At times, the user 102 can be an instructor, the developer of the simulation scenario or a student.

In FIG. 1, the user 102 preferably sits in a booth or housing (not shown) such as the one described in the assignee's U.S. patent entitled "Rear Entry Booth and Adjustable Seat Apparatus for a Sit-Down Arcade Video Game", U.S. Pat. No. 4,960,117 hereby incorporated herein by reference. In that way, distractions are minimized and the user 102 can concentrate on self-improvement of his driving technique.

In the driver training system 100, the user 102 moves a turn signal lever 104, manipulates a plurality of dash and column switches 105, manipulates a key turned ignition switch 107 for stating the simulated automobile, depresses a brake pedal 106 which is part of an ABS brake simulation system 131, manipulates a key ignition 107, and depresses a gas pedal 108 in the customary manner. In addition, an automatic transmission shifter 110 is manipulated by the user 102 to select a reverse gear or one of a plurality of forward gears. A steering wheel 112 is also turned by the user 102 to guide the simulated vehicle in the desired direction of travel through the simulated universe. Further, the user 102 can manipulate three rocker switches 182, 184 and 186 which are shown and described in greater detail in reference to FIG. 3.

The mechanical inputs provided by the user 102 to the input devices 104 through 112 and the switches 182, 184 and 186 are translated by transducers into electrical signals which are fed into a computer 114. The mechanical inputs on the brake pedal 106 are translated into electrical signals by the ABS brake system 131 and the signals are fed to a bridge interface circuit 132 connected to the computer 114. The computer 114 further receives both inputs and downloaded programs from a personal computer (PC) 103 which is preferably an IBM compatible computer having a 100 megabyte hard drive and a 4 megabyte RAM. The personal computer 103 and the computer 114 are interactively connected via a communication link 140. The link 140 should be capable of handling high speed digital data transmissions, on the order of 10 megabits per second, and it preferably uses a communications circuit such as an ADSP 2105 or 2101 manufactured by Analog Devices to ensure sufficiently rapid communication between the computer 114 and the personal computer 103. As can be appreciated by a person skilled in the art, the personal computer 103 can be connected to a network of simulation systems 100 and can provide information and download programs in any number of well known manners.

In the presently preferred embodiment, the computer 114 includes a general purpose microprocessor such as a Motorola 68000 (not shown) or another member of the Motorola 680x0 microprocessor family. One function of the 68000 microprocessor is palette manipulation for video display purposes. In addition to the 68000 microprocessor, the computer 114 preferably includes a model processor (DSP), such as an AT&T DSP32C, a digital signal processor (ADSP), such as an Analog Devices ADSP-2101, and a graphics processor (GSP) such as a Texas Instruments 34010 Graphic System Processor, none of which are shown. The DSP performs velocity, acceleration, and position calculations. The ADSP provides the "higher-level" functions of video display such as translation, rotation, scaling, and shading while the GSP efficiently performs dither patterning, rendering, and the low-level graphics work of writing polygons (so-called polygon graphics) to the video display 122.

The presently preferred computer 114 also includes a read only memory (ROM) comprising 256 kilobytes of storage for self test; as well as a random access memory (RAM) comprising: 1.75 megabytes for downloaded programs, object definition data, and graphics universe data; an additional 0.5 megabytes of shared memory for additional downloaded graphics object data, shared with the ADSP processor. The center monitor in the video display 122 (FIG. 1) also includes an additional 1 megabyte of RAM for downloaded scenario traffic data. Furthermore, the presently preferred computer 114 also incorporates additional random access memories for each processor as follows: DSP—64 kilobytes; ADSP—16 kilobytes of program memory (for the programs downloaded from the programs downloaded from the computer RAM or the stand alone personal computer 103), 16 kilobytes of data memory; and GSP—384 kilobytes of program memory and 640 kilobytes of memory used for image storage and program memory (for the programs downloaded from the computer $AM or the stand along personal computer 103). The GSP employs video random access memory (VRAM) for improved video display rates.

The computer 114 executes scenario software which is stored in a memory (not shown) such as a 128× 8k, 70–100 nsec Random Access Memory (RAM). The scenario software can be one of a number of software scenarios, such as a pursuit simulation, stored within the PC 103 which can be downloaded into the computer 114 in response to commands executed at the PC 103. The computer software executed by the computer 114 is logically organized to include a control process 120. The control process is further preferably organized into a scenario play process 119 and a scenario development process 121.

The control process 120 receives digitized signals from the input devices 104–112 as well as other digitized input signals from the personal computer 103 via the communications link 140. The control process 120 then passes data from these digitized signals, across a data path 118, to a model process 116 that models the velocity and acceleration vectors of the simulated vehicle. Thus, at a time T, position data, i.e., the Cartesian coordinates of the car, are determined by the model process 116. The position data is made available, across the data path 118, back to the control process 120. Accordingly, the control process 120 applies the "rules of the road" to the new position of the car, and initiates signals to drive a video display 122, a pair of speakers 123 and 124, a low pass filter 133 and an instrument panel 130. The filter 133 provides a low pass filtered signal to an amplifier 134 which is connected to a relay 135, which in turn is connected to a speaker 136 positioned adjacent to a user's seat (not shown). The relay 135 is preferably a low voltage relay manufactured by Potter & Brumfield, model No. T70L5D, and is further coupled to a relay control circuit 137 which disconnects the speaker 136 when the system 100 is either powering up or down. The system comprising the components 133 through 137 provides the user 102 with road feel cues, such as the feeling of hitting a curb, and is described in the assignee's co-pending U.S. patent application entitled "Vehicle Simulator with Realistic Operating Feedback", Ser. No. 08/018,950, filed Feb. 17, 1993.

The play process 119 of the control process 120 provides these output signals to the user 102 when the user 102 is engaged in the scenario. The development process 121 provides these output signals to the developer when the developer is programming a vehicle to appear in the scenario by driving the programmed vehicle through the scenario. The development process 121 further utilizes the location information provided by the model process 116 to record the paths of the programmed vehicles that the developer has driven through the scenario. Hence, the developer of a scenario can develop a particular scenario by simply using the simulated vehicle controls and the video display 122 to program vehicles to appear in the simulated universe, as will be described in greater detail in reference to FIGS. 7–23 below.

The control process 120 further provides a user viewpoint into a graphical representation of the vehicle universe. In the preferred vehicle simulation embodiment, the computer 114 generates polygon graphics to the video display 122. One preferred video display device, such as model no. 25K7191 available from Wells-Gardner of Chicago, Ill., is a multisynchronous display that can be configured to display 512× 384 pixels. The video display 122 may include a plurality of video devices arranged in a semi-circle to give the user 102 a simulated view similar to that of a real vehicle such as a car. This arrangement is described in the assignee's co-pending U.S. patent application entitled "Modular Display Simulator", Ser. No. 07/704,373.

The video display 122 preferably generates a color, three-dimensional graphical representation of the environment, i.e., the user's perspective of a graphical universe including items such as a roadway. The speakers 123 and 124 produce sounds such as gear changes, engine revving, skidding, and so on. The instrument panel 130 includes a speedometer 172 (FIG. 3) to indicate the speed of the simulated vehicle, an indicator 176 (FIG. 3) for the gear selected by using the shifter 110, left and right arrow lights to indicate a direction selected by using the turn signal lever 104, and various other indicator lights. Thus, the user 102 is presented with real-time feedback from the output devices 122, 123, 124, 130 and 136 that is personalized according to his own individual performance and what he encounters in the simulated universe.

The control process 120 further provides feedback to simulate the feeling of a steering wheel in a real automobile while being driven. This is preferably accomplished in the same manner as described in assignee's patent entitled "Control Device such as a Steering Wheel for Video Vehicle Simulator With Realistic Feedback Forces", U.S. Pat. No. 5,044,956. In response to inputs from the ABS brake system 131 via a bridge interface circuit 132, the control process 120 also provides feedback to the brake pedal 106 via the ABS brake system 131. The system 131 simulates the brakes on an automobile equipped with an ABS braking system on the brake pedal 106 as described in the co-pending U.S. patent application entitled "Vehicle Simulator With Realistic Operating Feedback" Ser. No. 08/018,950, filed Feb. 17, 1993.

The basic operation of the simulator system 100 will now be described. A program containing a driving simulation scenario is downloaded from the personal computer 103 to the computer 114 which executes the program. Pursuant to the programmed scenario, the computer 114 provides a graphics universe to be displayed to the user 102 via the video display 122 along with associated sounds via the speakers 123, 124. The user 102, in response to what he sees in the video display 122 and what he hears from the speakers 123, 124 manipulates the driving controls to thereby drive the simulated vehicle. Basically, the user 102 starts the automobile via the ignition switch 107, puts the automobile in gear via the automatic transmission sifter 110, depresses the gas pedal 108 to make the automobile move, depresses the brake pedal 106 to make the automobile stop and steers the automobile with the steering wheel 112.

In response to the user inputs provided via the input devices 104–112, the control process 120 of the computer 114 passes data to the model process 116 via the data path 118 which enable the model process 116 to model the velocity and acceleration vectors of the simulated vehicle thereby determining the Cartesian coordinates of the vehicle. This data is then passed back to the control process 120 via the data path 118 and is then used by the control process 120 to provide additional inputs to the user 102. For example, the Cartesian coordinates as determined by the model process 116 may determine that the user 102 has driven the simulated vehicle over a curb in the simulated universe. This causes the control process 120 to send an appropriate signal to the speakers 123 and 124 to model the sound of hitting the curb, send an appropriate signal to the low frequency speaker 136, via the low pass filter 133, the amp 134 and the relay 135, to model the physical sensation of hitting the curb, and to send an appropriate signal to the steering wheel 112 to model the feeling on the steering wheel which results when an automobile hits a curb. Further, the control process 120 also provides feedback to the user 102 through the ABS brake system 131 when the user 102 applies the brakes sufficiently hard to enable the system.

In the particular embodiment of a pursuit training simulator, the user 102 is generally prompted by the computer 114 to follow a pursued or rabbit vehicle 150 (FIG. 2) through the simulated universe. Throughout this detailed description of the preferred embodiments section, the term pursued vehicle shall be used interchangeably with the term rabbit vehicle. Similarly, in the particular embodiment of a driver trainer, the user 102 is generally prompted by the computer 114 to follow road signs 151 (FIG. 2A) through the simulated universe. During the course of either the pursuit training simulation or the driver training simulation, the user 102 will have to respond to events generated by the program, such as oncoming traffic and the like. These events are programmable by a scenario developer in the manner described hereinbelow.

Figure 2A:
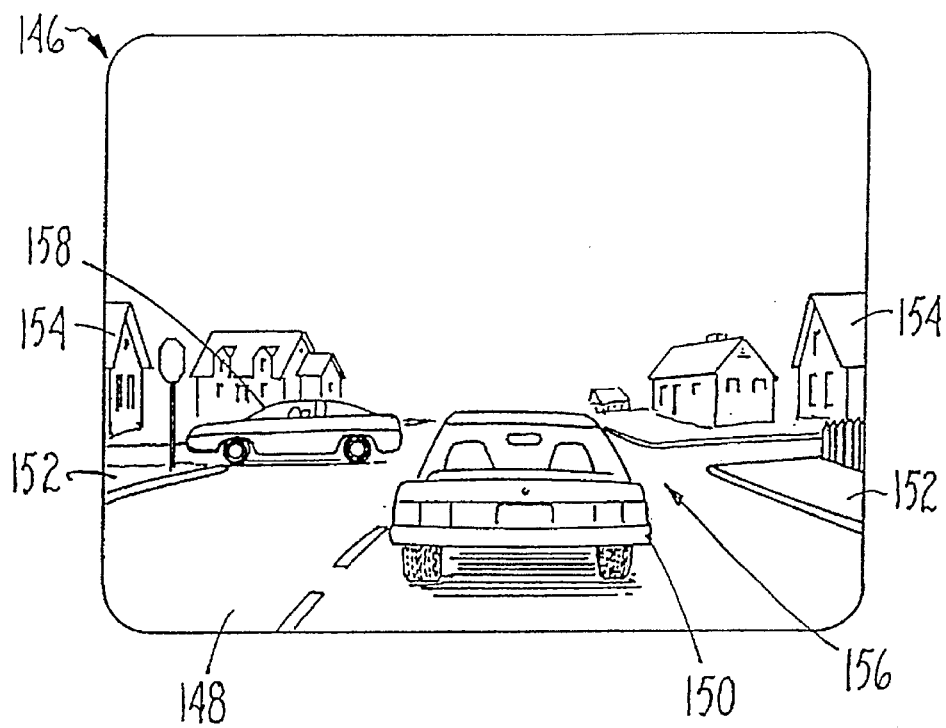
FIG. 2A is a user's view of a typical street scene corresponding to a video screen display provided by the vehicle simulation system of FIG. 1 when the vehicle simulation system is in the pursuit mode.

FIG. 2A is a diagram of a video screen display showing a typical pursuit scenario scene. From the first person viewpoint of FIG. 2A, it is seen that the student is "placed inside" of the vehicle being simulated, i.e., an "observer" vehicle and looks out at a simulated universe 146 in an fashion analogous to a driver looking through a windshield. The developer of the scenarios, which uses the system 100 in the manner described more fully below, is similarly oriented when driving a vehicle in the simulated universe 146 during the development of a scenario. The user 102 views a three dimensional simulated graphical universe 146 as projected onto the two dimensional screen of the video display screen 122. The scene represented in FIG. 2A is one wherein the user 102 is looking forward through a windshield while driving the simulated vehicle and proceeding on a road 148 in the simulated universe 146 in pursuit of a pursued (or rabbit) vehicle 150. A sidewalk 152, a number of houses 154 as well other typical scenery seen in a suburban setting are located on either side of the road 148. As is shown in FIG. 2A, the simulated universe 146 also includes one or more intersections 156 which may contain one or more vehicles 158 as cross traffic and a traffic signal 153.

Figure 2B:
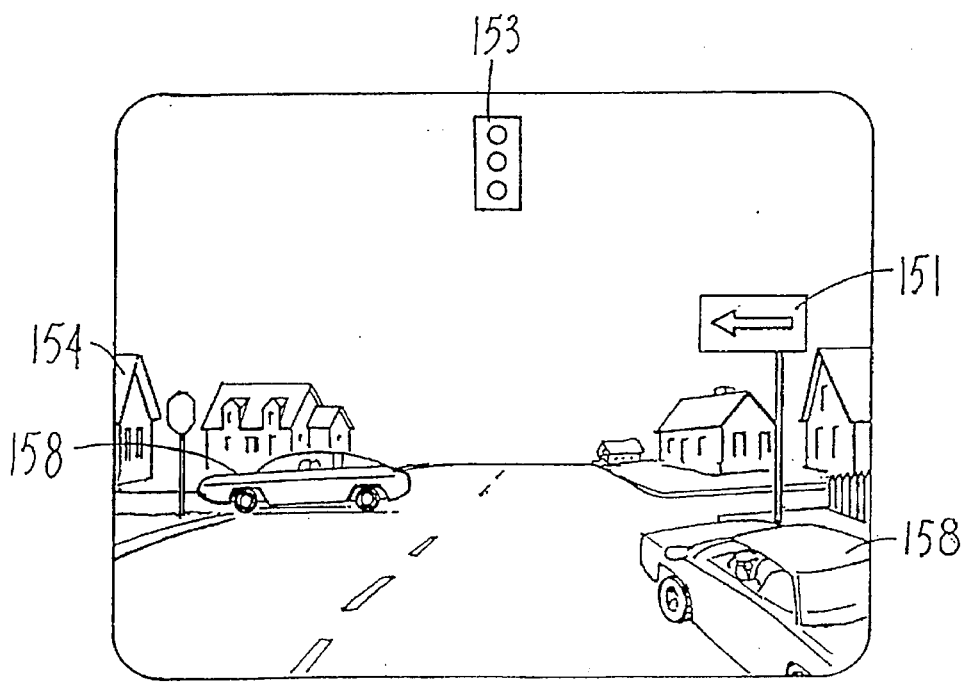
FIG. 2B is a user's view of a typical street screen corresponding to a video screen display provided by the vehicle simulation system of FIG. 1 when the simulation system is in the driving test mode.

FIG. 2B illustrate a display of a typical driving training scenario scene as seen by the user 102 on the video display 122. The typical driving training scenario scene is similar to the pursuit simulation scene shown in FIG. 2A except that it lacks the rabbit vehicle 150. Further, the typical driving training scenario scene preferably includes a plurality of indicator signs 151 which indicate to the user 102 which direction they should turn at intersections and the like to remain on the programmed path of the driving simulation. As is further explained below, in one preferred embodiment, the vehicles 158 shown in FIGS. 2A and 2B, the stoplight 153 and the signs 151 can be programmed by a scenario developer using the simulation system controls and the video display 122 of the simulation system 100 shown in FIG. 1.

Figure 3:
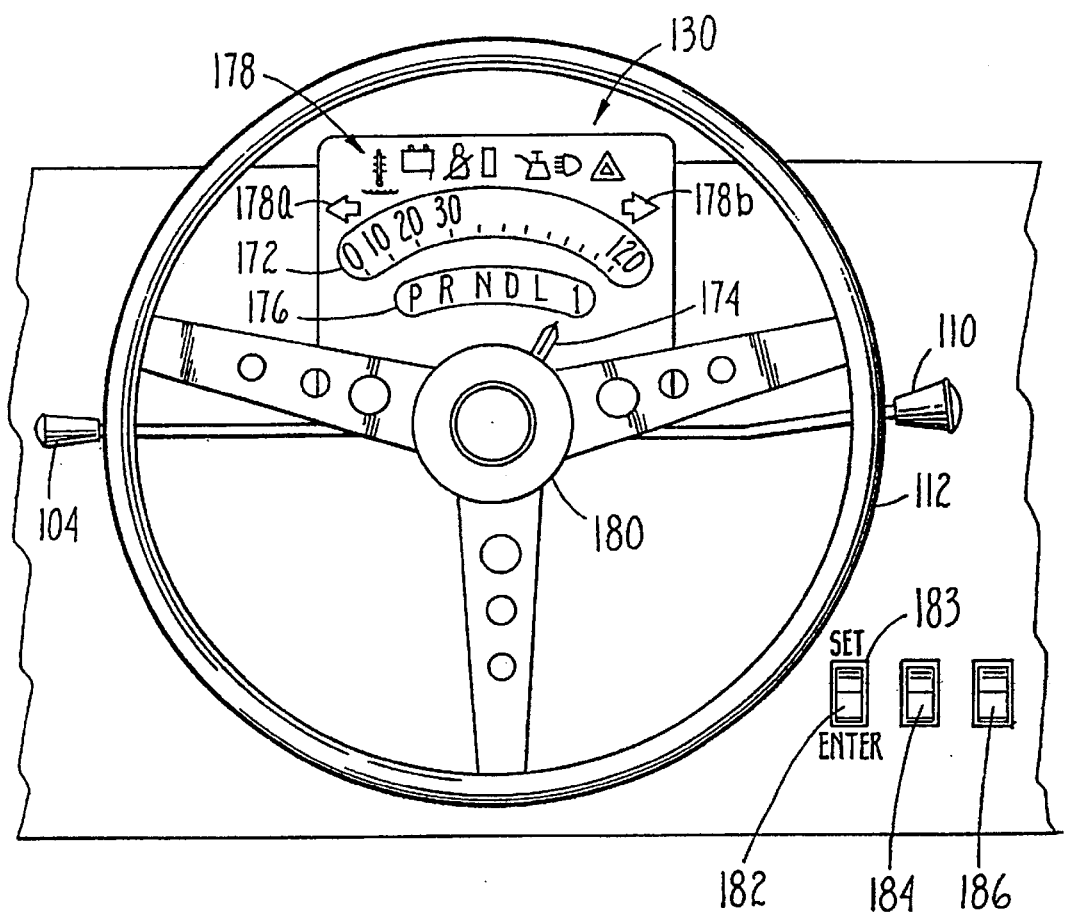
FIG. 3 is a front elevation view of one preferred embodiment of a set of input devices and an instrument panel for the simulated vehicle of the vehicle simulation system of FIG. 1.

The instrument panel 130 of the system 100, as shown in FIG. 3, includes a speedometer 172, a transmission gear indicator display area 176, a transmission gear indicator 174, and an indicator and warning light area 178. Several input devices of the system 100, including the turn signal lever 104, the automatic transmission or shift lever 110, and the steering wheel 112, are also shown. The speedometer 172 and indicators become active when the user 102 (FIG. 1) "starts" the simulated vehicle. The speedometer 172 provides a measurement of velocity. The gear indicator 174 visually displays the position of the shift lever 110 upon the gear indicator display area 170. The indicator and warning light area 178 includes the following designators (left to right): left turn signal 178a, temperature, battery, seat belt, brake, oil pressure, high beam (headlights), emergency flasher, and right turn signal 178b. The turn signal lever 104 is mounted on a steering column housing 180. FIG. 3 also shows the enter rocker switch 182 which is movable between an enter and a set position 183, the select rocker switch 184 and the abort rocker switch 186 mounted adjacent to the dashboard of the simulated vehicle. The switches 182, 184 permit the user 102 to select between various menu choices and the abort rocker switch 186 enables the user 102 (FIG. 1) to end a simulation Or development sequence while the simulation or development sequence is running.

II. SIMULATOR OPERATION WHILE PLAYING A SCENARIO

To more fully explain the present invention, the operation of the simulation system 100 by a user in a previously developed simulation scenario is now described.

Figure 4:
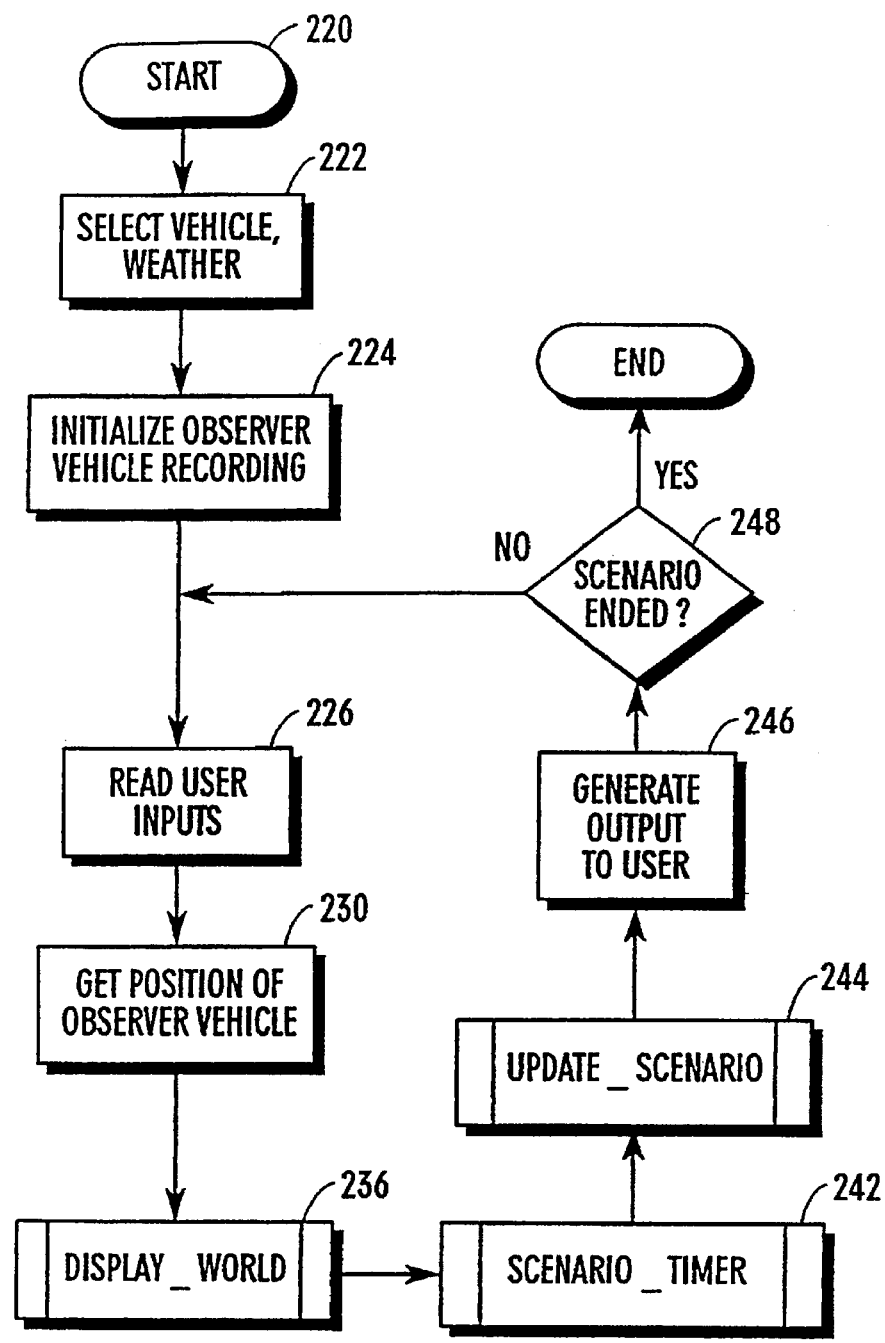
FIG. 4 is a flow diagram of one preferred embodiment of a function forming a portion of the control process of FIG. 1, which performs a previously developed simulation scenario.

FIG. 4 is a flow diagram showing the top level function of the control process 120 (FIG. 1) while a student is driving in a typical scenario. In one presently preferred embodiment, the control process 120 is written in the "C" language and cross-compiled using a Green Hills Software, Inc. "C" compiler available from Oasys, a division of Xel, Inc. of Waltham, Mass. The control process 120 is then executed on a Motorola 68000 microprocessor located in the computer 114. However, one skilled in the art of computers will recognize that many other computer languages and computers, may be used to achieve the same result. Computer source code including relevant portions of the control process 120, of which the top level function shown in FIG. 4 is illustrative, is attached herewith in the accompanying Microfiche Appendix and is entitled "pursuit.c." One skilled in the technology will recognize that the steps in the flow chart shown in FIG. 4, as well as other flow charts included herein, are only means for representing the functional equivalents of their source code counterparts, and so the diagrams may include material that does not completely parallel the named location or operation of the function in the source code included in the Microfiche Appendix.

Referring now to FIG. 4, prior to a start state 220, a scenario program is downloaded from the personal computer 103 to the computer 114. For example, the scenario program may be a scenario designed to train student police officers to pursue vehicles through a simulated universe consisting of a suburban town or it may be a scenario designed to train student drivers to deal with different traffic conditions. From the start state 220 the computer 114 (FIG. 1) directs the video display 122 to display, in state 222, a series of menus from which the student may, depending on the scenario that is being run by the computer 114, select the type of vehicle he will drive, or the type of weather. The selection is accomplished by the student manipulating the switches 182, 184 and 186 (FIG. 3). Preferably, in some of the scenarios that are available to be downloaded from the computer 103, a series of default choices will be made for the type of vehicle and weather. After selections are made for vehicle and weather, if desired, or the default choices are accepted, the student selects the "start scenario" option and then depresses one of the rocker switches 182, 184 or 186 to signal the computer 114 to proceed to the next state.

The computer 114 then initiates a process in state 224 by which the path driven by the student in the observer vehicle can be recorded. This recording preferably reflects how the student driver responded to various events, e.g. vehicle running a stop light, and it can be played back at a later time to permit analysis and critique of the student's performance. Preferably, the recording can be played from the point of view of the student driving the vehicle. Further, as will be described later in conjunction with FIG. 19, in this preferred embodiment, the developer of a scenario can select only portions of the scenario, such as those portions having traffic events, like vehicle running stop lights, to be played back to the student.

The computer 114 then initiates a scenario play loop in state 226 by reading the input signals provided by the student via the user input devices 104–112 (FIG. 1), i.e., the steering wheel, accelerator etc. The computer 114 uses these inputs in state 230 to determine the position of the observer vehicle driven by the student in the simulated universe by sending signals on the data path 118 to the model process 116 (FIG. 1) representative of the student's input signals. The model process 116 processes the input signals and determines the Cartesian coordinates of the vehicle relative to a pre-defined starting position within the simulated universe 146 (FIG. 2). As will be described in greater detail in reference to FIGS. 8 and 12 below, the starting points of a scenario in the simulated universe 146 can be determined by the developer of the scenario. Typical starting point of a scenario in the simulated universe 146 include being parked on the side of a road as traffic is driving past, or in a parking lot that requires the student to drive the simulated vehicle onto a busy street.

Once the computer 114 has determined the position of the observer vehicle containing the student in state 230, it then enters a function 236 entitled "display_world." In the function 236, the computer 114 uses the positional information determined in state 230 to update the display of the background features in the simulated universe 146, e.g. the houses 154, roads 148, etc., on the video display 122.

The display of the background scenario, as well as the display of the other objects to be discussed below, is performed by a digital signal processor (not shown) within the computer 114 (FIG. 1) such as an ADSP 2101 chip available from Analog Devices of Norwood Mass. The background scenario can include the houses 154, sidewalks 152, stoplights 153 and signs 151 and streets 148 as shown, for example, in FIGS. 2A and 2B.

The computer 114 then proceeds to a function 242 entitled "scenario_timer" where the computer 114 updates a scenario clock. The scenario clock is preferably a clock internal to the computer 114 which can be incremented in a variable fashion as will be described in reference to FIG. 5 below. In this preferred embodiment, the time on the scenario clock determines when other vehicles are scheduled to appear and disappear in the simulated universe 146 and it also determines the positions on the paths of these vehicles, including the rabbit vehicle 150 in a pursuit type scenario, through the simulated universe 146. Additionally, as will be described in greater detail in reference to FIGS. 16 and 17 below, the stop lights 153 can be programmed to also change states at selected times according to the scenario clock.

From the scenario_timer function 242, the computer 114 proceeds to a function 244 entitled "update_scenario" where programmed vehicles, including the rabbit vehicle 150 and the other programmed vehicles 158, are introduced, updated and removed from the simulated universe 146. In the preferred embodiment, the scenarios are developed so that other vehicles, including the rabbit vehicle 150 (FIG. 2) in a pursuit-type scenario, are programmed to appear and disappear in the simulated universe 146 at specific times of the scenario clock. Further, the paths of these vehicles through the simulated universe 146 is recorded and stored in the memory of the computer 114 as a continuous series of locations where the vehicle is to be in the simulated universe 146 at particular times on the scenario clock. Hence, once the scenario clock has been updated by the computer 114 in the scenario_timer function 242, the computer 114 then retrieves the stored cartesian coordinates indicative of the programmed location of the vehicle for that particular time on the scenario clock and subsequently updates the video display 122 to display the vehicle at this location. The update_scenario function 244 is described in greater detail in reference to FIG. 6 below.

The computer 114 then generates output signals to the user 102 in state 246. These output signals consists of sounds, e.g. the sounds of a collision, tires screeching etc., via the speakers 123 and 124 (FIG. 1), appropriate road feel cues via the low frequency speaker 136, feedback on the brake pedal 106 via the ABS brake system 131, and feedback on the steering wheel 112. Preferably, the computer 114 determines which output signals to provide to the student based upon the location of the observer vehicle driven by the student in the simulated universe 146 as determined in the update_scenario function 244. Further, the simulator in this preferred embodiment incorporates the feedback systems disclosed in the assignee co-pending application entitled "Vehicle Simulator with Realistic Feedback", Ser. No. 08/018,950, filed Feb. 17, 1993.

The computer 114 then moves to state 248 and determines whether the scenario has ended. In this preferred embodiment of the present invention, the simulation ends when either the student has crashed his vehicle, the student has manipulated the abort switch 186 (FIG. 3) or the student has driven the observer vehicle to the programmed end of the simulation. If any of these conditions have occurred, the computer 114 moves to an end state 250 where the student is informed that the scenario is over and the vehicle simulator 100 awaits further instructions from either the student or an instructor via the personal computer 103 (FIG. 1). If, in decision state 248, the computer 114 determines that the simulation scenario has not ended, the computer returns to state 226 where it again reads the user inputs from the user input devices 104–112 (FIG. 1). Preferably, the computer 114 completes the loop comprising the states 226 through 248 sufficiently quickly so that the scenario clock, simulated background and other vehicles are shown and updated on the video display 122 as they would be if the student were driving a vehicle in the real world.

In this fashion, the simulation system 100 of the present invention allows the student to drive the observer vehicle through the simulated universe 146 which contains traffic lights and other vehicles which can be programmed to create traffic situations in the universe 146 to which the student must respond. Hence, the simulation system 100 of the present invention provides a realistic simulation of driving a vehicle in the real world and thereby enhances the educational experience of using a vehicle simulator.

Figure 5:
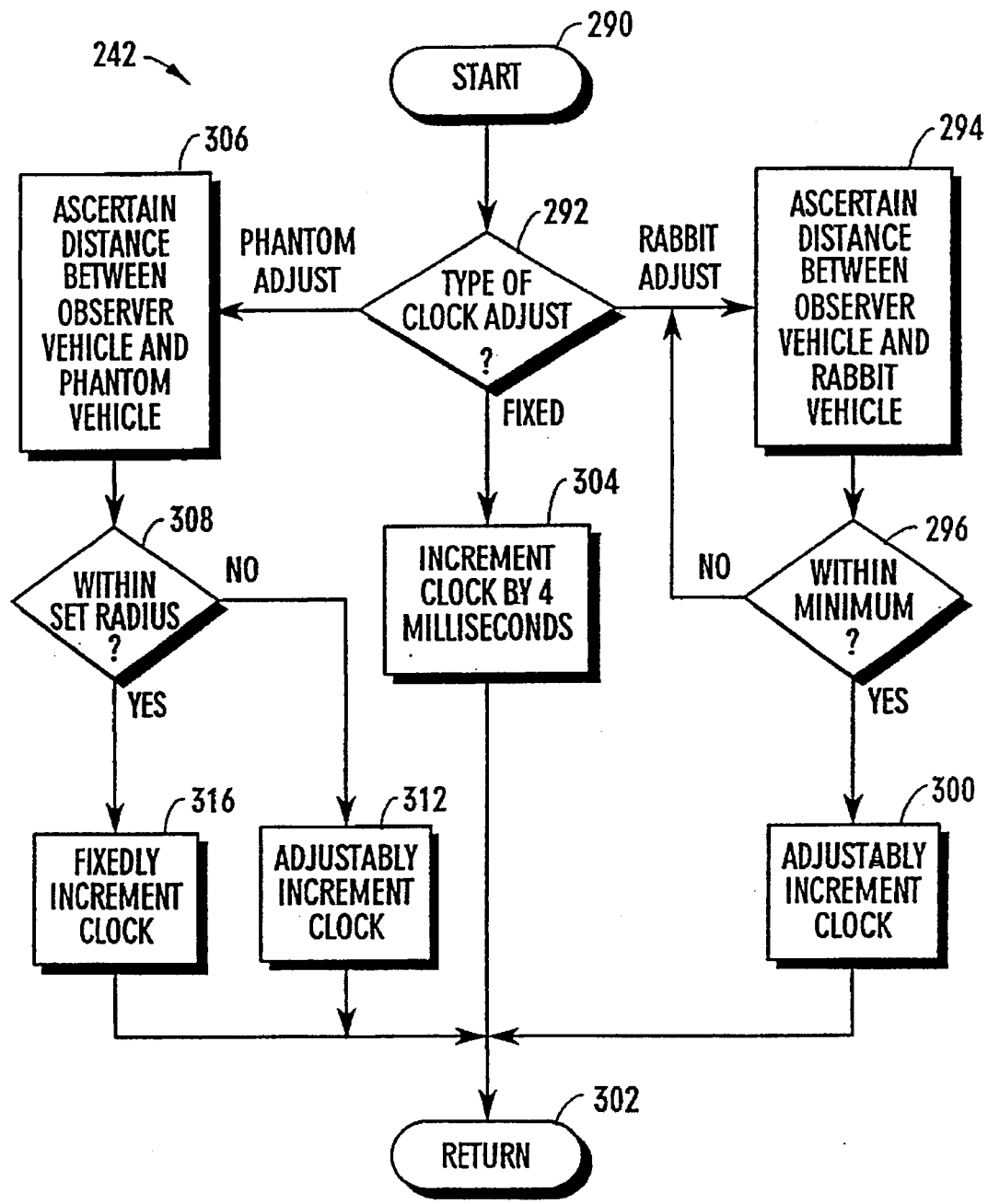
FIG. 5 is a flow diagram of one preferred embodiment of the "scenario_timer" function of FIG. 4.

FIG. 5 illustrates a flow diagram for the "scenario_timer" function 242 of FIG. 4. The scenario clock is a clock which is tied to an internal clock (not shown) which preferably four millisecond clock that is part of the simulation system 100 and is preferably contained within the computer 114. As will be described in greater detail below in reference to FIG. 6, in this preferred embodiment of the invention, the position of the programmed vehicles, comprising all of the vehicles within the simulated universe 146, other than the observer vehicle, and the state of the stoplights 153 is defined as a function of the time according to the scenario clock. Specifically, the programmed vehicles are programmed to appear in the simulated universe 146 at a set time on the scenario clock, travel along a path where their location is updated at set intervals of the scenario clock, and then leave the simulated universe 146 at the programmed scenario clock time. Further, these programmed vehicles are stored within the memory of the computer 114, when the simulation scenario is running, and sorted in terms of when they are to appear in the simulated universe as is more fully described in reference to FIG. 23 below.

Referring now to FIG. 5, the "scenario_timer" function 242 operates as follows. Beginning at a start state 290, the computer 114 initially determines, in decision state 292, the adjusting mode that has been programmed for the scenario clock in this particular scenario. In each scenario developed using the scenario development system of the present invention, the developer of the scenario can select one of three different formats for incrementing the scenario clock. One format, entitled RABBIT ADJUST, is specifically configured to be used in pursuit-type simulations where the student in the observer vehicle will be chasing the rabbit vehicle 150. In the RABBIT ADJUST format, the scenario clock is variably incremented depending upon how close the observer vehicle is to the rabbit vehicle. In another format, entitled PHANTOM ADJUST, the scenario clock is variably incremented depending upon how close the observer vehicle driven by the student is to a phantom vehicle. The phantom vehicle is not visible when the student is engaged in the simulation. This is the vehicle that was driven by the developer when the simulation scenario was developed. Finally, the third format for incrementing the scenario clock comprises incrementing the clock in fixed intervals, which, in the preferred embodiment, are preferably 4 millisecond intervals.

When the computer 114 determines that the format for incrementing the scenario clock is the RABBIT ADJUST format, the computer 114 moves to state 294 and initially ascertains the distance between the observer vehicle and the rabbit vehicle 150. This is done by comparing the current location of the observer vehicle, as given by the model process 176 (FIG. 1) in state 230 (FIG. 4) to the current location of the rabbit vehicle determined in the update_scenario function 244. The computer 114 then moves to a state 296 and determines whether the observer vehicle is within a pre-selected minimum distance of the pursued vehicle 150. If the observer vehicle is not within the preselected distance, the computer 114 returns from the decision state 296 to state 294 to re-ascertain the distance between the observer vehicle and the rabbit vehicle 150 (FIG. 2) without incrementing the scenario clock. As can be appreciated, if the student in the observer vehicle falls too far behind the rabbit vehicle 150, or takes a wrong turn, the scenario clock is not incremented and, consequently, neither the position of the rabbit vehicle 150, nor the position of any of the other programmed vehicles in the simulation are updated. This essentially halts the programmed simulation. Hence, from the point of view of the student driving the observer vehicle, the rabbit vehicle 150 and the other programmed vehicles appear to be stationary in the simulated universe 146 until the student drives the observer vehicle within the preselected minimum distance of the rabbit vehicle 150.

If the observer vehicle is within the preselected distance, the computer 114 then adjustably increments the scenario clock in state 300. In the presently preferred embodiment, the amount by which the scenario clock is incremented is dependant upon the distance between the observer vehicle and the rabbit vehicle 150. Preferably, the scenario clock is incremented by a time sufficient to maintain a mean distance of between the student driven observer vehicle and the rabbit vehicle 150 regardless of how fast the student drives the observer vehicle.

Specifically, the scenario clock is incremented by a smaller amount when the observer vehicle begins to fall behind the rabbit vehicle 150. This results in the rabbit vehicle 150 travelling along its preprogrammed path in the simulated universe 146 at a slower pace and thereby allows the student in the observer vehicle to catch up. Conversely, if the student increases the speed of the observer vehicle so that it gets closer than the mean distance to the rabbit vehicle 150, the computer 114 increments the scenario clock by a larger amount. This results in the rabbit vehicle 150 travelling along its preprogrammed path in the simulated universe 146 at a faster pace in order to maintain the mean distance between the observer vehicle and the rabbit vehicle 150.

Figure 6:
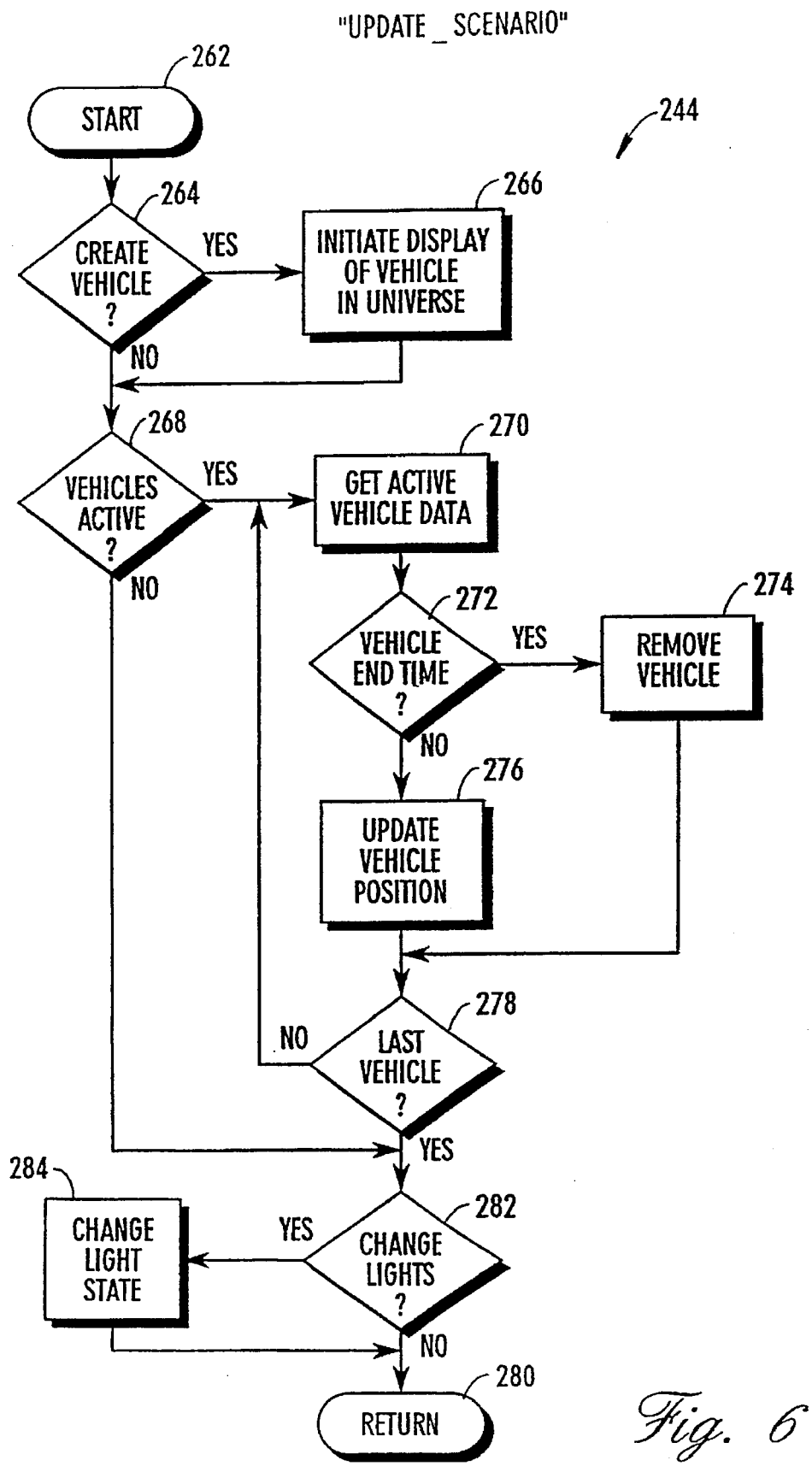
FIG. 6 is a flow diagram of one preferred embodiment of the "update_scenario" function of FIG. 4.

Further, since the positions of all other vehicles in the simulated universe 146 are also updated in the update_scenario function 244 based on the scenario clock, these vehicles will also travel slower in the simulated universe 146 when the observer vehicle falls behind the rabbit vehicle 150 and faster when the observer vehicle comes closer to the rabbit vehicle 150. Consequently, when the developer is developing the scenario, the developer can program certain events to occur with the programmed vehicles, which necessitate the student driving the observer vehicle to take evasive action. Because of the variable scenario clock feature, the events will occur at the appropriate time to require the evasive action regardless of the speed that the student is driving the observer vehicle. As an example, if the developer programs a scenario to have a programmed vehicle driving through an intersection just in front of the observer vehicle, requiring the student to steer around the programmed vehicle, the programmed vehicle will appear in the intersection at the appropriate time no matter how fast the student is driving the observer vehicle. Once the scenario clock has been incremented in the state 300, the computer 114 proceeds to a return state 302 from which it proceeds to the update_scenario function 244 (FIGS. 4 and 6).

If the computer 114 determines in decision state 292 that the scenario increments the scenario clock in a fixed fashion, the computer then proceeds to state 304 and increments the scenario clock by a fixed amount. The developer of this type of scenario has less control in scheduling events such as programmed vehicles driving through intersections, running lights and the like, in order to require the student driving the observer vehicle to respond. This is true since the student in the observer vehicle may drive slower or faster than the developer had anticipated. However, developing a scenario which increments the scenario clock in this fashion can provide a scenario which is very realistic of driving a vehicle in a normal setting. Once the scenario clock has been incremented by the pre-fixed time in state 304, the computer 114 then proceeds to the return state 302 from which it proceeds to the update_scenario function 244 (FIGS. 4 and 6).

Finally, if the computer 114 determines in decision state 292 that the scenario is programmed to increment the scenario clock according to the PHANTOM ADJUST MODE, the computer 114 moves to a state 306 and ascertains the distance between the observer vehicle, driven by the student and a phantom vehicle. The phantom vehicle is a vehicle which is programmed to drive through the simulated universe on the intended path of the student by the developer when the developer is developing the scenario. The path of the phantom vehicle is then recorded by the computer 114, as will be described below in conjunction with FIG. 8, and, once the scenario is being played for a student, the phantom vehicle is used as a bench mark for determining how much to increment the scenario clock. When the simulation is being played for the student, the phantom vehicle is not visible. However, in state 306, the computer 114 ascertains the distance between the phantom vehicle and observer vehicle from the position of the observer vehicle given in state 230 (FIG. 4) and the prerecorded position of the phantom vehicle at the current time on the scenario clock.

Once the computer 114 determines the distance between the observer vehicle and the phantom vehicle, the computer 114 then determines whether the observer vehicle is within a pre-defined radius of the phantom vehicle. The pre-defined radius can be defined by the developer as is more fully discussed in reference to FIG. 20 below. If the observer vehicle is within the pre-defined radius, the computer 114 then moves to state 310 and increments the scenario clock by the normal pre-set fixed increment. Subsequently, the computer 114 proceeds to the return state 302 from which it proceeds to the update_scenario function 244 (FIGS. 4 and 6).

If, however, the computer 114 determines in decision state 308 that the observer vehicle driven by the student is not within the set radius of the phantom vehicle as programmed by the developer, the computer then moves to state 312 and adjustably increments the scenario clock. Specifically, if the observer vehicle is not within the pre-defined radius, the computer 114 causes the scenario clock to be incremented so that the position of the phantom vehicle at the incremented time is substantially within the pre-selected radius of the observer vehicle driven by the student in the simulation. Consequently, when the position of the other programmed vehicles in the simulated universe 146 are updated in the update_scenario function 244, they are updated to the positions they are programmed to be at the new time on the scenario clock. Note, that, if the observer vehicle is stopped in the simulated universe 146 outside of the pre-selected radius, the computer 114 does not increment the scenario clock and effectively freezes the scenario. Hence, the positions of these vehicles, relative to the observer vehicle driven by the student, will be substantially the same as the position of these vehicles relative to the phantom vehicle. Once the scenario clock as been either fixedly or adjustably incremented in states 310 or 312, the computer then proceeds to the return state 302 from which it proceeds to the update_scenario function 244 (FIG. 4 and 6).

Hence, the simulation system 100 of the present invention can be programmed by the developer so that the scenario clock controlling the positions of the programmed vehicles and the stop lights can be either fixedly incremented, or adjustably incremented based upon the relative positions between the student driven observer vehicle and a reference vehicle provided by either the rabbit vehicle 150 or the phantom vehicle. Adjustably incrementing the scenario clock according to the RABBIT ADJUST or PHANTOM ADJUST mode permits the developer to develop a scenario in which programmed vehicles are programmed to appear at certain locations at certain times on the scenario clock to thereby force the driver of the simulated vehicle to take evasive action. Consequently, when the simulation is being run for a student, the programmed vehicles will appear in the correct location at the correct time to force the evasive action, as the scenario clock has been adjustably incremented so that the student is substantially in the anticipated location at substantially the anticipated time on the scenario clock for the pre-programmed event to occur.

FIG. 6 illustrates an exemplary flow diagram illustrating the operation of the computer 114 as it performs the "update_scenario" function 244 shown in FIG. 4. From a start state 262 the computer 114 (FIG. 1) determines in decision state 264 whether any programmed vehicles are scheduled to be created in the simulated universe 146 at the current time on the scenario clock as determined in the scenario_timer function 242 (FIGS. 4 and 5). The programmed vehicles are stored within the memory of the computer 114 preferably sorted in terms of when, on the scenario clock, they are to be created in the simulated universe 146. If the computer 114 determines in decision state 264 that a vehicle is scheduled to be created, the computer 114 initiates the display of the programmed vehicle in the simulated universe 146 in state 266 on the video display 122 (FIG. 1), provided the observer vehicle driven by the student is in a position to see the programmed vehicle.

If the computer 114 determines in decision state 264 that no programmed vehicle is scheduled to be created in the simulated universe 146 at the current time on the scenario clock, the computer 114 then determines in decision state 268 whether any of the programmed vehicles are currently active, i.e., in existence, in the simulated universe 146. If the computer 114 determines that one or more programmed vehicles are currently active, the computer 114 moves to state 270 and retrieves from memory the current time path data and attributes of a first programmed vehicle active in the simulated universe 146 at the current time.

The computer 114 then determines, in decision state 272, whether this programmed vehicle is scheduled to be removed from the simulated universe 146 at the current time on the scenario clock, i.e., the current time on the scenario clock is this programming vehicle's programmed end time. If the programmed vehicle is scheduled to be removed from the simulated universe 146 the computer 114 removes the programmed vehicle and it is no longer displayed in the simulated universe 146 on the video display 122. If the computer 114 determines that the programmed vehicle is not scheduled to be removed from the simulated universe 146, the computer 114 then moves to state 276 and updates the programmed vehicle to its programmed position in the simulated universe 146 at the current scenario time as given by the path data for this programmed vehicle.

The computer 114 then proceeds to determine in decision state 278 whether this is the last programmed vehicle active in the simulated universe 146 that must be updated. If this is not the last vehicle active in the simulated universe 146, at the present time on the scenario clock, the computer returns to state 270 where it recalls the data about the next active programmed vehicle in the simulated universe 146 at the present time on the scenario clock. The computer 114 then loops through states 270–278 for each of the vehicles active in the simulated universe 146. In this fashion, the position of each of the programmed vehicles active in the simulated universe 146 is updated.

Once the positions of each of the active programmed vehicles are updated to their programmed positions at the current time on the scenario clock, or if the computer determines there are no active vehicles in decision state 268, the computer 114 then determines in decision state 282 whether the stop lights 153 (FIG. 2B) are scheduled to change at the current time on the scenario clock. As will be described in greater detail below in reference to FIGS. 16 and 17, the developer can schedule the stop lights 153 in the simulated universe 146 to change from green to yellow and then to red, and from red to green at different times on the scenario clock.

If the current time on the scenario clock is a time at which the stoplights are scheduled to be changed, the computer 114 then appropriately changes the stop lights in state 284. Hence, the student driving the observer vehicle in the simulated universe 146 sees each of the stop lights 153 visible in the video display 122 (FIG. 1) change from red to green, green to yellow, or yellow to red depending upon the programmed change at this particular time on the scenario clock. The computer 114 then proceeds to the return state 280. From the return state 280 the computer 114 generates output signals to the user in state 246 as described above in reference to FIG. 4.

The foregoing describes operation of a typical simulation developed using the simulation development system of the present invention. As can be seen by this description, one particular advantage of the present invention is that the developer of the simulation can program vehicles to drive a path in the simulated universe 146 which necessitates the student in driving the observer vehicle to take evasive action. Further, the simulation system includes a scenario clock which can be programmed to adjustably increment so that the programmed vehicles will be in the correct place to necessitate evasive action on the part of the student, regardless of how fast or slow the student is driving the observer vehicle. The same is true for schedule changes in the stop lights 153. A more detailed description of how the developer develops such a scenario is described below.

III. PROGRAMMING A SCENARIO

The process for developing a simulation scenario, i.e., the developer process 121 (FIG. 1), including either a pursuit simulation scenario or a driving test simulation like those discussed above, will now be described. In the presently preferred embodiment, the developer of the scenario sits at the controls of the simulation system 100 in the same manner as the student or any-other user 102 (FIG. 1). Further, the development of the simulation scenario by the scenario developer is accomplished using the vehicle input devices 104–112 (FIG. 1), a display of the simulated universe 146 in the video display 122 (FIG. 1) as well as the rocker switches 182, 184, and 186 (FIG. 3). The developer process 121 of the computer 114 (FIG. 1) is preferably activated in response to commands given at the keyboard of the personal computer 103.

Basically, scenarios are developed using the simulation system 100 by the developer sitting at the controls of the simulated vehicle, entering the simulated universe 146, and selecting a vehicle that the developer wishes to appear in the universe 146. The developer then drives the vehicle being programmed along a path in the simulated universe 146 in the manner that the developer wishes the programmed vehicle to perform. The computer 114 records the path and the manner that the developer drove the programmed vehicle for later replay during operation by a user. Hence, all the developer has to do to develop a complex scenario in the simulation system 100 is to simply drive the vehicles in the universe as he wishes the vehicles to perform in the simulation.

Included in the attached Microfiche Appendix is the source code entitled "pursuit.c" and "trflite.c" used to implement the scenario development process 121 of the present invention. This source code also includes routines and functions analogous to the previously described routines and functions implemented by the computer 114 when a scenario is being played. Functions described herein which appear in quotation marks, e.g., "to_program_observe", are the names of some of the functions within the source code which perform the described operations.

Figure 7:
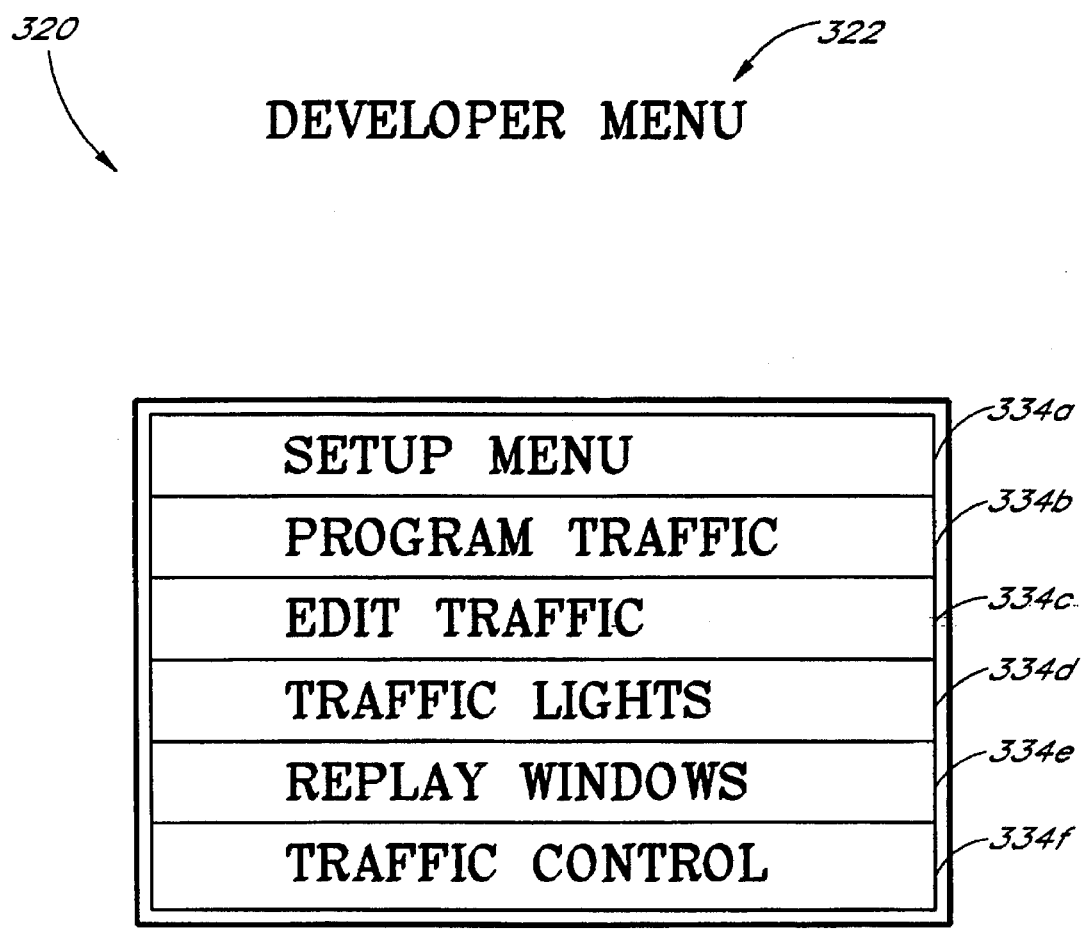
FIG. 7 is a diagram of a typical developer menu screen provided by the vehicle simulation system of the present invention.

FIG. 7 illustrates a Developer Menu 320 which is the first menu that is displayed to the developer of the simulation scenario on the display screen 122 (FIG. 1) after the development process 121 of the simulation system 100 has been initiated. FIG. 7 illustrates that the Developer Menu 320 has an identifying header portion 322 and a box portion 334 which has a Setup Menu line 334a, a Program Traffic line 334b, an Edit Traffic line 334c, a Traffic Lights line 334d, a Replay Windows line 334e a Traffic Control line 334f.

The developer uses the Developer Menu 320 to select the next menu containing options necessary to develop the scenario. The scenario developer selects between the lines 334a–334f by moving a shaded line or cursor to the desired Menu line in the box 334. The developer moves between the lines 334a–334f by pressing up or down on the select rocker switch 184 (FIG. 3). When the developer is on the desired menu line 334a–334e, he then presses the enter rocker arm switch 182 to initiate the menu or function contained on that line. Preferably, this method of selecting between menu lines is the same method used for selecting between menu lines of all the menus herein described relating to this preferred embodiment. If the developer manipulates the abort rocker switch 186 (FIG. 3) at any time during the development of a simulation scenario, the computer 114 returns the developer to the Developer Menu 320 by replacing the then existing display on the display screen 122, with a display of the Developer Menu 320 as seen in FIG. 7.

Figure 8:
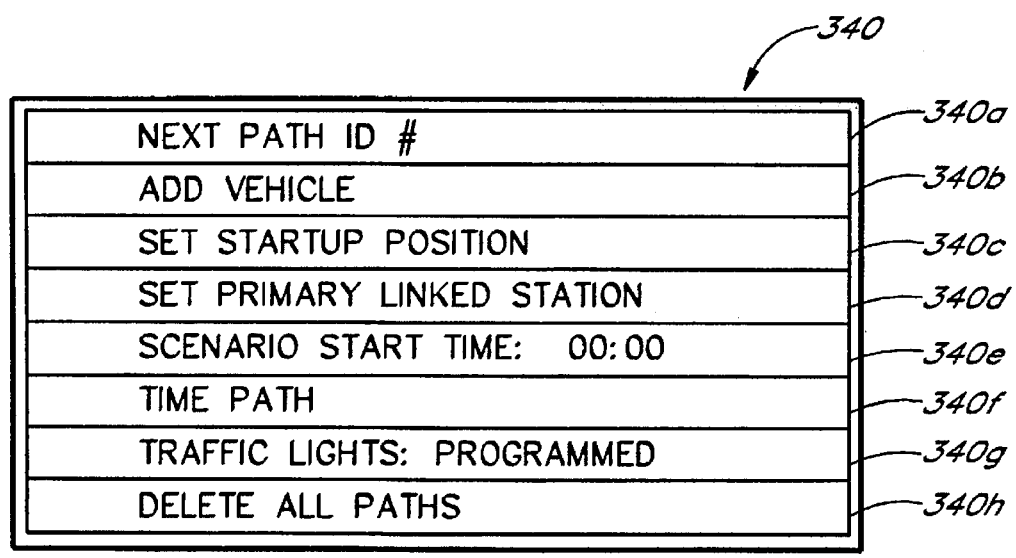
FIG. 8 is a is a diagram of a typical program menu screen provided by the vehicle simulation system of the present invention.

FIG. 8 illustrates a Program Traffic Menu 329 that is displayed to the developer on the display screen 122 when the Program Traffic line 334b of the Developer Menu 320 (FIG. 7) is selected. From this menu, the developer is able to program vehicles to appear in the scenario under development, and program the path these vehicles drive in the simulated universe 146 as well as set the starting position for the student driving the observer vehicle in the simulated universe 146 when the scenario is played. The Program Menu 329 contains an identifying header 330, a Scenario Path Time Used header 324, which indicates how much time on the scenario clock has been programmed on the current scenario under development, a Scenario Path Time Available header 326, indicating how much time on the scenario clock is available for the current scenario under development, and a Number of Paths Header 330, which indicates the total number of paths programmed for vehicles in the current scenario under development. In the presently preferred embodiment, there is a limit of 256 vehicles that can be programmed into any one simulation scenario. However, if additional memory space is provided in the computer 114, additional vehicle paths can be programmed into a specific simulation scenario.

FIG. 8 also includes a programming box 340 containing a Next Path ID# line 340a, an Add Vehicle line 340b, a Set Startup Position line 340c, a Set Primary Linked Station line 340d, a Scenario Start Time line 340e, a Time Path line 340f, a Traffic Lights line 340g and a Delete All Paths line 340h. The developer selects between the lines 340a–340g using the select and enter rocker switches 182 and 184 (FIG. 3) in the manner described above. The functions performed by the computer 114 when each of these lines 342a through 342f are selected will now be described.

The Next Path Id # line 340a provides an indication of the next available ID number for a particular vehicle. In this preferred embodiment, a three digit ID number, e.g. 002, 015 etc. is assigned to each programmed vehicle which is programmed to appear in the scenario. The developer can either select a particular ID number to be assigned to a programmed vehicle using the select and enter rocker switches 182 and 184 or the computer 114 will automatically assign the next available number to the programmed vehicle.

The Add Vehicles line 340b allows the developer to add a programmed vehicle to the scenario under development. Specifically, using the Add Vehicles line 340b, the developer can command the computer 114 to perform a series of functions whereby the developer can drive a programmed vehicle through the simulated universe 146, using the input controls 104–112 and receiving output signals from the output devices 122–136, in the manner that the developer wishes the programmed vehicle to perform when the scenario is running. The Set Startup Position line 340c allows the developer to set the starting position for the student driving the observer vehicle in the simulated universe 146 when the simulation is played. Selecting the line in 340e initiates a series of functions which place the developer in the simulated universe 146 where the developer drives to the desired starting position in the same fashion as the student drives the observer vehicle.

The Set Primary Linked Station line 340d is used when there is more than one simulation system 100 linked together in a network. In the preferred embodiment of the present invention, more than one simulation system 100 can be linked together so that more than one student can simultaneously drive in a simulation scenario at any one time. Further, the simulation system 100 of the present invention is configured so that when more than one simulation system 100 is linked together, each of the vehicles driven by the students appears in the video display 122 of the other students when the students are within view of each other in the simulated universe 146. Hence, the students driving in the simulation scenario not only have to respond to the traffic conditions created by the vehicles programmed by the developer to appear in the simulated universe 146, but also to the traffic conditions created by the other students driving in the simulation scenario.

The Set Primary Linked Station line 340c is used by the developer to set one of the simulation systems 100 as the primary station that provides a signal to all of the other simulation systems 100 in the network to thereby synchronize the updating of the position of the programmed vehicles and any change of the stop light 153 in the simulated universe 146. One method of synchronizing the video displays 122 is to have the primary station send a scenario clock signal to each of the other simulations systems 100, which then use this signal as the scenario clock for updating the position of the programmed vehicles. If the scenario clock is programmed to adjustably increment in either the phantom or rabbit adjust modes, then the position of the observer vehicle driven by the student in the primary station simulation system 100 is used as the basis for incrementing the scenario clock. Another method of synchronizing the video displays 122 is to have the primary station simply provide the positions and video displays of each programmed vehicle on the network interconnecting the different simulation systems 100.

The Scenario Start time line 340e permits the developer to set a time on the scenario clock from which the computer 114 will begin replaying the scenario when the developer is adding a programmed vehicle using the Add Vehicle line 340a, as will be described in greater detail in reference to FIGS. 9 and 10. This allows the developer to add a programmed vehicle at a certain time during the scenario without having to replay the entire scenario from the beginning.

The Time Path line 340f, allows the scenario developer to enter the simulated universe 146 and use a stop watch to time how long it takes to drive between two locations in the simulated universe 146. The developer can then use this information to aid in scheduling programmed vehicles to appear in the simulated universe 146 to thereby create a traffic situation requiring action by the student, e.g., a programmed vehicle driving through an intersection as the student in the observer vehicle enters the intersection. The function called by the Time Path line 342f is discussed in greater detail in reference to FIG. 13 below.

The Traffic Lights line 340g allows the developer to select whether the traffic lights 151 (FIG. 2) in the simulated universe 146 will change according to a program selected by the developer, as will be described in greater detail below in reference to FIG. 16, or whether the traffic lights 151 will change at pre-selected default times on the scenario clock.

The Delete All Paths line 340h allows the developer to instruct the computer 114 to erase each of the programmed vehicle attributes and vehicle paths from its memory. The operation of the computer 114 as it performs the functions indicated by the lines 340a–340h will now be described in reference to FIGS. 9–13.

Figure 9:
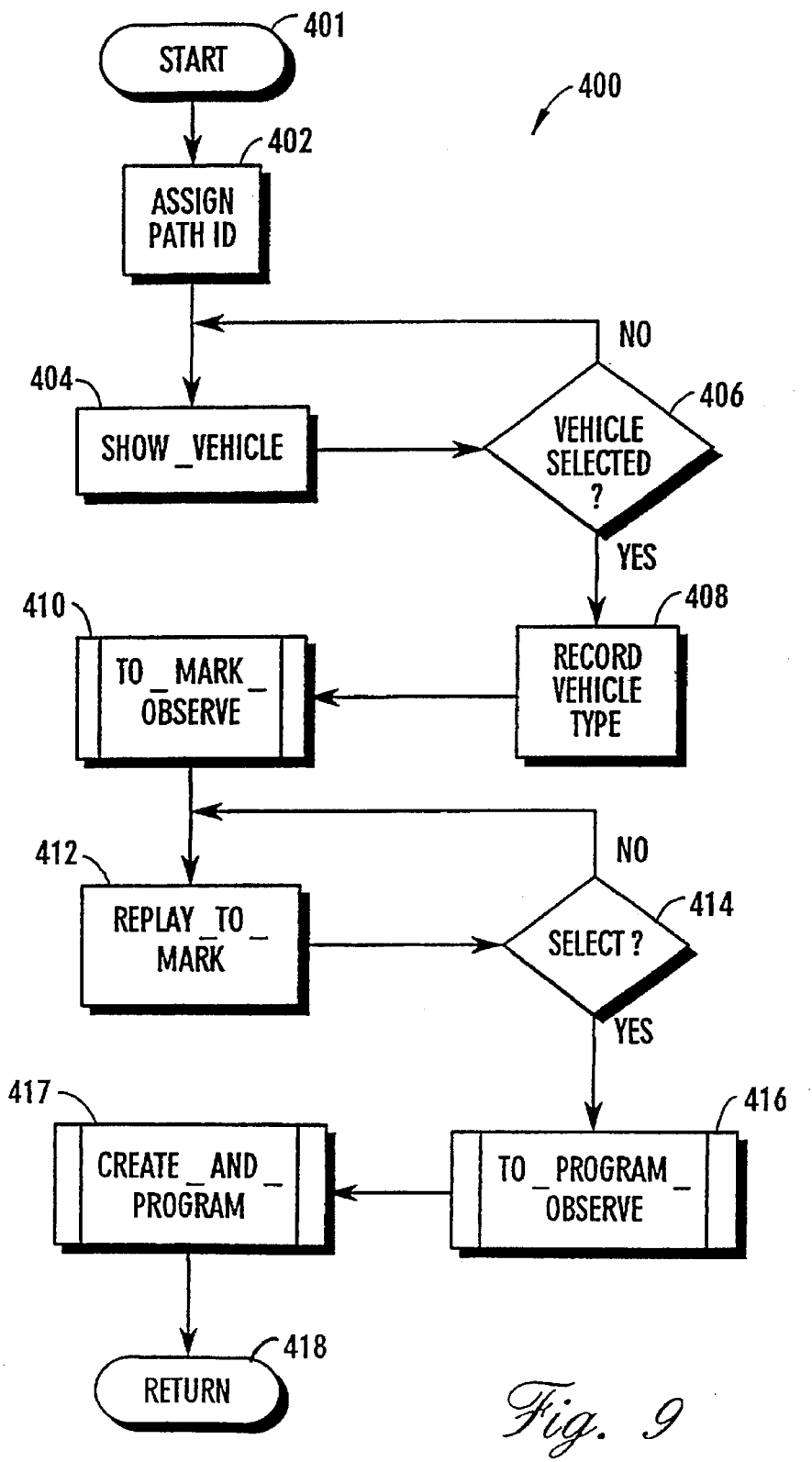
FIG. 9 is a flow diagram of a preferred embodiment of the "program_vehicle" function called from the add vehicle line of FIG. 8 for adding a programmed vehicle to a simulation scenario under development, using the vehicle simulation system of the present invention.

FIG. 9 illustrates the flow diagram followed by the computer 114 in one preferred embodiment of the present invention for implementing a function 400 entitled "program_vehicle" called when the developer selects the Add Vehicle line 340b of the Program Menu 329 (FIG. 8). The program_vehicle function 400 is the function performed by the computer 114 when the developer wishes to add a programmed vehicle into the scenario. With this function, the developer can select the position in the simulated universe 146 that the programmed vehicle appears, the time on the scenario clock that it appears and the path that it drives through the simulated universe 146.

Initially, the computer 114, moves from a start state 400 to state 402 where it assigns the new programmed vehicle to be added, and its path through the simulated universe 146, as well as an identification number 000 to 255. This number is preferably the next highest available or unassigned number within the range 000 to 255 or the number specified by the developer on the line 340a (FIG. 9). After assigning the programmed vehicle an identification number, the computer 114 implements a function 404 entitled "show_vehicle". In the function 404, the computer 114 causes a series of vehicle types to be displayed to the developer on the video screen 122 (FIG. 1), allowing the developer to select the vehicle type for this programmed vehicle. The computer 114 then determines, in state 406, whether the developer has selected a vehicle type for the new programmed vehicle. If the developer has not selected one of the available vehicle types, the computer 114 returns to the "show_vehicle" function 404. Selection of vehicle types is preferably accomplished by using the select rocker switch 184 to move between displayed vehicles and the enter rocker switch to select the desired vehicle. In the preferred embodiment, the developer can select the programmed vehicle to be one of a police cruiser, a van, a truck, a compact, a sedan, a Jaguar, a Corvette and a Ferrari. Of course, the type of vehicle can be changed by programming, and could include any type of vehicle, including, for example, aircraft, boats, animals, etc. depending on the universe to be displayed. Graphical references of each of the vehicles are then stored in the memory of the computer 114 for subsequent replay.

If the developer has selected a vehicle type, the computer 114 then moves to state 408 and records in memory the vehicle type selected for this programmed vehicle. The computer 114 then performs a function 410 entitled "to_mark_observe" where the computer 114 generates on the video display 122 (FIG. 1) the simulated universe 146 and instructs the developer to drive to the position within the simulated universe 146 where he can observe the previously programmed vehicles within the scenario when the scenario is replayed. Once the developer has driven to this position and has appropriately signalled the computer 114, the computer then performs a function 412 entitled "replay_to_mark". In the "replay_to_mark" function 412, the computer 114 replays the previously programmed scenario from the Scenario Start Time as designated by the developer on the Scenario Start Time line 340e of the Program Menu 329 (FIG. 8). The computer 114 replays the scenario in the same manner it plays the scenario to a student 102 as previously described in reference to FIG. 4. Specifically, the computer 114 generates the previously programmed vehicles within the simulated universe 146 in substantially the same manner as described in relation in the "update_scenario" function 244 (FIGS. 4 and 6).

From the "replay_to_mark" function 412, the computer 114 moves to state 414 and determines whether the developer has pressed the select rocker switch 184 (FIG. 3). If the developer has not pressed the select rocker switch 184, the computer 114 returns to the "replay_to_mark" function 412 where it continues to replay the scenario as it was previously recorded.

If the developer has pressed the select rocker switch 184, the computer 114 proceeds to a function 416 entitled "to_program_observe". In the function 416, the computer 114 freezes the replay of the scenario by stopping the scenario clock, and instructs the developer to drive to the position within the simulated universe 146 that he desires the programmed vehicle being added to appear in the simulated universe 146 during this scenario. Hence, the computer 114 allows the developer to drive to a position in the simulated universe 146 where he can observe the previously programmed scenario as it unfolds, freeze the display and the scenario clock at a particular point in the previously programmed scenario and then drive to the position where he wishes the new programmed vehicle to appear.

After the developer has driven to this position, the developer presses the enter rocker switch 182 (FIG. 3) thereby signalling the computer 114 to perform a function 417 entitled "create_and_program." In the create_and_program function 417, the Computer 114 instructs the developer to drive the simulator in the simulated universe 146 in the manner that he wishes the new programmed vehicle to appear in the simulated universe 146. When the developer drives as instructed, the computer 114 starts the scenario clock, thereby restarting the scenario and initially records the start time and the start location for this vehicle, and then records the subsequent locations in the simulated universe 146 of the programmed vehicle until the developer signals to the computer 114 that he is finished programming the path of the programmed vehicle. From the "create_and_program" function 417, the computer 114 proceeds to a return state 418 where it returns the developer to the program menu 329.

Figure 10:
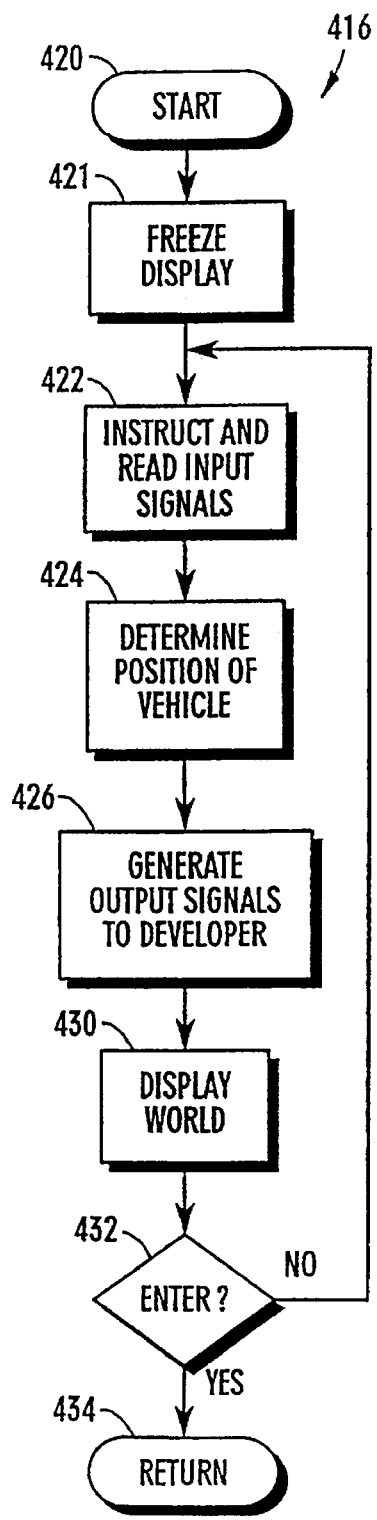
FIG. 10 is a flow diagram of a preferred embodiment of the "to_program_observe" function of FIG. 9.

FIG. 10 is a flow diagram illustrating the operation of the computer 114 when it is performing the "to_program_observe" function 416. From a start state 420, where the computer 114 is replaying the previously programmed scenario on the video 122 as seen from the position the developer drove to in the "to_mark_observe" function 410, the computer 114 moves to state 421 and freezes the video display 122 by stopping the scenario clock. The computer 114 moves to state 422 and instructs the developer to drive to the position in the simulated universe 146 where he wants the new programmed vehicle to appear and then reads the inputs provided by the developer via the input devices 104-112 (FIG. 1) while the developer drives to the desired position.

The computer 114 then moves to state 424 and determines the position of the vehicle in the simulated universe 146 by sending signals on the data path 118 to the model process 116 representative of the developer inputs on the input devices 104-112 (FIG. 1). The model process 116 then processes the input signals and determines the Cartesian coordinates of the developer in the simulated universe 146 relative to the starting position based on these inputs. The computer 114 then generates output signals to the developer in state 426. These output signals include sounds representative of driving transmitted via the speakers 123 and 124, as well as road feel cues transmitted via the speaker 136, and vehicle control feedback feelings transmitted via the steering wheel 112 and the brake pedal 106 (FIG. 1). The computer 114 then moves to state 430 and updates the image on the video display 122 to display the background, e.g., the streets 148, the sidewalks 152, the houses etc., of the simulated universe 146 based on the most recent determined position of the vehicle driven by the developer, as given by the model process 116 in state 424.

The computer 114 then checks, in decision state 432, to see if the developer has manipulated the enter rocker switch 182 (FIG. 3) indicating that he wants the computer 114 to begin recording the path of the programmed vehicle to be added. If the developer has not manipulated the enter switch 182 in decision state 432, the computer 114 returns to state 422 where it again reads the inputs provided by the developer. The computer 114 continues the loop comprising states 422 through 432 until the developer manipulates the enter rocker switch 182 once he has arrived at the desired starting position for the new programmed vehicle. Once the developer manipulates the enter rocker switch 182, the computer 114 moves to a return state 434 from which it initiates the "create_and_program" function 417. Hence, the to_program_observe function 416 allows the developer to drive in the simulated universe 146 to the desired starting position while the scenario clock is stopped and the other programmed vehicles are frozen in place in the simulated universe 146. This permits the developer to view the relative positions of each of the programmed vehicles in determining when a new programmed vehicle is going to enter into the simulated universe 146.

Figure 11:
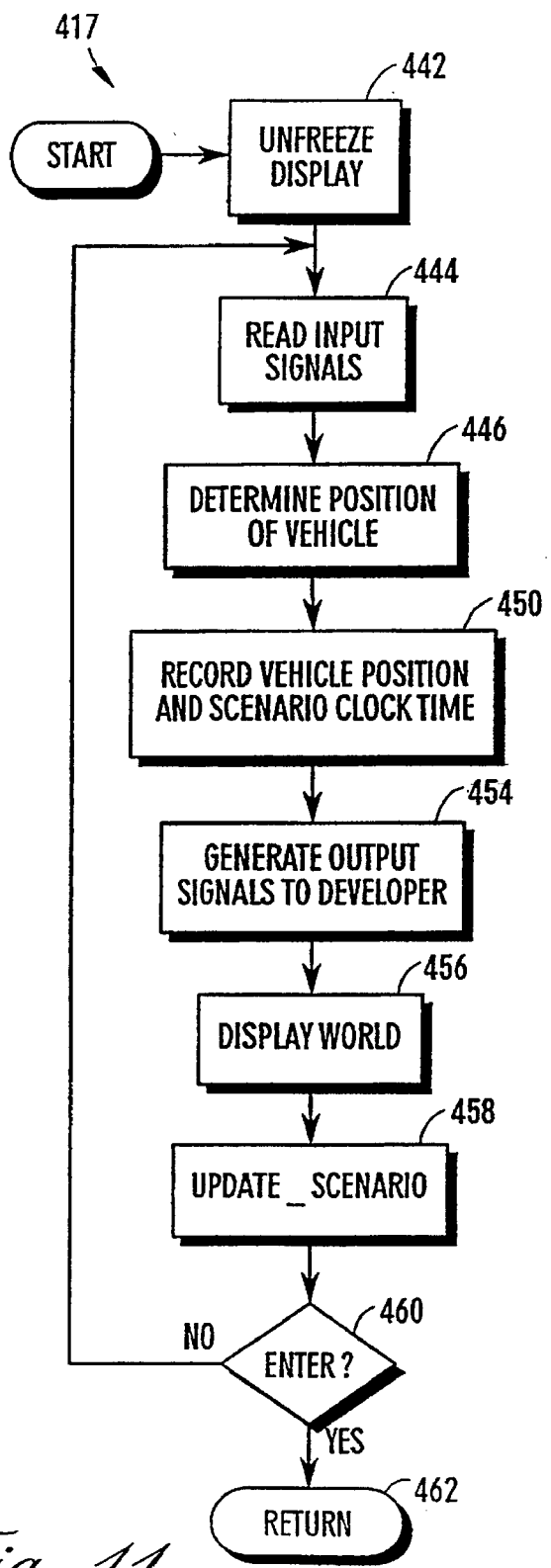
FIG. 11 is a flow diagram of a preferred embodiment the "create_and_program" function of FIG. 9.

FIG. 11 is a flow diagram illustrating the operation of the computer 114 as it executes the "create_and_program" function 417. In the function 417 the computer 114 allows the developer to program the path of a new programmed vehicle in the simulated universe 146 by simply driving the vehicle through the simulated universe 146 in the manner the developer wants the vehicle to perform. In a start state 440, the computer 114 displays the simulated universe 146 on the video display 122 (FIG. 1) from the position the developer drove the vehicle to in the "to_program_observe" function 410. The computer 114 then moves to state 442 and un-freezes the display by restarting the scenario clock, thereby permitting the positions of the already existing programmed vehicles to be updated along with the traffic lights 153. From the perspective of the developer, this results in the programmed vehicles beginning to move along their programmed paths through the simulated universe 146.

The computer 114 then moves to state 444 and reads the inputs provided by the developer via the input devices 104-112 (FIG. 1) as the developer drives the programmed vehicle on the desired path and in the desired manner through the simulated universe 146. The computer 114 then moves to state 446 and determines the position of the programmed vehicle while it is being driven by the developer in the simulated universe 146 via the model process 116 in the previously described manner. After this position is determined, the computer 114 moves to state 450 and records in memory the position of the programmed vehicle, as given by the model process 116 in state 446 and the time on the scenario clock at which the vehicle is at this position. The manner in which this data is recorded and stored in the memory of the computer 114 is described in greater detail below with reference to FIG. 23.

The computer 114 then generates output signals to the developer in state 454. These output signals include sounds representative of driving communicated via the speakers 123 and 124 as well as road feel cues transmitted via the speaker 136 and vehicle control feedback feelings sent via the steering wheel 112 and the brake pedal 106 (FIG. 1). The computer 114 also updates the video display 122 to display the background of the simulated universe 146 based on the latest position of the programmed vehicle, as given by the model process 116 in state 446.

The computer 114 then moves to state 458 and updates the position of the other programmed vehicles in the scenario to their positions and the state stop lights 15 at the current time on the scenario clock. Subsequently, the computer 114 determines, in decision state 460, whether the developer has manipulated the enter rocker switch 182 (FIG. 3) to thereby instruct the computer 114 to stop recording the path of the programmed vehicle.

If the computer 114 detects that the developer has not manipulated the enter rocker switch 182, the computer 114 returns to state 444 where it again reads the inputs provided by the developer. As can be appreciated, the computer 114 continues to loop through states 444-460 until the developer manipulates the enter rocker switch 182. Hence, the developer can program the programmed vehicle to appear in the simulated universe 146 and drive in a particular manner by simply driving the vehicle through the simulated universe 146 in the same manner as a student drives the observer vehicle when the scenario is being run.

If the computer 114 detects that the developer has manipulated the enter rocker switch 182, it then moves to a return state 462 where it generates the program menu 429 (FIG. 8) on the video display screen 122 and awaits the developer's next input. Hence, the developer, using the simulation system 100 of the present invention, can program vehicles to appear by simply driving the vehicle through the simulated universe 146 in the manner the developer wishes the vehicles to perform. In this preferred embodiment of the present invention, the other programmed vehicles are also active and moving in the simulated universe 146 while the developer is driving the new vehicle being programmed. Consequently, the developer can drive the new programmed vehicle in conjunction with the previously programmed vehicles to generate traffic conditions and events that the student will have to deal with when the simulation is run.

FIG. 12 is a flow diagram illustrating the operation of the computer 114 as it performs the "do_place_start" function 369 called by the scenario developer from the Set Start Up Position line 340c of the Program Menu 329 (FIG. 8). In a start state 370, where the computer 114 displays the simulated universe 146 on the video display 122 as seen from a default start position. The computer 114 then causes, in state 371, the video display 122 to display instructions to the scenario developer to drive, using the input devices 104–112, to the position in the simulated universe 146 that the developer wants the observer vehicle containing the student to be at the start of the simulation scenario.

The computer 114 then reads the inputs provided by the developer via the input devices 104–112 (FIG. 1) in state 372. The computer 114 then determines, in state 373, the position in the simulated universe 146 of the vehicle currently being driven by the developer by sending signals indicative of the developer's inputs on the input devices 104–112 to the model process 116. The computer 114 then generates output signals to the developer in state 374 which include sounds representative of driving communicated via the speakers 123 and 124 as well as road feel cues transmitted via the speaker 136 and vehicle control feedback feelings sent via the steering wheel 112 and the brake pedal 106. The computer 114 then moves to state 376 and causes the video display 122 to update the display of the background in the simulated universe 146, based on the position of the vehicle being driven by the developer, as given by the model process 116 in state 373.

After updating the background display of the simulated universe 146, the computer 114 checks, in decision state 380, to see if the scenario developer has manipulated the enter rocker switch 182 thereby indicating that he had selected the new starting position of the observer vehicle. If the computer 114 detects that the developer has not manipulated the enter rocker switch 182, then the computer 114 returns to the state 372 where it reads the input signals from the input devices again. The computer 114 continues the loop comprising states 372 through 380 until the developer manipulates the enter rocker switch 182. The loop comprising the states 372 through 380 enables the scenario developer to drive the vehicle through the simulated universe 146 to the desired starting position in the same fashion that the student drives the observer vehicle.

Once the computer 114 detects that the developer has manipulated the enter rocker switch 182 in decision state 380 indicating that the scenario developer has driven to the desired starting position in the simulated universe 146, the computer 114 then moves to state 302 and records in memory the new starting position for the observer vehicle for this particular scenario. After recording the new starting position, the computer 114 moves to a return state 384 from which the computer 114 returns the developer to the program menu 329 (FIG. 8). If the developer does not desire to create a new starting position for the observer vehicle for this scenario, the computer 114 then starts the observer vehicle at a pre-selected default position in the simulated universe 146. In this fashion, the developer of the scenario can program the starting position for the student in the observer vehicle when the scenario is running by simply selecting the Set StartUp Position line 340b on the Program Menu 330 and then driving to the desired location in the simulated universe 146.

FIG. 13 is a flow diagram illustrating the operation of the computer 114 implementing the "run timer" function 469 called by the developer selecting the Time Path line 340e in the Program Menu 320 (FIG. 8). The "run timer" function 469 permits the developer to time how long it takes to drive between locations within the simulated universe 146. Once the developer knows how long it takes to drive between two specific locations, he can use this information in scheduling when additional programmed vehicles appear in the simulated universe 146 so as to produce traffic conditions and events which may necessitate action by the student.

Referring now to FIG. 13, from a start state 470, the computer 114, in state 471, displays the simulated universe 146 to the developer via the video display 122 (FIG. 1) and permits the developer to drive in the simulated universe 146 to the position where the developer wishes to begin timing. The computer 114 then determines in decision state 472, whether the developer has pressed the select rocker switch 184 (FIG. 3) indicating that he wishes to begin timing. If the computer 114 determines that the developer has not pressed the select rocker switch 184 in decision state 472, the computer 114 returns to the state 471 where the developer continues to drive around the simulated universe 146. If the developer has pressed the select rocker switch 184 the computer 114 then initiates an internal stop watch timer in state 474. The internal stop watch timer records the amount of time, according to the scenario timer, between when the select switch 184 is pressed in the state 474 and when it is pressed again in state 478. After initiating the internal stop watch timer, the computer 114 proceeds to a driving sequence 476 where the computer 114 enables the developer to drive from one location to second location within the simulated universe 146 while incrementing and displaying the stop watch on the video display 122. The driving sequence 476 includes states similar to the states 371 to 376 in "do_place_start" function 369 shown in FIG. 12. The computer 114 then determines in decision state 478 whether the developer has pressed the select rocker switch 184 indicating that he wishes to stop the stopwatch. If the developer has not pressed the select rocker switch 184, then the computer 114 returns to the driving sequence state 476. If the developer has pressed the select rocker switch 184, then the computer 114 stops the stop watch and the resulting time is then displayed to the developer on the video display 122. From state 480, the computer 118 enters a return state 482 which returns the developer to the Program Menu 329 (FIG. 8).

In this fashion, the developer can use the stop watch to determine how long it will take to drive from one location to another within the simulated universe 146. This information can then be used by the developer to time programmed vehicles to appear at specific locations at specific times on the scenario clock. For example, if the developer wants to have a second programmed vehicle collide with a first programmed vehicle at an intersection, by knowing the time on the scenario clock when the first programmed vehicle will be at the intersection, the developer can use the stop watch to time how long it will take to reach the intersection driving the second programmed vehicle from its starting position within the simulated universe 146. Then, when the second programmed vehicle is added to the scenario, the developer can use this information to determine when, on the scenario clock, he must start driving the second programmed vehicle towards the intersection to collide with the first programmed vehicle.

Note, the foregoing description has described how the developer can develop a scenario where different programmed vehicles are programmed to drive along paths in the simulated universe 146. In this preferred embodiment, the developer can also place items, e.g., direction signs etc. in a similar fashion. Specifically, the developer, using the Add Vehicle line 340b, can also select the direction signs 151 (FIG. 2B), then enter a series of functions, similar to the above described functions, whereby the developer drives to the location in the simulated universe 146 where he wishes the traffic sign 151 to appear and then manipulates the enter rocker switch 182 into the set position to signal to the computer 114 to record the present location as the location for the direction signs. Hence, the developer can also develop a scenario where direction signs and other stationary objects can be located in the simulated universe 146 by simply driving through the simulated universe 146 to the desired location.

Figure 14:
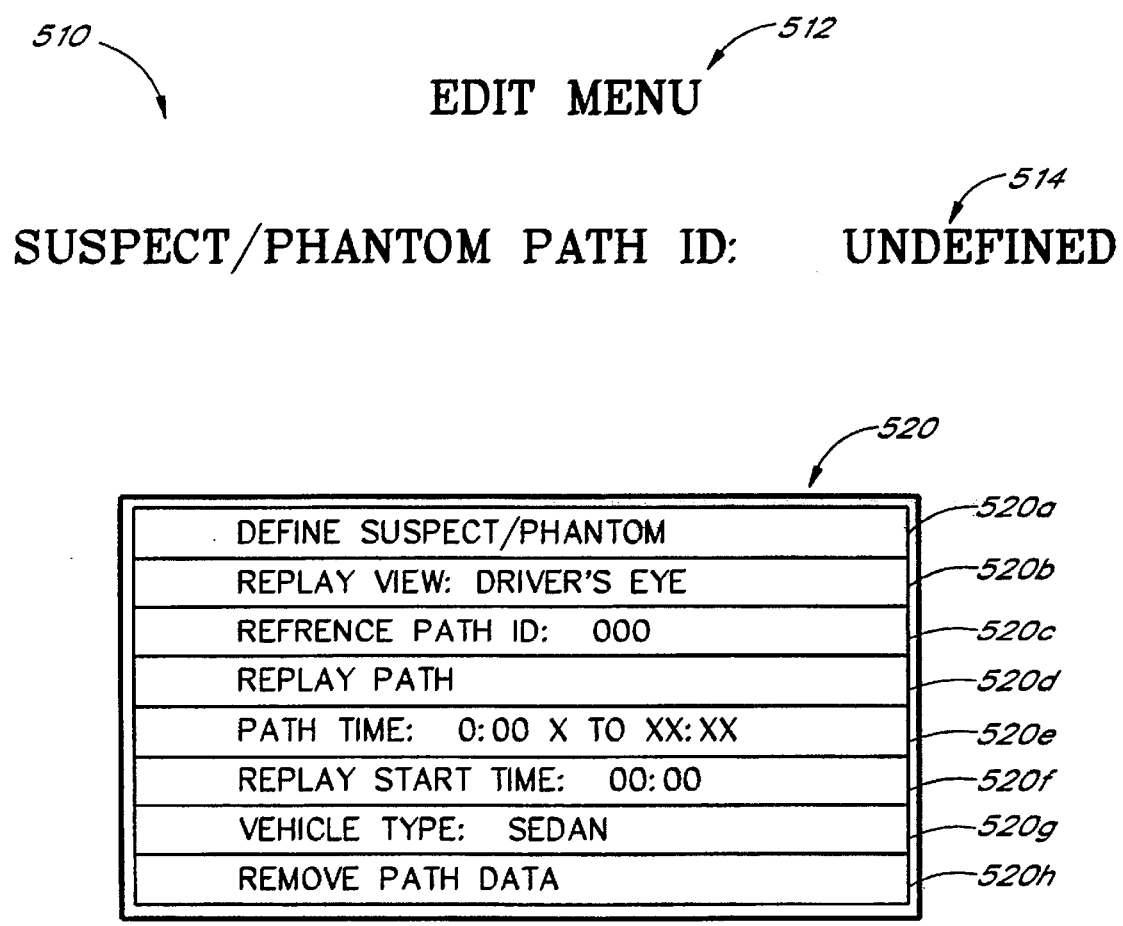
FIG. 14 is a diagram of an edit menu screen provided by the vehicle simulation system of the present invention.

FIG. 14 illustrates an exemplary Edit Menu 510 displayed by the computer 114 to the scenario developer on the video display 122 (FIG. 1) when the developer has selected the Edit Menu line 334c on the Developer Menu 320 (FIG. 7). From this menu the developer can further develop the simulation scenario by adjusting various features of the programmed vehicles and then replaying segments of the recorded scenario. The Edit Menu 510 includes an identifying header 512 and a Suspect/Phantom Path ID header 514 which identifies which vehicle path has been designated the path of either the phantom vehicle or the rabbit vehicle 150.

The Edit Menu also includes a box 520 which has a Define Suspect/Phantom Path line 520a, a Replay View line 520b, a Reference Path ID line 520c, a Replay Path line 520d, a Path Time line 520e, a Replay Start Time line 520f, a Vehicle Type line 520g and a Remove Path Data line 520h. The developer selects between these lines using the select and enter rocker switches 182 and 184 (FIG. 3) in the previously described manner. Note, in some preferred embodiments of the present invention the Suspect/Phantom Path ID header 514 is a line in the Menu Box 520 and it is used to define which of the programmed vehicles is to be the suspect or phantom vehicle. A person skilled in the art can appreciate that these menus can be modified in any of a number of different manners to facilitate use of the simulation system 100 of the present invention.

The Define Suspect/Phantom Path line 520a allows the developer to designate which of the previously programmed vehicles are to be designated either the rabbit vehicle 150, i.e., the suspect vehicle, or the phantom vehicle. As described previously, in a pursuit-type simulation, the developer can select one programmed vehicle to be the rabbit vehicle 150 that the student will pursue through the simulated universe 146. Consequently, the developer can drive a programmed vehicle through the simulated universe 146 in the fashion that he wishes the rabbit vehicle 150 to perform when the simulation is run for a student using the Add Vehicle line 340b of the Program Menu 329 (FIG. 1) and then designate this vehicle to be the rabbit vehicle using the Define Suspect/Phantom path line 520a.

In this preferred embodiment of the present invention, defining one vehicle to be the rabbit vehicle 150 causes the scenario clock to enter the rabbit adjust mode. In this mode the scenario clock adjustably increments depending upon how far the student driven observer vehicle is from the rabbit vehicle 150. Preferably, the scenario clock is incremented so that the rabbit vehicle 150 remains substantially a preselected distance from the student driven observer vehicle. If the student drives too far away from the rabbit vehicle 150 at which time the scenario clock stops incrementing and each of the programmed vehicles including the rabbit vehicle freeze in the simulated universe 146.

Since the scenario clock is incremented in the rabbit adjust mode so that a nearly constant distance is maintained between the student driven observer vehicle and the rabbit vehicle 150, the developer knows the approximate position the student driven observer vehicle will be in at any time on the scenario clock when the scenario is run. Consequently, the developer can program other vehicles to drive in proximity to the student driven observer vehicle in such a fashion that the student will be forced to respond accordingly.

Alternatively, the developer can also use the Define Suspect/Phantom path line 520a to designate one of the previously programmed vehicles to be the phantom vehicle. The developer can drive a programmed vehicle through the simulated universe 146 along an optimum path for the student and then designate this vehicle to be the phantom vehicle using the Define Suspect/Phantom path line 520a. In this preferred embodiment of the present invention, once the developer designates one of the programmed vehicles to be the phantom vehicle, the scenario clock is then programmed to increment according to the Phantom Adjust mode described previously in reference to FIG. 5. In this mode the scenario clock is incremented so that, when the scenario is running for a student, the relative distance between the programmed vehicles and the observer vehicle driven by the student is substantially the same as the relative distance between the programmed vehicles and the phantom vehicle.

Hence, the developer can develop a scenario by initially driving a first programmed vehicle through the simulated universe 146 along the path that the developer wishes the student to take when the simulation is run. The developer then drives additional programmed vehicles in the simulated universe 146 on the basis that the first programmed vehicle represents the path of the student driving the observer vehicle. The developer can easily develop traffic situations which require appropriate responses by the student since the first programmed vehicle is in substantially the same position the student will be in when he is driving through the scenario. For example, if the developer desires to force the student to avoid a vehicle swerving directly at the observer vehicle, the developer simply has to use the Add Vehicle line 340b of the Program Menu 329 and drive a programmed vehicle directly at the first programmed vehicle. The developer then has to designate the first programmed vehicle the phantom vehicle using the Define Phantom/Suspect Path line 520a on the Edit Menu 512.

Once the developer has selected the Define Suspect/Phantom Path line 520a, the computer 114 preferably enters a routine whereby the developer can initially select between defining a rabbit vehicle 150 or a phantom vehicle using the enter and select rocker switches 182 and 184 (FIG. 3). Subsequently, the computer 114 permits the developer to define the path by entering the three digit Path ID number assigned to the desired programmed vehicle using the select and enter rocker switches 182 and 184 in the previously described manner. Subsequently, the computer 114 records in memory the vehicle attributes for the programmed vehicle corresponding to the designated Path ID number that it is either the rabbit or phantom vehicle.

The Replay View line 520b allows the developer to select the view that he will have when replaying the previously programmed scenario. In this preferred embodiment, the developer can either select an overhead view, where the previously programmed scenario is replayed on the video display 122 from an overhead point of view or a driver's eye view where the scenario is replayed from the point of view of student driving in the simulated universe 146.

The Reference Path ID line 520c enables the developer to select which of the programmed vehicles is to be edited using the features of the Edit Menu 512. The developer selects the particular programmed vehicle by simply entering the three digit Path ID number corresponding to the selected vehicle using the select and enter rocker switches 182 and 184 in the previously described manner.

The developer can replay the previously programmed scenario by selecting the Replay Path line 520d. The computer 114 then replays the previously programmed scenario on the video display from either the overhead or the student's eye point of view. The replay begins at the start time designated by the developer via the Replay Start Time line 520f. This process is described in greater detail in reference to FIG. 15 below.

The Path Time line 520e allows the developer to change the time that the programmed vehicle identified by the Reference Path ID line 520e is active in the simulated universe 146. As described previously, each programmed vehicle is programmed by the developer to appear in the simulated universe 146 at a specific time, drive a particular path and then be removed at a specific time on the scenario clock. The developer, using the Path Time line 520e, can adjust when the referenced programmed vehicle appears in the simulated universe 146. In the preferred embodiment, the developer determines the new time on the scenario clock that he wishes the referenced programmed vehicle to appear in the simulated universe 146 and the computer 114 then adjust the path data for the referenced programmed vehicle so that it appears in the simulated universe 146 at the new time and is programmed to be positioned along its path and removed from the simulated universe 146 at a correspondingly different time on the scenario clock. Hence, if the developer determines that the programmed vehicle is appearing at an intersection too early, he can use the Path Time line 520e to make the referenced programmed vehicle appear in the simulated universe 146 and perform its operation at a later time.

As described above, the Replay Start Time line 520d allows the developer to select the time on the scenario clock that he wishes to begin replaying the path of the reference vehicle via the Replay Path line 520a. Further, the Vehicle Type line 520d allows the developer to change the type of vehicle selected for the reference programmed vehicle. As described above in reference to FIG. 8, the programmed vehicle can be defined, in this preferred embodiment, to be one of several different types of vehicles including a sedan, one of several types of sports cars and one of several types of trucks. Once the developer has changed the vehicle type, the computer 114 then changes the vehicle attributes for the referenced programmed vehicle that are stored in the memory (See, FIG. 23). After viewing a previously programmed scenario, the developer may wish to change the previously programmed vehicle type for a particular programmed vehicle to create a different visual image for the scenario. The Vehicle Type line 520g allows the developer to change the vehicle type and the developer can subsequently replay the scenario with the new vehicle type using the Replay Path line 520d.

Finally, the Remove Path Data line 520e allows the developer to remove the path data of the reference programmed vehicle identified in the header 519 if the developer decides to remove the referenced programmed vehicle. Subsequently, the developer can then replace the referenced programmed vehicle by returning to the Add Vehicle line 340b on the Program Menu 329 (FIG. 8).

Figure 15:
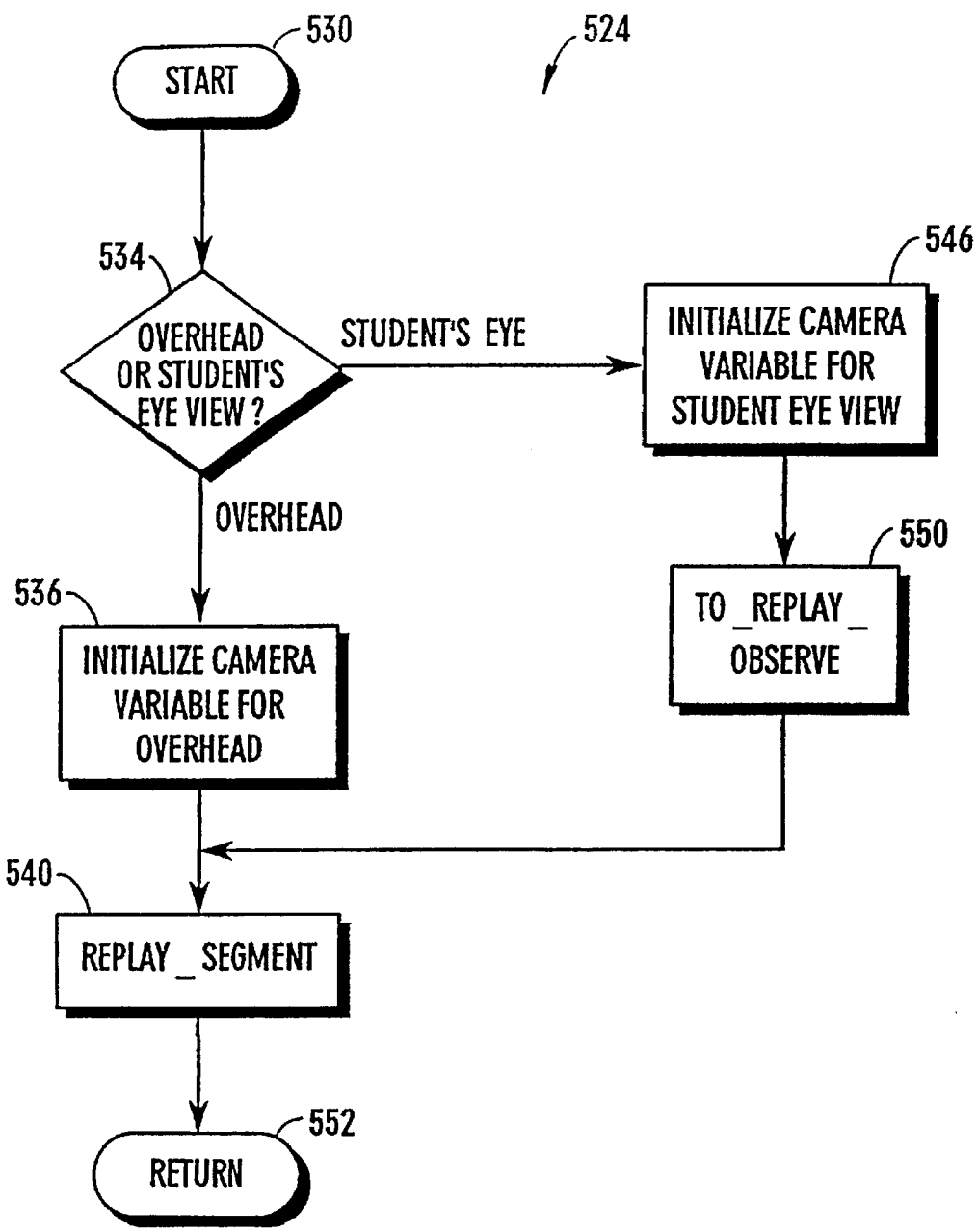
FIG. 15 is a flow diagram of a function for replaying the path of the rabbit or phantom vehicle called from the Replay Path line of FIG. 14, using the vehicle simulation system of the present invention.

FIG. 15 is a flow diagram illustrating the operation of the computer 114 as it implements a Replay Path function 524 called by the developer selecting Replay Path line 520e of the Edit Menu 510 (FIG. 14). From a start state 530, the computer 114 initially determines in decision state 534 whether the developer has selected to replay the scenario from the overhead point of view. If the developer has selected an overhead view via Replay View line 520b of the Edit Menu 510, the computer 114 initializes a camera angle variable (editview) in state 536 so that the computer 114 replays the scenario from an overhead point of view. The computer 114 then performs a "replay_segment" function 540 where the computer 114 recalls the paths of the programmed vehicles in the scenario from memory and replays the scenario on the video display 122 from the overhead point of view. This scenario is replayed from the start time designated by the developer via the Replay Start Time line 520f of the Edit Menu 510. As can be appreciated, the computer 114 can also be programmed to afford the developer different options for the overhead view so that the developer can view the scenario from differing heights above the ground. In this preferred embodiment, the computer 114 replays the scenario from the overhead point of view on the display screen in the replay_segment function 540 such that the display is centered on either the designated rabbit vehicle 150, the designated phantom vehicle or, if no rabbit vehicle or phantom vehicle has been designated, the referenced programmed vehicle identified on the Reference Path ID line 520c of the Edit Menu 510. The computer 114 proceeds from the "replay_segment" function 540 to a return state 882 where it returns the developer to the Edit Menu 510.

If, however, the computer 114 determines in decision state 534 that the developer has selected the driver's eye point of view on the Replay View line 520b on the Edit Menu 510, the computer 114 then initializes the camera variable (editview) indicating that a student's eye view has been selected in state 846. The computer 114 then performs a function 550 entitled "to_replay_observe". The "to_replay_observe" function 880 is substantially the same as the "to_program_observe" function 410 (FIG. 10 and FIG. 11) in that it instructs and permits the developer to drive to a position in the simulated universe 146 where he wants to observe the scenario as it unfolds.

The computer 114 performs the "replay_segment" function 540. Here, the computer 114 displays on the video screen 122 the programmed vehicles visible to the developer from his position in the simulated universe 146, and from the driver's point of view as the vehicle travels in the simulated universe 146 (FIG. 2) along the programmed path. The computer 114 also preferably permits the developer to follow the scenario through the simulated universe 146 by driving in the simulated universe 146 while the scenario is being replayed. At the end of the scenario the computer 114 moves to a return state 552 where it returns the developer to the Edit Menu 510. Hence, the developer can replay the previously programmed scenario and then use the features of the Edit Menu 510 to make alterations to the scenario which are then stored by the computer 114 in memory.

Figure 16:
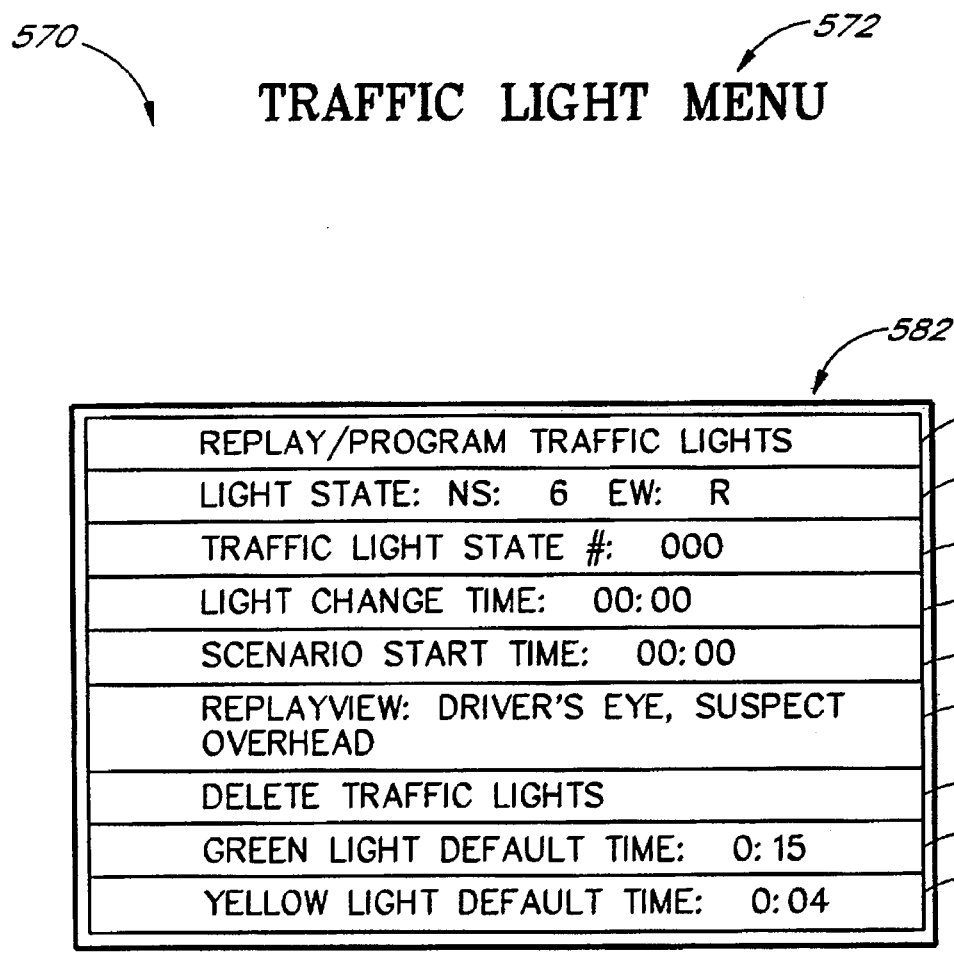
FIG. 16 is a diagram of a traffic lights menu screen provided by the vehicle simulation system of the present invention.

FIG. 16 illustrates an exemplary Traffic Lights Menu 570 displayed to the scenario developer when the scenario developer selects the Traffic Lights line 334d on the Developer Menu 320 (FIG. 7). The Traffic Lights Menu 570 enables the developer to program when, with reference to the scenario clock, the traffic lights 151 in the simulated universe 146 change. As previously discussed, in this preferred embodiment, a plurality of stop lights 151 (FIG. 2B) are positioned in the simulated universe 146 and each of these stoplights change states simultaneously, i.e., every light in the simulated universe 146 changes states at the same time on the scenario clock.

Referring now specifically to FIG. 16, the Traffic Light Menu 570 includes an identifying header 572b and a selection box 582 which includes Replay/Program Traffic Lights line 582a, a Light State line 582b, a Traffic Light State # line 582c, a Light Change Time line 582d, a Scenario Start Time line 582e, a Replay View line 582f, a Delete Traffic Lights line 582g, a Green Light Default Time 582h and a Yellow Light Default Time 582i. The developer moves and selects between the lines 582a–582i using the enter and select rocker switches 182 and 184 (FIG. 3) in the manner previously described.

In this embodiment, the developer can program each of the lights to change states at specific times on the scenario clock via the Replay/Program Traffic Lights line 582a on the Traffic Light Menu 570. For example, the developer can program the lights so that at a specific time on the scenario clock, the lights facing east-west change from green to yellow to red and the lights facing north-south change from red to green. Further, the developer can also use the Traffic Lights Menu 570 to review previously programmed traffic lights schedules.

Preferably, the computer 114 is programmed to display the words REPLAY TRAFFIC LIGHTS on the Replay/Program Traffic Lights line 582a when the traffic lights 151 have been previously programmed by the developer for this scenario. Consequently, if the developer wishes to review the previously programmed traffic lights 153, he can simply select this line and the computer 114 then generates the replay on the video display 122. The developer can also select the time on the scenario clock that he wishes the replay to begin using the Scenario Start Time line 582e. This option also allows him to select the view that he has of the lights when the scenario is replayed using the Replay View line 582f. Specifically, the developer can either see the lights from the point of view of the student or a driver driving through the simulated universe 146, or from the overhead point of view looking down on either the rabbit or phantom vehicle as they travel through the simulated universe 146 along their pre-programmed paths. A Replay Lights function 630 performed by the computer 114 when the Replay/Program Traffic Lights line 582a is selected, and the traffic lights 153 have been previously programmed to change states at selected times on the scenario clock, is described in greater detail in reference to FIG. 18 below.

Preferably, when the developer is adding programmed vehicles via the Add Vehicle line 340a of the Program Menu 329 (FIG. 8), the computer 114 displays each of the visible stoplights 153 to the developer on the video display 122 while the developer is driving in the simulated universe 146. The computer 114 also simultaneously implements any programmed traffic light change schedule or the default traffic light change schedule. The developer can, however, change the default times for the lights by selecting the Green Light Default Time line 582h or the Yellow Light Default Time line 582i. Specifically, the Green Light Default Time is the time on the scenario clock that one set of opposite faces, e.g., the east-west faces, on each of the stop lights 153 in the simulated universe 146 displays a green light. Similarly, The Yellow Light Default Time is the time on the scenario clock that one set of opposite faces on each of the stop lights 153 displays a yellow light. The length that one set of faces, e.g., the north-south face, displays a red light is, of course, the sum of the Green Light Default time and the Yellow Light Default time. Hence, the developer, by changing the Green Light Default Time and the Yellow Light Default time can also change the Red Light Default time. Preferably, when the developer is adding programmed vehicles via the Add Vehicle line 340a of the Program Menu 329 (FIG. 8), the computer 114 displays each of the visible stoplights 153 to the developer on the video display 122 while the developer is driving in the simulated universe 146. The computer 114 then also implements any programmed traffic lights schedule or the default traffic lights schedule.

As previously discussed, the computer 114 is preferably programmed to display the words REPLAY TRAFFIC LIGHTS on the Replay/Program Traffic Lights line 582a when the developer has previously programmed a schedule for the traffic lights 153. Similarly, the computer 114 is also programmed to display the words PROGRAM TRAFFIC LIGHTS on the line 582a when the developer has not previously programmed a schedule for the traffic lights 153. If there is no previously programmed traffic light schedule for the scenario under development, the developer can program a schedule by selecting the Replay/Program Traffic Lights line 582a. Once this line is selected, the computer 114 performs a function whereby the developer can develop a schedule for changing the traffic lights 153 at different times by either driving through the scenario or by looking down from an overhead view at the simulated universe 146 and the programmed vehicles contained therein. The computer 114 performs a "Do_Program_Lites" function 590, which allows the developer to develop the traffic lights change schedule for a scenario is more fully described in reference to FIG. 17 below.

If, however, the developer has already programmed the traffic lights to change according to a specific schedule, and the developer wishes to change this schedule, the developer can delete the existing schedule using the Delete Traffic Lights line 582g and thereby cause the computer 114 to erase the previously programmed schedule. Subsequently, the developer can then select the Replay/Traffic Light line 582a, which then displays the prompt PROGRAM TRAFFIC LIGHTS, causing the computer 114 to enter the Program Traffic Lights function 590 (FIG. 17) and the developer can then program a new schedule.

Finally, the developer can also review the traffic lights change schedule by selecting the Traffic Light State #line 532c. Specifically, each time the developer changes the state of the traffic lights 153 when programming the traffic lights using the "Do_Program_Lites" function 590, the state of the traffic lights is sequentially assigned a three digit identification number. The developer can then recall this number on the Traffic Light State # line 532c, and the computer 114 displays the programmed state of the traffic lights on the Light State line 582b and the time at which the traffic lights entered this state on the Light Change Time line 582d. Hence, the developer can program, replay and edit schedule for changing the traffic lights using the Traffic Light Menu 570. The programming of a new traffic lights change schedule and replaying of a previously programmed traffic lights change schedule will now be described in reference to FIGS. 17 and 18.

Figure 17:
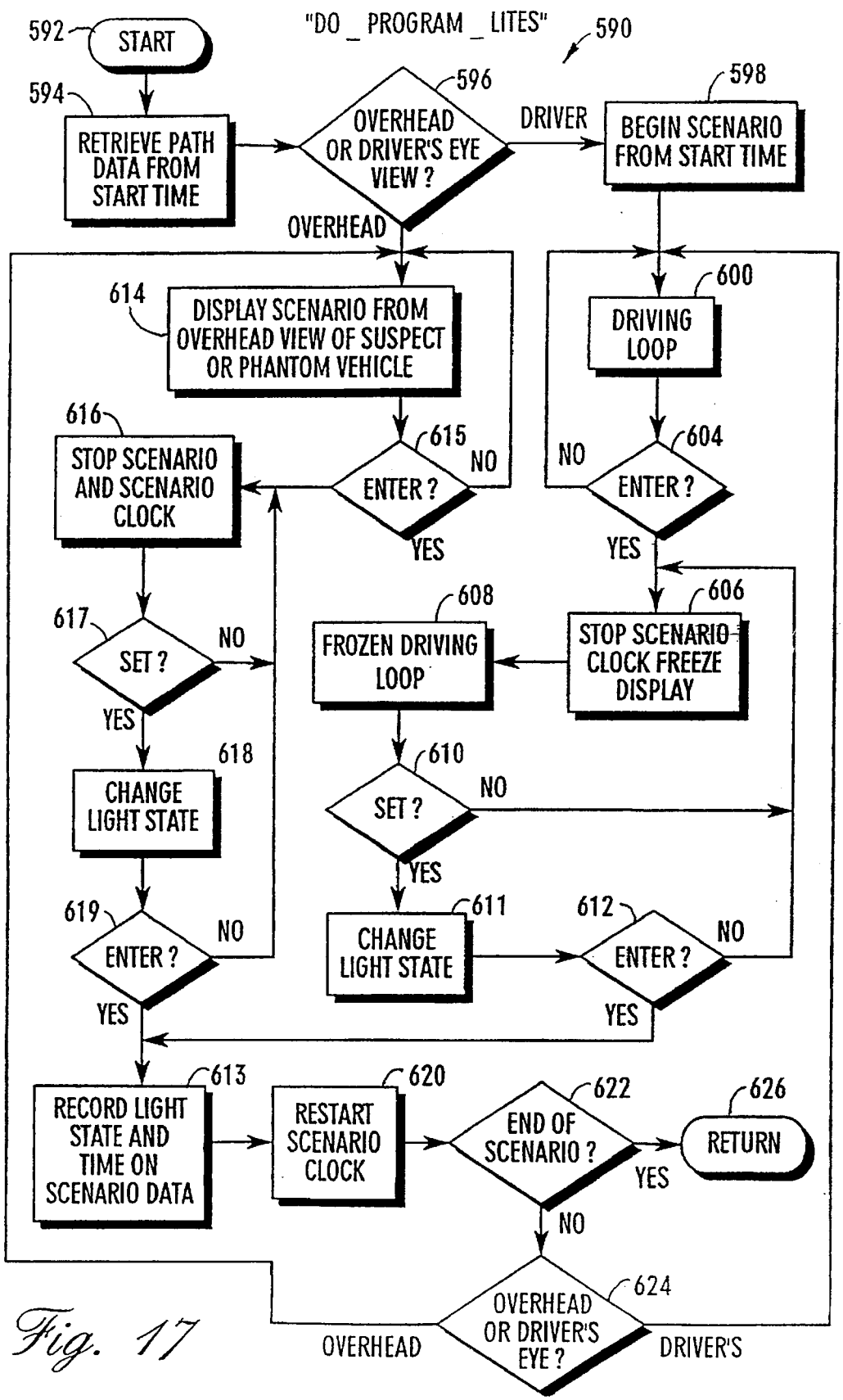
FIG. 17 is a flow diagram of a preferred embodiment of a "do_program_lites" function called from the Traffic Lights Menu of FIG. 16 which allows the scenario developer to program the traffic lights in the simulated universe to change states.

FIG. 17 is a flow chart illustrating the operation of the computer 114 as it performs the "Do_Program_Lites" function 590 called by the developer selecting the line 582a of the Traffic Lights Menu 570. From a start state 592, the computer 114, in state 594, retrieves all of path data describing the paths of the programmed vehicles through the simulated universe 146 beginning from the start time on the scenario clock which the developer specified via the Scenario Start Time line 582e of the Traffic Light Menu 570.

The computer 114 then determines in decision state 596 whether the developer has selected to program the new traffic lights schedule from the viewpoint of a driver driving through the simulated universe 146 or from an overhead viewpoint looking down on the simulated universe 146. The developer selects the desired viewpoint using the Replay View line 582f of the Traffic Lights Menu 570. If the developer has selected the driver's eye view option on the Replay View line 582f, the computer 114 enters a loop whereby the developer programs the traffic lights 153 by driving through the simulated universe 146 as the scenario is running. FIGS. 2 and 2A show an exemplary view of a portion of a programmed scenario underway in the simulated universe 146 as seen from the driver's eye viewpoint.

Figure 22:
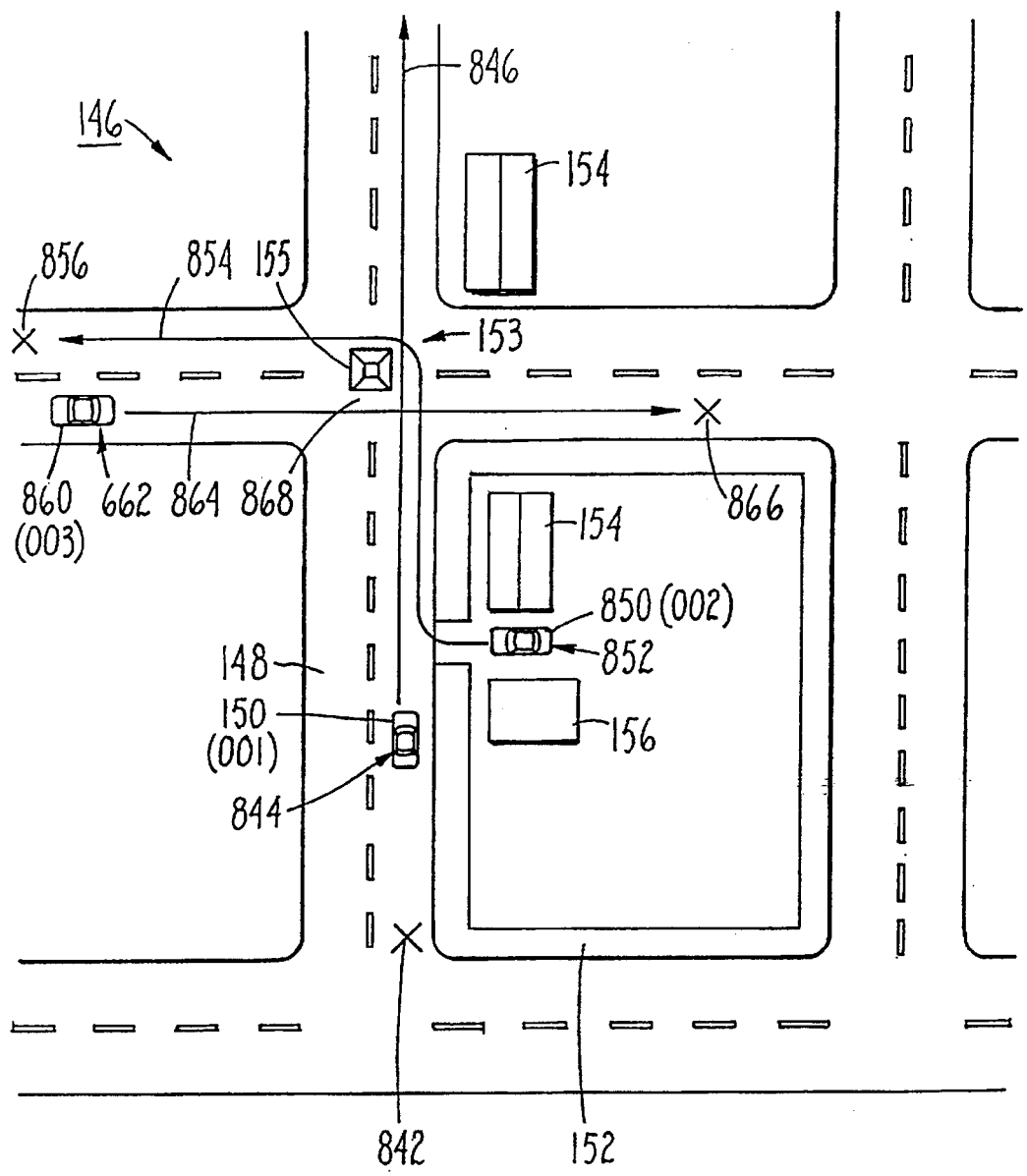
FIG. 22 is an overhead view illustrating a portion of a simulated universe containing vehicles and vehicle paths programmed by the developer using the vehicle simulation system of the present invention.

However, if the developer has selected the overhead view option, the developer programs the traffic lights 153 by looking down at either the rabbit vehicle 150 or the phantom vehicle as either of these Vehicles travel through the simulated universe 146. The developer selects between the overhead view and the driver's eye view via the Replay View line 582f of the Traffic Light Menu 570 (FIG. 16). The overhead view option essentially uses the rabbit or phantom vehicle as a reference vehicle and it also displays all of the other programmed vehicles scheduled to appear in the simulated universe 146. FIG. 22 shows an exemplary view of a portion of a programmed scenario underway in the simulated universe 146 as seen from the overhead viewpoint.

Assuming that in state 596 the computer 114 determines that the developer selected to program the traffic lights 153 from the driver's eye viewpoint, the computer 114 moves to state 598 and initiates the programmed scenario from the point of time on the scenario clock specified by the developer via the Scenario Start Time line 582e (FIG. 16). The computer 114 then initiates a driving loop in state 600 which is similar to the loop comprised of states 226–248 shown in FIG. 4 whereby the developer can drive a vehicle using the player input controls 104–112 (FIGS. 1 and 3) in the simulated universe 146. In this situation, the computer 114 continuously provides feedback to the developer via the video display 122 i.e., updating the background display and the position of the active programmed vehicles, the speakers 123 and 124 and the low frequency speaker 136.

After each performance of the driving loop 600, the computer 114 moves to state 604 and determines whether the developer has manipulated the enter rocker switch 182 (FIG. 3). The developer manipulates the enter rocker switch 182 to stop the scenario clock and thereby freeze the scenario. If the computer 114 determines that the developer has not manipulated the enter rocker switch 182, the computer 114 continues to perform the driving loop 600 where the scenario is updated based on the recalled programmed data. The position of the developer driven observer vehicle in the simulated universe 146 is also updated based input signals provided by the developer from the input devices 104–112. Once the computer 114 determines that the developer has manipulates the enter rocker switch 182, the computer 114 moves to state 606 and freezes the scenario by stopping the scenario clock.

The computer 114 then initiates a frozen driving function 608 similar to the "to_program_observe" function 416 (FIGS. 9 and 10) whereby the developer can drive through the simulated universe 146 while the stoplights 153 and the programmed vehicles remain in their frozen state. This allows the developer to drive to a particular stoplight 153 and observe the positions of the currently active programmed vehicles with respect to this particular stoplight 153 at or about the time the developer wants the light to change state.

The computer 114 then determines in decision state 610 whether the developer has manipulated the enter rocker switch 182 into the set position 183 (FIG. 3). Once the developer manipulates the enter rocker switch 184 into the set position 183, the computer 114 changes the state of the stoplights 153 in state 611. As described above, the stoplights 153 display either red, yellow or green lights on either the east-west or the north-south faces. The computer 114 can be programmed to sequentially change the state of the stoplights 153 from state to state in response to the developer manipulating the enter rocker switch 184. Once the stoplights 153 are in the desired state, the developer manipulates the enter rocker switch 184 tor ecord the new light state and the current time on the scenario clock in memory and to restart the scenario in states 613 and 620 respectively. In one implementation of the present invention, the computer 114 records the new traffic light state in memory each time the developer manipulates the enter rocker switch 182 into the set position 183 and then awaits the developer manipulating the enter rocker switch 182 again before starting the scenario clock. A person skilled in the art however can appreciate that these implementations are essentially equivalent.

Upon determining that the developer has manipulated the enter rocker switch 182 into the set position in decision state 612, the computer 114 proceeds to state 613 where it records in memory the state of the stoplights 153 and the current time on the frozen scenario clock as the next scheduled change for the stoplights 153. Thus, the developer can program the stoplights 153 to change by driving through the simulated universe 146 while the scenario is being run, manipulate the enter rocker switch 182 to freeze the scenario, change the state of the traffic lights 153 by manipulating the enter rocker switch 182 into the set position 183 and record the desired state of the traffic light 153 by again manipulating the enter rocker switch 182. Alternatively, the simulation system 100 of the present invention also permits the developer to change the light states without freezing the display by simply replaying the scenario, driving through it and manipulaing the enter rocker switch 182 into the set position 183 each time the developer desires to change the traffic light states.

Similarly, if the computer 114 determines in decision state 596 that the developer has selected the overhead view via the Replay View Line 582f on the Traffic Light Menu 570 (FIG. 16), the computer 114 begins to replay the scenario in state 614 beginning at the time on the scenario clock specified by the developer via the Scenario Start Time line 582e.

Preferably, if the developer has designated one of the programmed vehicles to be a rabbit vehicle 150 in a pursuit simulation scenario, the computer 114 centers the rabbit vehicle 150 in the center of the video display 122 and then displays this rabbit vehicle 150 travelling through the simulated universe 146 along its preprogrammed path. Further, as other programmed vehicles travelling on their respective preprogrammed paths come within the area of the simulated universe 146 shown on the video display 122, the computer 114 also displays these vehicles travelling on their respective preprogrammed paths through this portion of the simulated universe 146. Similarly, if the simulation is a driver's test scenario, and the developer has designated a phantom vehicle, the computer 114 displays on the video display 122 the simulated universe 146 from the overhead view, in the same fashion as described above, with the display centered on the phantom vehicle.

The computer 114 continues to replay the scenario in this fashion until the computer 114 detects that the developer has manipulated the enter rocker switch 182 in decision state 615. The developer manipulates the enter rocker switch 182 when the developer wishes to change the current state of the traffic lights 153, to thereby cause the computer 114 in state 616 to stop incrementing the scenario clock and freeze the motion of the programmed vehicles, including the phantom vehicle. The traffic lights 153 are also frozen in their current states. Preferably, the computer 114 is programmed to display the traffic lights 153 from the overhead view in a fashion such that the developer can determine the state of the traffic lights 153, i.e., whether green, red or yellow lights are showing on the east-west and north-south faces of the lights. In this preferred embodiment, the traffic lights 153 in the overhead view are represented by squares positioned in intersections having four colored panels 155 which indicate the color of the corresponding face of the traffic light as is more clearly shown in FIG. 22.

The developer can then change the current state of the traffic lights 153 by manipulating the enter rocker switch 182 into the set position 183 (FIG. 3) which results in the state of the traffic lights 153 changing between red, green and yellow of the east-west and north-south faces of the traffic lights 153 in the previously described fashion. Specifically, the computer 114 determines in decision state 617 whether the developer has manipulated the enter rocker switch 182 into the set position 183 and, once the developer has manipulated this switch, the computer 114 moves to state 618 and changes the state of the traffic light 153 presently displayed to the developer.

The computer 114 then determines in decision state 619 whether the developer has manipulated the enter rocker switch 182 to thereby indicate that he has selected the new state of the traffic lights 153. The computer 114 preferably continues to loop through states 614 to 619 until the developer has manipulated the enter rocker switch 182 Once the computer 114 determines that the developer has selected the new state of the traffic light 153 in decision state 619, the computer 114 then moves to state 613 and records the new light state and the time, according to the scenario clock, that the traffic lights 153 are to scheduled to enter the new light state. The time on the scenario clock that is recorded in state 613 is the current time on the scenario clock that was stopped in state 616.

Once the computer 114 has recorded the new traffic light state and the time on the scenario clock that it is scheduled to occur, the computer 114 then proceeds to state 620 where it restarts the scenario clock and the movement of the programmed vehicles through the simulated universe 146 in state 620. As previously described in another preferred implementation of the present invention, the computer 114 records the new traffic light state in memory each time the developer manipulates the enter rocker switch 182 into the set position 183 and then awaits the developer manipulating the enter rocker switch 182 again before starting the scenario clock. Alternatively, the simulation system 100 also permits the developer to program traffic lights from the overhead point of view without freezing the display by simply replaying the scenario and manipulating the enter rocker switch 182 into the set position 183 each time the developer wishes the traffic lights to change states.

After restarting the scenario clock in state 620 the computer 114 then determines in decision state 622 whether the end of the scenario being replayed has occurred. If the computer 114 is not at the end of the scenario, the computer 114 proceeds to determine whether the developer had selected the overhead view or the driver's eye view to program the new traffic lights schedule which the computer 114 previously determined in decision state 596.

If the developer had selected the overhead view, the computer 114 returns to state 614 where the programmed scenario is updated. Similarly, if the developer had selected the driver's eye view, the computer 114 returns to state 600 where the computer 114 continues the driving loop permitting the developer to drive to the next desired stop light 153 in the simulated universe 146.

Hence, the computer 114 permits the developer to program a new schedule for the traffic lights by either allowing the developer to drive through the simulated universe 146 as the programmed scenario is running, or by allowing the developer to see an overhead view of the scenario as it is running. The developer can then schedule the traffic lights 153 to change states at times on the Scenario clock when a student driving an observer vehicle in the simulated universe 146 during operation of the scenario will be at or approaching an intersection. Further, since the developer programs the new traffic lights schedule while the programmed scenario is being displayed, the developer can also program the lights such that the previously programmed vehicles run red stop lights and the like. For example, the developer can schedule the traffic lights so that they are green for the student driving an observer vehicle and the developer can also program a programmed vehicle to drive through the intersection, running a red light, at the same time as the student either approaches or is in the same intersection with the right of way.

Figure 18:
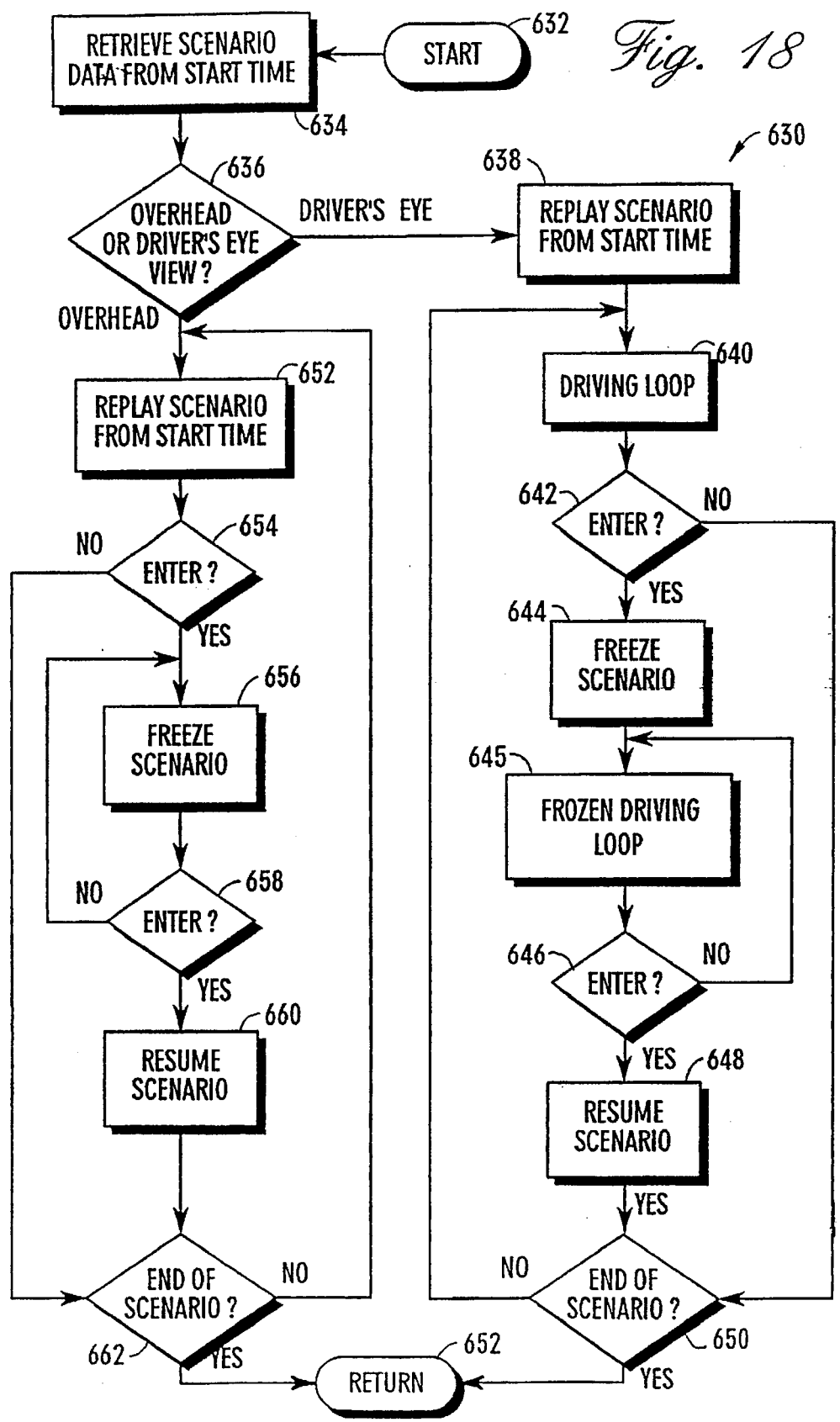
FIG. 18 is a flow diagram of a preferred embodiment of a function called from the Traffic Lights Menu shown in FIG. 16 which replays the scenario and displays the changing states of the traffic lights in the simulated universe.

FIG. 18 is a flow chart illustrating the operation of the computer 114 as it performs the Replay Traffic Lights function 630 called by the developer selecting the line 582a of the Traffic Lights Menu 570 when a traffic lights change schedule has been previously programmed by the scenario developer. From a start state 632, the computer 114 proceeds to retrieve from memory the previously programmed scenario, including the programmed vehicle path data, the traffic lights schedule, and the physical features of the simulated universe 146 in state 634 from the start time designated by the developer on the Scenario Start Time line 582e of the Traffic Light Menu 570.

The computer 114 then enters state 636 and determines whether the developer has selected to view the replay of the previously traffic lights change schedule from either the overhead viewpoint or the driver's eye viewpoint, as selected by the developer on the Replay View line 582f of the Traffic Light Menu 572. If the developer has selected to replay the traffic lights change schedule from the driver's eye viewpoint, the computer 114 moves to state 630 and initiates the replaying of the scenario from the start time given by the developer on the line 582e of the Traffic Lights Menu 570. Subsequently, the computer 114 enters a driving loop in state 640, substantially similar to the loop comprised of states 226–248 shown in FIG. 4, wherein the developer can drive, in the simulated universe 146 with the computer 114 replaying the previously developed portion of the scenario in the same fashion it replays the scenario for a student.

While in the driving loop 640, the developer can manipulate the enter rocker switch 182 (FIG. 3) to freeze the scenario being displayed. Specifically, once the computer 114 determines that the developer has manipulated the enter rocker switch 182 in decision state 642, the computer 114 proceeds to state 644 and stops the scenario clock, thereby freezing the display, such that the programmed vehicles are not moving and the stop lights 153 do not change. Subsequently, the computer 114 enters a function 645 similar to the "to_program_observe" function 416 (FIGS. 9 and 10) whereby the developer can drive through the simulated universe 146 even while the programmed vehicles and stop lights 153 are frozen. The developer can stop the scenario and drive to a different vantage point to view the programmed scenario and, once the developer is at this vantage point, the developer can manipulate the enter rocker switch 182 to restart the scenario. Hence, the computer 114 determines if the developer has restarted the scenario in decision state 646. If the developer hasn't restarted the scenario, the computer 114 returns to the function 645 permitting the developer to continue to drive through the simulated universe 146 with the programmed vehicles and the stop lights 153 frozen.

If the developer has manipulated the enter rocker switch 182 in state 646, the computer 114 then restarts the scenario clock in state 648 and continues with the scenario. The computer 114 then determines whether it has replayed the entire programmed scenario in decision state 650. If the entire scenario has been replayed, the computer 114 then moves to a return state 652 in which the computer 114 returns the developer to the Traffic Lights Menu 570 (FIG. 16). If the entire scenario has not been replayed, the computer 114 returns to the driving loop 640. In this fashion, the computer 114 loops through the states 640–652 until the scenario has been completely replayed, while allowing the developer to selectively stop the replay and drive to particular vantage points in the simulated universe 146.

If the computer 114 determines in decision state 636 that the developer has selected to replay the scenario from the overhead viewpoint by selecting the overhead option on the Replay View line 582f of the Traffic Lights Menu 570 (FIG. 16), the computer 114 then moves to state 852 and initiates replaying the preprogrammed scenario from the start time indicated by the developer on the Scenario Start Time line 582e of the Traffic Lights menu 570. As described previously, the overhead option preferably displays the simulated universe 146 from an overhead perspective (see FIG. 22), with the display centered about either the rabbit vehicle 150 or the phantom vehicle.

While the scenario is replaying, the computer 114 periodically determines whether the developer has manipulated the enter rocker switch 182 to freeze the replay. If the computer 114 determines in decision state 654 that the developer has manipulated the enter rocker switch 182, the computer 114 then stops incrementing the scenario clock. This results in the programmed vehicles and the stoplights 153 being displayed on the video display 122 (FIG. 1) freezing into their respective positions and states at the time indicated by the scenario clock when it was stopped. The scenario remains frozen until the computer 114 determines that the developer has manipulated the enter rocker switch 182 in decision state 658, at which time the computer 114 resumes incrementing the scenario clock and thereby updates the positions of the programmed vehicles and the state of the stop lights 153.

The computer 114 continues to replay the scenario until it determines in decision state 662 that it has reached the programmed end of the scenario. The computer 114 then proceeds to the return state 652 which returns the developer to the Traffic Lights Menu 570.

Note, in this preferred embodiment when the developer has selected the driver's eye view and is developing a traffic light schedule by driving the observer vehicle through the simulated universe 146, and also when the developer has selected the overhead view and is developing a traffic light schedule in that fashion, the traffic lights 153 are changing states according to the default times selected by the developer on the Green Light Default Time line 582h and the Yellow Light Default Time line 582i of the Traffic Light Menu 570 (FIG. 16). From the driver's eye view, the traffic lights 153 appear as they do in FIG. 2B with the light when they are shown the student driving the simulation scenario. In this preferred embodiment, the computer 114 displays the traffic lights with colors on each of the set of opposite faces i.e., the east-west face and the north-south face, indicating the current state of the traffic light 153, as is more clearly shown in FIG. 22.

Hence, using the simulation system 100 of the present invention, the developer can develop scenarios for students in a simulated universe containing traffic lights. Further, the developer can also easily schedule the traffic lights to change at times when the student driving an observer vehicle in the scenario will be approaching a traffic light. This allows the developer to develop scenarios where, for example, the student will have to suddenly brake for a traffic light and the like.

Figure 19:
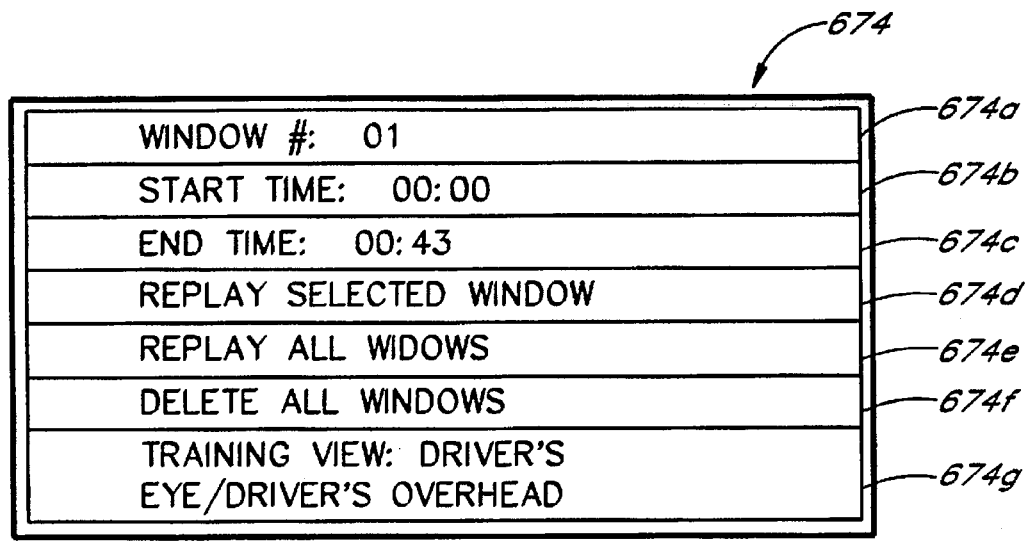
FIG. 19 is a diagram of a replay window menu provided by the vehicle simulation of the present invention which allows the developer to specify particular windows, or periods of time, of the scenario that will be replayed to the student once the student has completed the scenario.

FIG. 19 illustrates an exemplary Replay Window Menu 670 that the developer sees on the video display 122 upon selecting the Replay Windows line 334e on the Developer Menu 320. The Replay Window Menu 670 includes a Replay Window Menu header 672 identifying the menu and a selection box 674 containing a Window # line 674a, a Start Time line 674b, an End Time line 674c, a Replay Selected Window line 674d, a Replay All Windows line 674e, a Delete All Windows line 674f and a Training View line 674g. The developer selects between these lines using the enter rocker switch 182 and the select rocker switch 184 in the previously described manner.

By selecting the Replay Window Menu 670, the developer can pre-program the driving simulation system 100 to record a selected portion of the student's path through the simulated universe 146. Specifically, the developer can select portions of time on the scenario clock, i.e., windows of time, whereby the computer 114 records the path of the student driving the observer vehicle while the developed scenario is being run for a student, along with the path of the programmed vehicles in the simulated universe 146 for that period of time on the scenario clock. Subsequently, after the student finishes the scenario, the computer 114 then preferably replays the windows to the student on the video display 122 to permit the student to see how he performed in the driving simulation. Consequently, the developer can, for example, develop a scenario and create a traffic condition that requires a specific response by the student, and then program the computer 114 to replay the portion of the scenario, as it was driven by the student, wherein the traffic condition occurred once the student has completed the entire simulation. Hence, the student can be given feedback on his driving performance during specific times when particular events occurred without having to see the entire scenario.

Referring specifically to FIG. 19, the Start Time Line 674b and the End Time line 674c indicate the time on the scenario clock that the window, identified by the Window # line 674a, begins and ends. The developer programs a window by simply assigning the window an identification number on line 674a and then programming the start time and the end time on the scenario clock for the window using the lines 674b and 674c respectively. In this preferred embodiment, the developer assigns a window an identification number by simply entering the start and end times for the window via the lines 674b and 674c. The computer 114 then automatically assigns the window the next available identification number which is shown on the line 674a. The developer enters the start and end times using the select and enter rocker switches 182 and 184 (FIG. 3) in the manner previously described in reference to FIG. 7.

The developer can also replay a selected window by identifying the window on the line 674a using the rocker switches 182 and 184 and then selecting the Replay Selected Window line 674d. Further, the developer can replay all of the windows using the Replay All Windows line 674e. When the developer is replaying either a selected window or all of the windows, the computer 114 preferably displays on the video screen 122 (FIG. 1) the paths of the programmed vehicles through simulated universe 146 during the time period on the scenario clock specified for this window from an overhead point of view. This allows the developer to determine whether the replay window will replay the student's path during a specific programmed traffic event.

The developer can also delete each of the previously programmed windows using the Delete All Windows line 674f. After deleting all of the existing windows, the developer can then program a new set of windows if he so desires. Further, the developer can also select between Driver's Eye view and Driver's Overhead view for the view that the student will have for each window is replayed via the Training View line 674g. When the developer has selected the overhead view, the computer 114 replays the recorded window of the scenario as it was driven by the student, showing the positions of the vehicles as seen from an overhead position where the position of the vehicle driven by the student is centered in the video display 122. Similarly, when the developer has selected the Student's Eye view for a particular window, the computer 114, when it replays the recorded window, replays it on the video display 122 from the point of view of the student driving the vehicle. As can be appreciated, replaying the scenario from this point of view allows the student to review exactly how he responded to certain driving conditions as he actually perceived them when driving in the scenario.

FIG. 20 illustrates an exemplary Traffic Control menu 700 that appears on the video display 122 when the developer selects the Traffic Control line 334f on the Developer Menu 320 (FIG. 7). The Traffic Control menu 700 allows the developer to change the parameters governing the incrementing of the scenario clock and the consequent updating of the positions of the programmed vehicles in the simulated universe 146 when the scenario is being run for a student. The Traffic Control Menu 700 includes an identifying header 702 and a box 704 containing a Replay Traffic Control line 704a, a Traffic Control Entry # line 704b, a Traffic Control Time line 704c, a Traffic Control Distance line 704d, a Scenario Start Time line 704e, a Replay View line 704f and a Delete Control Entries line 704g. The developer selects between the lines 704a–704g using the select and enter rocker switches 182, 184.

As discussed above, in this preferred embodiment, the programmed vehicles are programmed to be at specific position along a path in the simulated universe 146 at specific times on the scenario clock. Further, when the scenario is running, the scenario clock can be either fixedly updated or variable updated. The scenario clock can be set to variably increment depending upon the distance between the student driving the observer vehicle and a rabbit vehicle 150, or set to variably increment depending upon the distance between the student driving the observer vehicle and a pre-programmed phantom vehicle as described previously in reference to FIGS. 5 and 6.

For example, when the computer 114 is programmed to run a scenario with the scenario clock in the phantom adjusting mode, the computer 114 increments the scenario clock so that, when the positions of the programmed vehicles are updated, the positions of programmed vehicles relative the student driven observer vehicle is substantially the same as the positions of the programmed vehicles relative to the phantom vehicle when the phantom vehicle was driven by the developer when developing the scenario. This allows the developer to develop a scenario which requires the driver to take evasive action to avoid collisions with the programmed vehicles by driving the phantom vehicle such that the phantom vehicle is in a position where it would be necessary to take evasive action to avoid colliding with the programmed vehicles. Hence, no matter how fast or slow the student drives the observer vehicle, the computer 114 in the phantom adjust mode updates the scenario clock so that the programmed vehicles are in the same relative position to the observer vehicle as they were relative the phantom vehicle when the simulation was programmed.

The functions called by the developer using the Traffic Control Menu 700 enable the developer to modify the phantom adjusting of the scenario clock so that, at particular intervals during the scenario, the computer 114 updates the scenario clock at the fixed default rate when the student driven observer vehicle is within a fixed radius of the position of the phantom vehicle. Without this function, the computer 114 only updates the scenario clock at the fixed default rate when the student is in substantially the exact same position in the simulated universe 146 as the phantom vehicle.

This permits the developer to develop a scenario where the student will be placed in situations where some type of traffic maneuver is required to avoid colliding with the programmed vehicles, however, the student will not be required to make the same traffic maneuver as the developer did in the phantom vehicle when developing the scenario. For example, the developer can develop a scenario wherein the student will have to merge into a stream of traffic while avoiding collisions with the programmed vehicles comprising the string of traffic. By increasing the radius or traffic control distance, the developer can program the computer 114 to continue to increment the scenario clock at the default fixed rate, and update the positions of the programmed vehicles comprising the string of traffic accordingly, when the student has not merged into traffic at the same position as the developer driving the phantom vehicle. This allows the student to merge into the string of traffic at a position different than the developer driving the phantom vehicle.

Referring now specifically to FIG. 20, the developer can replay the scenario under development by selecting the Replay Traffic Control line 704a. This also allows the developer to replay the scenario under development and, in this preferred embodiment, the computer 114 causes the video display 122 to also display the radius, i.e., the traffic control distance, that has been set for this particular interval. The developer can also replay the scenario from a time on the scenario clock other than the actual beginning of the scenario by entering the desired start time on the Scenario Start Time line 704e using the enter and select rocker switches 182 and 184 in the previously described manner. Further, the developer can also select between an overhead replay view and a driver's eye replay view when the scenario is being replayed by selecting the Replay View line 704f and selecting between the Driver's eye view or the Overhead view. If the developer selects the Driver's eye view, then, when the scenario is replayed, the computer 114 performs a loop substantially the same as the loop comprising states 226 through 248 described in reference to FIG. 4 above, thereby permitting the developer to drive through the simulated universe 146 in substantially the same fashion as a student would when the scenario was being run for training purposes.

The developer selects the traffic control distance for a particular time interval by first inputting the time on the scenario clock that the new traffic control distance is to take place via the Traffic Control Time line 704c and manipulating the select and enter rocker switches 182 and 184 in the previously described manner. The developer then selects the Traffic Control Distance line 704d and enters a radius value using the enter and select rocker switches 182 and 184 which, in this preferred embodiment, represents the maximum distance measured in feet between the phantom vehicle and the student-driven observer vehicle that the computer 114 will still increment the scenario clock at its default fixed rate.

Each time the developer enters a new traffic control distance and time on the scenario clock that it is to occur, the new traffic control distance is assigned an identifying number which is displayed on the Traffic Control Entry Number line 704b. The computer 114 preferably sequentially stores the traffic control information according to the time on the scenario clock they are programmed to occur. Hence, the developer can edit either the time or the traffic control distance for any of the traffic control entries by selecting the Traffic Control Entry Number line 704b, then inputting the desired traffic control entry number using the enter and select rocker switches 182 and 184 in the previously described manner. Once the desired traffic control entry number is entered on line 704b, the traffic control time and the traffic control distance for this entry is then displayed on lines 704c and 704d respectively. The developer can then change either or both of these entries, using the enter and select rocker switches 182 and 184, to the desired entries.

Finally, the developer can also delete all of the previously programmed traffic control distances and intervals by selecting the Delete Control Entries line 704g. If there are no programmed traffic control distances, the computer 114 assumes that the default traffic control distance is zero and adjustably updates the scenario clock accordingly. Hence, by using the Traffic Control Menu 700, the developer can develop a scenario wherein the student can deal with a given traffic condition in a manner different than the manner selected by the developer driving the phantom vehicle.

While the Traffic Control Menu 700 and the function available therefrom have been described in reference to a scenario with a phantom vehicle, whereby the scenario clock increments in the phantom adjusting mode, the traffic control functions can also be readily adaptable to a scenario wherein the scenario clock increments in the rabbit adjusting mode. Specifically, for a pursuit scenario where the scenario clock increments in the rabbit adjusting mode, the scenario clock increments at the fixed default rate when the student is at a default distance of the rabbit vehicle 150. Hence, by using the traffic control functions described above, the developer can also program the scenario clock to increment at the fixed default rate when the student is within a given radius of the default distance from the rabbit vehicle 150. A person skilled in the at can readily appreciate that the traffic control function of the present invention is readily adaptable to both the pursuit type scenario where the scenario clock is in the rabbit adjusting mode and scenarios where the scenario clock is in the phantom adjusting mode.

Figure 21:
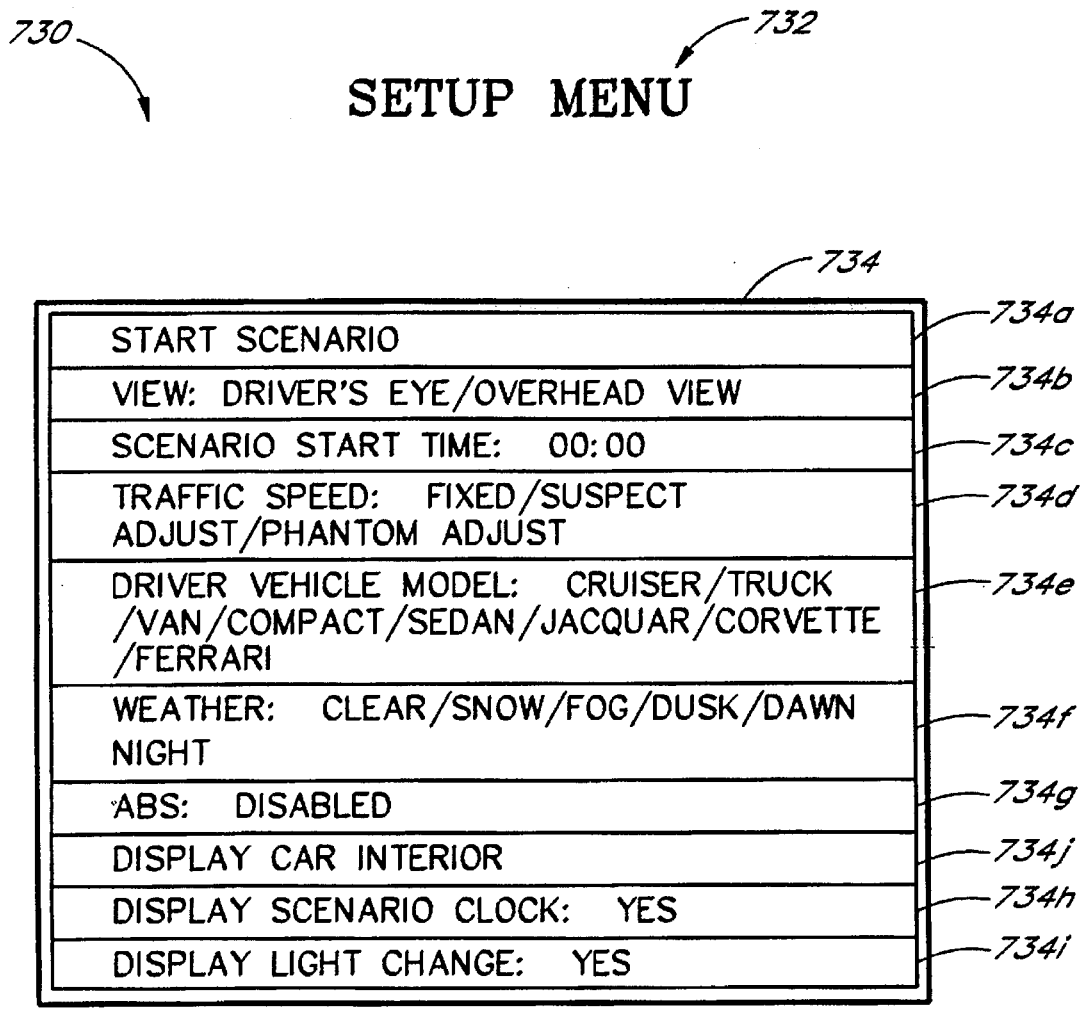
FIG. 21 is a diagram of a setup menu provided by the vehicle simulation system of the present invention, which allows the developer to review the scenario under development under different programmed parameters.

FIG. 21 illustrates a Setup menu 730 that appears on the video display 122 when the developer selects the Setup line 334a on the Developer Menu 320 (FIG. 7). The Setup menu 730 allows the developer to change various parameters about the scenario under development. The Setup Menu 730 includes an identifying header 732 and a box 734 containing a Start Scenario line 734a, a View line 734b, a Scenario Start Time line 734c, a Traffic Speed line 734d, a Driver Vehicle Model line 734e, a Weather line 734f, and ABS line 734g, a Display Scenario Clock line 734h, a Display Light Change line 734i and a Display Car Interior line 734j.

Using the Setup Menu 730, the developer can replay the developed scenario by selecting the Start Scenario line 734a. The developer can either view the scenario from the perspective of the student driving the observer vehicle in the simulated universe 146 or from an overhead point of view depending upon what the developer has selected on the View line 734b. If the developer has selected the Driver's eye view on the view line 734b, the computer 114 then proceeds to play the scenario from the start time specified by the developer on the Scenario Start Time line 734c and perform a loop similar to the loop comprising the states 226 through 248 (FIG. 4) thereby allowing the developer to drive through the simulated universe 146 in substantially the same fashion as the student. If the developer has selected the overhead view option, the computer 114 then proceeds to replay the scenario from the start time specified by the developer on the Scenario Start Time line 734c. Hence, the Start Scenario line 734a enables the developer to replay the entire scenario or any segment thereof, to determine if any editing or modifications are necessary.

The Traffic Speed line 734d enables the developer to select the mode of operation for the scenario clock. On the line 734d, the developer can select between Fixed incrementing of the scenario clock, Suspect Adjust i.e. Rabbit Adjust, incrementing of the scenario clock or Phantom Adjust incrementing of the scenario clock. As previously described in reference to FIG. 5, the positions of the programmed vehicles, including the rabbit or suspect vehicle 150, in the simulated universe. 146, at any given instant is dependent upon the time according to the scenario clock. Hence, if the scenario clock is adjustably incrementing at a rate faster than its fixed default rate, the programmed vehicles appear to be moving faster, and if the scenario clock is adjustably incrementing at a rate slower than its fixed default rate, the programmed vehicles appear to be moving slower.

The developer can also select the type of vehicle that the student will drive as the observer vehicle by selecting the Driver Vehicle Model line 734e. In one preferred embodiment of the present invention, once the developer selects the Driver Vehicle Model line 734e, the computer 114 performs a function entitled "show_vehicles" whereby a picture of each of the possible vehicle choices are shown on the video display 122. In this preferred embodiment of the present invention, the possible vehicles include a police cruiser, a truck, a van, a compact, a sedan, a jaguar, a corvette, and a ferrari. Preferably, the computer 114 is programmed so that the performance of the selected observer vehicle in the simulated universe 146 when the scenario is running approximates the performance of the corresponding vehicle in the real world.

The developer can also control the weather conditions in the simulated universe 146 by selecting the Weather line 734f. The possible weather conditions include clear skies, snow, fog, dusk, dawn and night. The default weather condition is clear skies. When one of the other weather conditions is selected, the computer 114 enables a function which adjusts the display on the video display 122 so that it corresponds to the selected weather condition. This function is described in greater detail in assignee's co-pending patent application entitled "Driver Training System with Performance Data Feedback", Ser. No. 07/898,375, filed May 2, 1992 and hereby incorporated by reference. When the scenario is run for a student, the computer 114 implements the function and causes the video display 122 to display the simulated universe 146 as it would be seen in the selected conditions. For example, if the conditions was selected by the developer on line 734f to be night, then the sky would appear dark and only the portions of the simulated universe 146 immediately adjacent a lamp post or within the beams of the observer vehicle's headlights would be illuminated.

The developer can also enable the ABS braking system 131 (FIG. 1) by selecting the ABS line 734g and enabling the system. The ABS brake system simulates the feel of a brake pedal of a automobile equipped with an anti-lock braking system. The operation of the ABS system 131 was described in greater detail in assignee's co-pending patent application entitled "Driving Simulator With Realistic Operating Feedback", Ser. No. 08/018,950 filed Feb. 17, 1993 which is hereby incorporated by reference. Finally, using the Setup Menu 730, the developer can also instruct the computer to either display the scenario clock on the video screen 122 when the scenario is being played for a student or not display the scenario clock by selecting the Display Scenario Clock line 734h. Further, the developer can also instruct the computer 114 to display changes in the stop lights 153 (FIG. 2) according to the developed stop light program, or the developer can disable the stop lights 153 so that they do not appear to change states by selecting the Display Light Change line 734i. Finally, the developer can also cause the video display 122 to display the interior view of the simulated vehicle, similar to the view seen by the student by selecting the Display Car Interior line 734j.

Hence, the Set Up Menu 730 allows the developer to fine tune the developed simulation by selecting various operating parameters for the simulation including the scenario clock adjust mode, the student's vehicle, the weather etc. Further, the developer can also replay the developed scenario via the Start Scenario line 734a to ascertain how the scenario or particular portions of the scenario appear with certain selected parameters.

IV. EXAMPLE SCENARIO DEVELOPMENT

FIG. 22 illustrates a portion of the simulated universe 146 as it would appear when viewed from overhead. As can be seen, this portion of the simulated universe 146 includes a network of roads 148, several houses 154, one out-building 156, a first programmed vehicle 150, and two additional programmed vehicles 850 and 860.

A developer would develop this particular scenario, which is one of many different possible scenarios that the developer can develop, in the following manner. The developer starts at the Developer Menu 320 (FIG. 7) and goes to the Program Menu 329 by selecting line 334b. Once in the Program Menu 329 (FIG. 8), the developer selects the location within the simulated universe 146 where the student driven observer vehicle will begin the scenario when it is played. The developer accomplishes this by selecting the Set Start Up Position line 340c of the Program Menu 329 causing the computer 114 to execute the "do_place_start" function 369 (FIG. 12) which places the developer at a selected point within the simulated universe 146. The developer then drives to a point 842 within the simulated universe 146 where he wants the observer vehicle to be when the simulation begins. Once the developer has driven to this position, the developer presses the enter rocker switch 182 (FIG. 3), thereby storing this location in memory. The computer 114 then returns the developer back to the Program Menu 329.

The developer may then add programmed vehicles to appear within the scenario he is developing. To add a first programmed vehicle which can be designated the rabbit vehicle 150 in FIG. 22, the developer selects the Add Vehicle line 340b of the Program Menu 329 (FIG. 8). Selecting this line causes the computer 114 to perform the "show_vehicle" function 404 (FIG. 9) where it generates on the video display 122 (FIG. 1) pictures of various types of vehicles from which the developer selects a vehicle type for the first programmed vehicle 150. The computer 114 then assigns the first programmed vehicle 150 an identification number 000–255. In the scenario shown in FIG. 22, the identification number assigned to the first programmed vehicle 150 is 001. The computer 114 then places the developer inside the simulated universe 146 and directs him to drive to a position 844 where he wishes the first programmed vehicle 150 to appear. When at the position 844, the developer presses the enter rocker switch 182 (FIG. 3), whereupon the computer 114 executes the "create_and_program" function 417 (FIG. 11) where it begins recording the path of the first programmed vehicle 150.

As shown in FIG. 22, in this scenario, the developer drives the first programmed vehicle 150 in the direction of the arrow 846. After the developer has finished driving the path of the vehicle 150 in the simulated universe 146, the developer again presses the enter rocker switch 182 to signal to the computer 114 to stop recording the path of the vehicle 150. The developer can then go to the Edit Menu 510 (FIG. 14) where the developer designates the programmed vehicle with the identification number of 001 to be the rabbit or pursued vehicle 150. Alternatively, the developer could choose to designate the first programmed vehicle 150 as a phantom vehicle, in which case, when the scenario was run for a student, the first programmed vehicle 150 would not be visible for the student and the scenario clock would increment in the phantom adjusting mode.

The developer may then wish to program a second programmed vehicle 850 to appear in the scenario shown in FIG. 22. To accomplish this, the developer returns to the Program Menu 329 (FIG. 8) and begins programming the second programmed vehicle 850 by again selecting the Add Vehicle line 340b of the Program Menu 329 (FIG. 8). The developer is again asked to select a vehicle type for this vehicle, and the computer 114 assigns the second programmed vehicle 850 an identification number, which, in this case, is 002. The computer 114 then performs the "to_mark_observe" function 410 (FIG. 9) where it displays the simulated universe 146 to the developer via the video display 122 (FIG. 1) and instructs and permits the developer to drive to a location where he can observe the scenario unfold. After the developer has driven the second programmed vehicle 850 to this location, he then presses the select rocker switch 184 (FIG. 3) whereupon the computer 114 executes the "replay_to_mark" function 412 (FIG. 9) where it replays the portion of the scenario from either the beginning of the scenario or the time selected by the developer via the Scenario Start Time line 340*a* of the Program Menu 329 (FIG. 8). In this case, the computer 114 replays the first programmed vehicle, designated to be the rabbit vehicle 150, driving in the direction of the arrow 846 down the street 148. The developer then presses the select rocker switch 184 to stop the scenario clock and thereby freeze the replay of the scenario, so that the first programmed vehicle 150 appears to the developer to be stationary in the simulated universe 146. The computer 114 then executes the "to_program_observe" function 416 (FIG. 10 and 11) where the developer is instructed to drive to a position 852 where the second programmed vehicle 850 will be introduced into the simulated universe 146.

After the developer has driven the second programmed vehicle 850 to the location 852, he presses the enter rocker switch 182 (FIG. 3) to initiate the recording of the path of the second programmed vehicle 850 in the memory of the computer 114 via the "create_and_program" function 417 (FIG. 9 and FIG. 11). In the function 417, the computer 114 restarts the frozen scenario and records the path of the second programmed vehicle 850 as it is driven by the developer in the direction of an arrow 854 to a location 856.

Since the developer can see when the first programmed vehicle 150 will pass on the street 148 in front of the location 852, the developer can initiate the recording of the path of the second vehicle 850 at the point where the first programmed or rabbit vehicle 150, drives in front of the location 852 on the street 148. Hence, the developer can time the second programmed vehicle 850 to drive out from behind the out-building 156 just after the first programmed vehicle 150 has passed. From the standpoint of a user 102 when the scenario is played, the user 102 in the observer vehicle is pursuing the rabbit vehicle 150 down the street 148 when the second programmed vehicle 850 appears out from behind the out-building 156, thereby requiring the user 102 to take evasive action to avoid colliding with the second programmed vehicle 850. Similarly, if the first programmed vehicle 150 is to be a phantom vehicle, the developer can pull out into the street 148 in front of the first programmed vehicle 150 and this will result in a scenario where the student driving the observer vehicle will have to take evasive action to avoid the second programmed vehicle 850 when the scenario is run. The developer can further refine the time at which the second programmed vehicle 850 appears by changing the start and end time on the scenario clock via the Path Time line 520*e* of the Edit menu 510 (FIG. 14).

The developer may wish to add additional programmed vehicles to the scenario via the Add Vehicle Line 342*d* of the Program Menu 329. In the scenario shown in FIG. 22, the developer has added a third programmed vehicle 860, which has been assigned the Path ID number of 003 by the computer 114, which appears in the simulated universe 146 at location 862 and drives in the direction of an arrow 864 to a location 866. Again, the developer drives the third programmed vehicle 860 in the manner he wishes it to appear in the simulated universe 146. Hence, the developer can program the third programmed vehicle 860 to appear in the simulation universe 146 at the appropriate time on the scenario clock to drive across the intersection 868 after the first programmed vehicle 150 and the second programmed vehicle 850 have driven through the intersection, but prior to when the user 102 (FIG. 1) in the observer vehicle drives through the intersection. The developer can also drive the third programmed vehicle 860 through this intersection at an extremely high rate of speed to thereby create an event where the user 102 will have to take evasive action to avoid being hit by the third programmed vehicle 860. The developer can also use the stopwatch of the Time Path line 342*e* of the Program Menu 329 (FIG. 8) to time how long it will take to drive the third programmed vehicle 860 from its initial location 862 to the intersection 868. This permits the developer to determine how long it takes to drive the third programmed vehicle 860 to the intersection 868 and to use this information to ensure that the third programmed vehicle 860 is timed to arrive in the intersection 868 at about the same time on the scenario clock as the observer vehicle.

In this fashion, the developer can continue to add vehicles to the simulated universe 146 and time them to appear to create additional traffic events and hazards for the user 102 (FIG. 1) in the observer vehicle. Further, the developer can use the Replay Path feature of the Replay Path line 520*d* of the Edit Menu. 510 (FIG. 14) to replay the paths, or selected portions thereof, of the programmed vehicles. The developer can also use the features of the Setup Menu 700 (FIG. 21) to view how the scenario will look in various weather conditions via the Weather line 734*f*, or with the scenario clock incrementing in different modes via the Traffic Speed line 734*d*.

Additionally, the developer can set the stop light 153 positioned in the intersection 886 to change states as the student driven observer vehicle approaches the intersection using the Traffic Lights Menu 570 (FIG. 16). Specifically, the developer selects the Program Traffic Lights line 582*a* and the computer 114 begins replaying the scenario from the scenario start time specified by the developer on the Scenario Start Time line 582*e*. The computer 114 either replays the scenario from the point of view of the driver driving through the simulated universe 146 or from an overhead point of view, depending upon what the developer has selected on the Replay View line 582*f* (FIG. 16).

If the developer has selected the driver's eye view, the computer 114 then replays the developed scenario from the scenario start time on the video display 122 (FIG. 1) as it would be seen by a student. The developer then drives through the simulated universe 146 in the same fashion that a student would. As the developer approaches the intersection 868, he manipulates the enter rocker switch 182 (FIG. 3) to stop the scenario clock and thereby freeze the programmed vehicles 860 and 850. The developer can then drive in the simulated universe 146 up to the intersection 868 to ascertain the relative positions of the programmed vehicles 850 and 860 to the intersection. The developer can then change the light state by manipulating the select switch 184 until the traffic light 153 is displaying the desired state.

For example, the developer may wish to program the traffic light 153 so that the light 153 appears green on its north-south face and red on its east-west face. The developer then manipulates the enter rocker switch 182 into the set position (FIG. 3) and the computer 114 records the state of the traffic light at this time on the scenario clock as being green on the north-south faces and red on the east-west faces. Hence, in this example, the traffic light 153 in the intersection 868 is red in the east-west direction when the programmed vehicle 860 goes through the intersection going from west to east. In this fashion, the developer can create a traffic situation where the student has to avoid being hit by the programmed vehicle 868 as it unexpectedly runs the stop light 153.

The developer can also program the traffic lights 153 when viewing the replay of the scenario from an overhead perspective as is shown in FIG. 22. The method of scheduling the light changes from this perspective is substantially the same as the method just described except that the developer does not have to drive through the simulated universe 146. The computer 114 generates an overhead display that is centered on either the rabbit vehicle 150 or a pre-programmed phantom vehicle.

The developer may also wish to record the student's driving performance as he maneuvers through the intersection 868 where the programmed vehicle 860 runs the stop light 153. In that case, the developer selects the Replay Window Menu 670 (FIG. 19), and creates a replay window to cover the time on the scenario clock when the student and the programmed vehicle 860 traverses the intersection. Subsequently, after the student has finished driving the scenario, the simulator 100 replays this portion of the scenario illustrating how the student drove through the intersection and dealt with the programmed vehicle 860 running the intersection.

If the developer has designated the first programmed vehicle 150 to be a phantom vehicle and has thereby set the scenario clock to increment in the phantom adjust mode, the developer may then wish to set a traffic control distance for the interval of time when the student will be driving through the intersection 868. The developer uses the Traffic Control Menu 700 (FIG. 20) to select the distance via the line 704d.

If the developer has programmed the third programmed vehicle 860 to enter the intersection 868 at the same time as the phantom vehicle 150, when the simulation is run, the third programmed vehicle 850 enters the intersection at the same time as the student-driven observer vehicle regardless of how fast or slow the student drove the vehicle due to the phantom adjusting of the scenario clock. However, if the developer set a traffic control distance sufficiently large to permit the phantom vehicle to proceed through the intersection ahead of the student driven observer vehicle as the student approaches the intersection so that the scenario clock still fixedly adjusts at the default rate, the student then has a choice as to how to proceed through the intersection.

Specifically, the student can either proceed into the intersection and attempt to avoid the third programmed vehicle 860 by swerving around it, or the student can stop and wait for the third programmed vehicle 860 to clear the intersection 868. If the traffic control distance was set to zero, once the student stopped, the third programmed vehicle 860 would slow down or stop so that once the student entered the intersection, the third programmed vehicle 860 would also enter the intersection. Hence, the Traffic Control Menu 700 allows the developer to program certain intervals of time on the scenario clock where the scenario clock will fixedly increment provided the student-driven observer vehicle is within a given radius of the phantom vehicle which thereby can provide greater flexibility for the student in driving the scenario.

V. SIMULATION SCENARIO DATA STRUCTURE

Figure 23A:
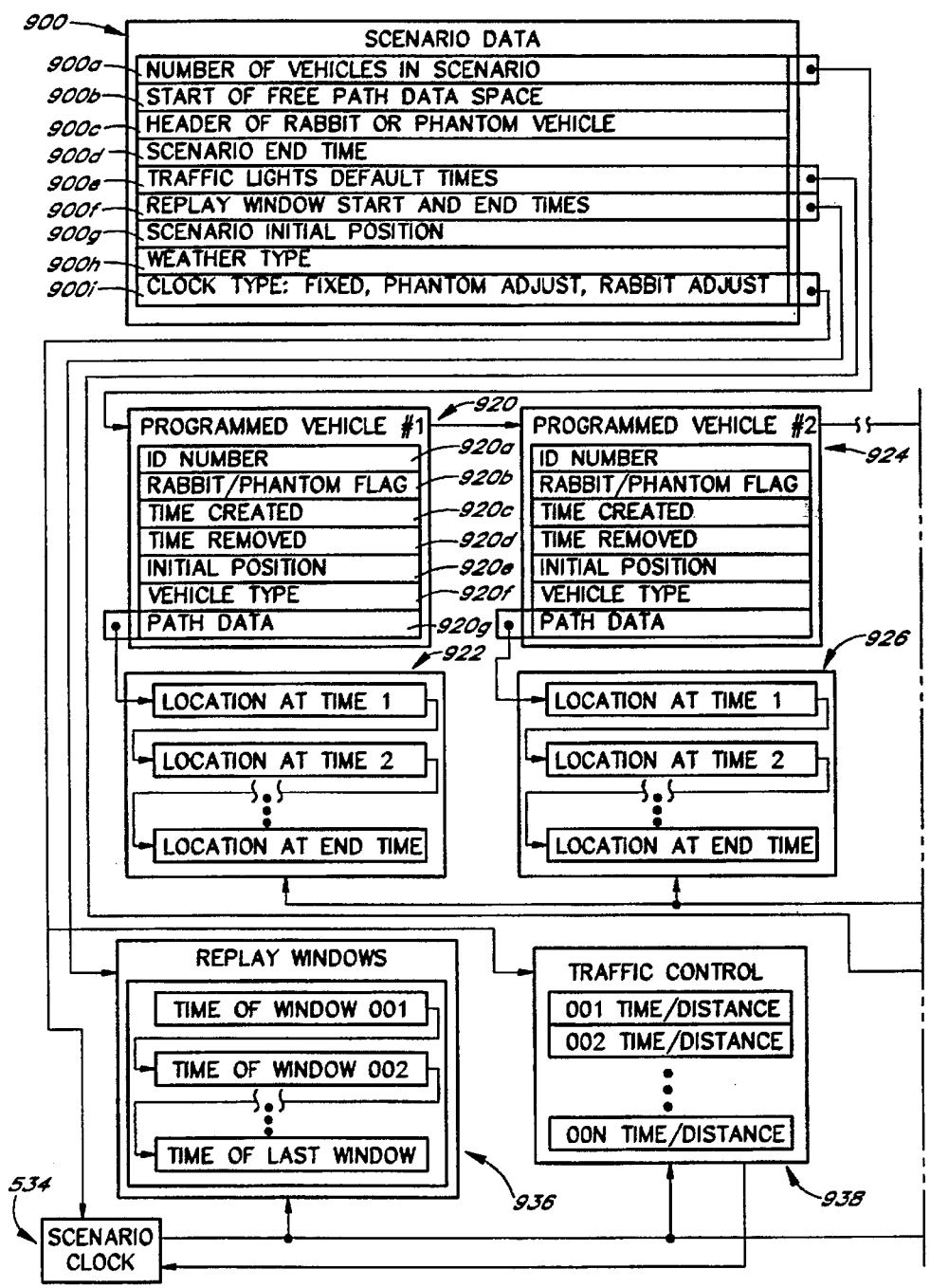
FIG. 23 is an organizational chart illustrating one presently preferred embodiment of the data structures employed to develop and use a simulation scenario via the vehicle simulation system of the present invention.
Figure 23B:
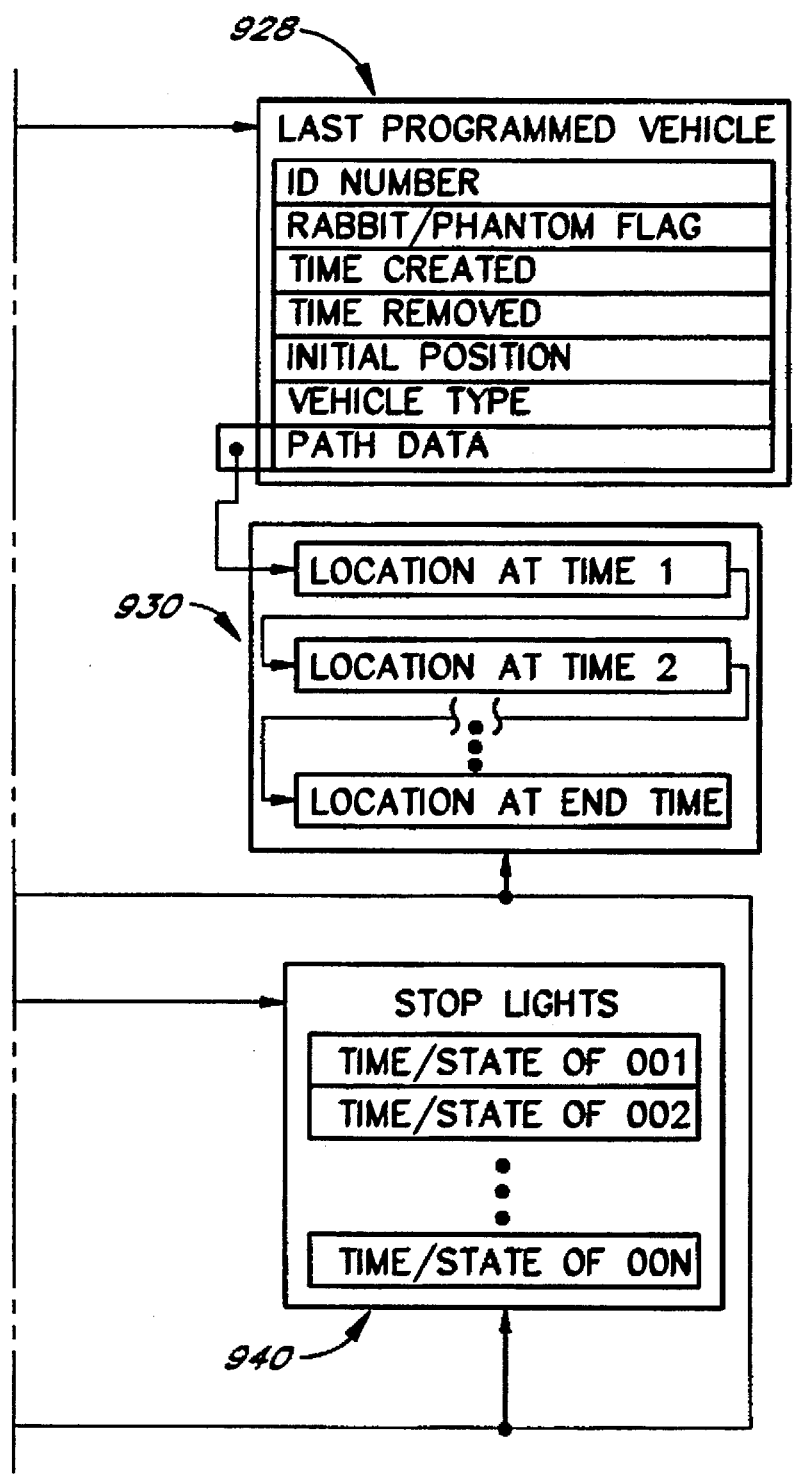

FIG. 23 is an organizational chart of one preferred embodiment of the scenario data relating to a simulation scenario developed in the above-described manner illustrating one possible manner of storing the data in the memory of the computer 114. A data structure 900 stores data about a single scenario. This data is initially programmed by the developer using the simulator input controls 104–112 and the computer 114 (FIG. 1). Preferably, this information is subsequently uploaded into the memory of the personal computer 103 where it is stored until the scenario is required by a user.

Data about the number of programmed vehicles in the scenario is stored in an area 900a. The number of programmed vehicles stored within the memory is determined by a counter keeping count of the number of vehicles added by the developer via the Add Vehicle line 340b of the Program menu 329 (FIG. 8). In the presently preferred embodiment, there is a limit of 256 vehicles that can be programmed into any one scenario. The area 900a also preferably contains an indicator as to the location of a series of Programmed Vehicle data structures 920 which contain information about each of the programmed vehicles in the memory.

Also stored within the data structure 900, in an area 900b, is an indicator of where the free path data exists. All the paths of the programmed vehicles through the simulated universe 146 (FIG. 19) are stored in the memory of the computer 114 in terms of a location in the simulated universe 146 at a given time on the scenario clock. In this preferred embodiment, at any one time on the scenario clock there can only be twenty programmed vehicles active in the simulated universe 146 at any one time. The information contained in area 900b provides information about the next scenario time which is available to have an additional programmed vehicle made active within the simulated universe 146.

An area 900c within the data structure 700 contains the programmed vehicle path identification number (000 to 255) of the programmed vehicle for a pursuit simulation which has been designated as either the pursued (or rabbit) vehicle 150 (FIG. 19) or the phantom vehicle by the developer. The developer designates one of the programmed vehicles as the rabbit vehicle 150 or the phantom vehicle.

An area 900d contains information about when, according to the scenario clock, the scenario is scheduled to end. A pursuit-type scenario is scheduled to end when the rabbit vehicle 150 is removed from the scenario. A driver training scenario is scheduled to end either when the phantom vehicle is removed from the scenario, or the last programmed vehicle is removed from the scenario. Preferably, once the scenario has ended, the computer 114 displays an appropriate message on the video display 122 indicating that the scenario is completed. Subsequently, any replay windows of the completed scenario are shown to the student on the video display 122.

An area 900e contains information about the traffic light default times. The traffic lights default times are the times listed on the Green Light Default Time line 582h and the Yellow Light Default Time Line 582i in Traffic Lights Menu 570 (FIG. 16). The computer 114 retrieves this information when the scenario is being played and changes the state of the traffic lights 153 based on these default light times unless the developer has programmed a new schedule for light changes using the do_program_lites function described previously in reference to FIG. 17 and 17a. The area 900e also contains an indicator indicating the position of a data-structure 940 which contains the time and state of each light change programmed by the developer using the "do_program_lites" function 590 (FIG. 17). As the scenario clock 934 increments, the computer 114 changes the state of the traffic lights 153 to their new states at each of time periods specified by the developer.

An area 900f in the scenario data structure 900 contains information about the start and end times for any replay windows specified by the developer using the Replay Window function described in reference to the Replay Window Menu 670 (FIG. 19). The area 900f also preferably contains an indicator as to the location of a Replay Windows Data Structure 936 in the memory of the computer 114. The Replay Windows Data Structure 936 contains the time period, according to the scenario clock, that the computer 114 records the scenario and the path of the observer vehicle driven by the student for each of the replay windows specified by the developer.

An area 900f in the scenario data structure 900 contains the Cartesian coordinates of the initial position of the student driven observer vehicle and also the initial unit vectors, i.e., the direction it is initially facing. The initial position and the initial unit vectors are programmed by the developer via the Set Start Up Position line 340b of the Program Menu 329 (FIG. 8). The information stored in area 900f is used by the computer 114 to correctly place and orient the observer vehicle containing the student in the simulated universe 146 at the start of play of the scenario.

The computer 114 stores the information about the programmed vehicles in a series of similar data structures 920, 924, 928. These data structures are preferably further stored in the memory of the computer 114 in terms of when the programmed vehicle is programmed to appear on the scenario in the simulated universe 146 according to the scenario clock.

The data structure 920 contains all the defining attributes of the first programmed vehicle, as well as a pointer to the location of the path data for this particular vehicle within the memory of the computer 114. The identification or Path ID number assigned to the first programmed vehicle is stored in area 920a of the data structure 920. This number is used by the computer 114 to retrieve information relating to the first programmed vehicle when the computer 114 is displaying this vehicle on the video display 122 (FIG. 1). A rabbit/ phantom vehicle flag, or indicator, is stored in area 720b of the data structure 720. This indicator specifies whether the first programmed vehicle is either the rabbit vehicle 150 (FIG. 19) or the phantom vehicle if the developer has so defined the first programmed vehicle. An area 920c indicates when, on the scenario clock, the first programmed vehicle is scheduled to be introduced into the simulated universe 146. An area 920d indicates when, on the scenario clock, the first programmed vehicle is scheduled to be taken out of the simulated universe 146. The data contained on the lines 920c and 920d is used by the computer 114 to determine when to display and remove the first programmed vehicle from the simulated universe 146 (see FIG. 4). The data structure 920 also contains data in a location 920e which indicates the initial position of the first programmed vehicle in the simulated universe 146. The data structure 920 further contains an area 920f which contains data which defines the type of vehicle the first programmed vehicle has been selected to be by the developer. This data is used by the computer 114 to generate a display of the first programmed vehicle within the simulated universe 146 via the video display 122 (FIG. 1). The data structure 920 further contains an area 920g which is a pointer to the location within the memory of the computer 114 of a data structure 922 containing the path data for the first programmed vehicle.

The path data for the first programmed vehicle contained in data structure 922 is arranged so that the data structure 922 contains the location of the first programmed vehicle within the simulated universe 146 (FIG. 19) at sequential intervals of time on the scenario clock. When the first programmed vehicle is recorded by the computer 114 via the Add Vehicle line 640a of the Program Menu 329 (FIG. 8), the data structure 922 simultaneously receives the Cartesian coordinates of the first programmed vehicle from the model process 118 (FIG. 1), as well as the time according to the scenario clock 934. When the first programmed vehicle is displayed by the computer 114 via the video display 122 (FIG. 1), the time on the scenario clock 934 tells the computer 114 the location where the first programmed vehicle should be displayed.

FIG. 23 further illustrates that there are similar data structures for each of the programmed vehicles and their paths through the simulated universe 146 in the memory of the computer 114 for this scenario. A data structure 924 contains the attributes of the second programmed vehicle scheduled to appear in the simulated universe 146, according to the scenario timer, with a pointer to a data structure 926 within the memory of the computer 114 which contains the path data for the second programmed vehicle. Additionally, a data structure 928 contains the attributes of the last programmed vehicle scheduled to appear in the simulated universe 146, according to the scenario clock 934, with a pointer to a data structure 930 in the memory of the computer 114 containing the path data for the last programmed vehicle.

Further, FIG. 23 also illustrates that the Replay Windows data structure 936 contains information about each of the replay windows 001–00N, as programmed by the developer sequentially stored in terms of when, on the scenario clock, the computer 114 is to record the path taken by the student. When the scenario, is running, the computer 114 sequentially records each window of time on the scenario clock as specified by the data structure 936. Similarly, the memory of the computer 114 is also logically organized to include a Traffic Control data structure 938 which also contains each of the traffic control distances specified by the developer along with the time on the scenario clock that the traffic control distance is in effect. When the scenario is being run for a student, the computer 114 sequentially recalls each of the traffic control distances as their activation time occurs on the scenario clock and then uses this information to control the incrementing of the scenario clock 934.

While the foregoing discussion has described one possible manner of organizing the data for ready access by the computer 114 when the scenario is being replayed, a person skilled in the art can appreciate that any of a number of well known manners of organizing data can be used to implement the simulation system 100, including both the play and development processes 119, 121, of the present invention. Further, the foregoing description is simply an exemplary representation of the manner of organizing the data for this particular simulation system 100. Included in the Microfiche Appendix is source code entitled "svars.h" which more specifically defines the above described data structures for this preferred embodiment of the present invention.

VI. SUMMARY

The present invention includes a simulation system which includes a simplified process for developing scenarios for vehicle simulators. Specifically, this invention permits a developer to develop a simulation by sitting at the vehicle simulator controls and driving vehicles in the simulated universe according to user selectable parameters. This invention includes a adjustable scenario clock controlling the scheduling of occurances in the simulation. The clock is configured so that the developer can program an event to occur in the scenario designed to require the student user to respond, e.g., take evasive action, that will occur in the scenario when the scenario is replayed for the student at the appropriate time to force the student to respond, regardless of how fast the student proceeds through the simulation.

Although the above detailed description has shown, described and pointed out fundamental novel features of the invention as applied to the various embodiments discussed above, it will be understood that various omissions and substitutions and changes in the form and details of the device illustrated may be made by those skilled in the art, without departing form the spirit of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle simulation system for a user of a simulated vehicle comprising:

at plurality of user operated input devices for controlling the operation of the simulated vehicle in a simulated universe;

a central controller;

a storage medium connected to the controller containing information defining the simulated universe and a scenario;

a model process associated with the controller and responsive to signals indicative of user manipulation of the plurality of input devices, for determining position of the simulated vehicle in the simulated universe;

a scenario timer which provides timing signals to said central controller;

a video display, responsive to signals from the controller, for displaying a view of the simulated universe based in part on the position of the simulated vehicle as determined by the model process; and a scenario development process associated with the controller and responsive to signals from the model process and said scenario timer for developing and storing information in the storage medium defining the occurrence of an event in at least one location within the simulated universe as part of the scenario in response to a first user's operation of one of the plurality of input devices while controlling operation of a simulated vehicle in the simulated universe wherein said event is programmed to occur at a selected time on the scenario timer when said scenario is replayed on said video display to a second user.

2. The vehicle simulation system of claim 1, further comprising a scenario play process which replays the scenario on the video display while simultaneously allowing a second user to control the operation of the simulated vehicle in the simulated universe.

3. The vehicle simulation system of claim 2, wherein the scenario play process replays the scenario by periodically incrementing the scenario timer thereby causing said event to occur at said selected time on said scenario timer while said scenario is being replayed for said second user.

4. The vehicle simulation system of claim 3, wherein the scenario timer variably increments, when the scenario is being replayed by the scenario play process, depending upon the relative distance between the simulated vehicle controlled by the second user and a moving point defined by the first user.

5. The vehicle simulation system of claim 4, wherein said first user defines said moving point by directing said simulated vehicle along a path in said simulated universe thereby causing said path to be stored in said storage device in terms of the position in said simulated universe of the simulated vehicle at a given time on said scenario time.

6. The vehicle simulation system of claim 5, wherein the scenario play process fixedly increments said scenario timer at a fixed rate when said simulated vehicle controlled by said second user is within a pre-selected distance of said moving point.

7. The vehicle simulation system of claim 6, wherein said scenario development process records said pre-selected distances for a selected portion of the path of said moving point in response to said first user manipulating one of said plurality of input devices while directing the simulated vehicle on said portion of said path of said moving point.

8. The vehicle simulation system of claim 1, wherein said event is comprised of a stoplight, located at a first position within the simulated universe, changing from red to green.

9. The vehicle simulation system of claim 8, wherein said scenario development process enables the first user to program the stoplight to change states at a particular time on the scenario clock by directing the simulated vehicle to a position adjacent said first position and then manipulating at least one of said plurality of user operated input devices to change the state of the light and record the change as an event to occur in said scenario.

10. The vehicle simulation system of claim 9, wherein the scenario development process replays the scenario as previously recorded to the first user while the first user is recording an event to occur as part of the scenario.

11. The vehicle simulation system of claim 10, wherein said event comprises a programmed vehicle travelling along a pre-defined path in the simulated universe.

12. The vehicle simulation system of claim 11, wherein said scenario development process records the programmed vehicle travelling along the predefined path in the simulated vehicle in response to the first user manipulating one or more of the plurality of user inputs to direct the simulated vehicle along the predefined path.

13. The vehicle simulation system of claim 11, wherein said first user programs the path of said programmed vehicle using said scenario development process by directing the simulated vehicle along the path at the time on the scenario timer that said first user desires said programmed vehicle to travel along said within said scenario.

14. A vehicle simulation system comprising:

at least one user operated input device for controlling the operation of a simulated vehicle in a simulated universe;

a controller;

a storage medium operably engaged with the controller and containing information defining the simulated universe and a scenario;

a scenario clock;

a display, responsive to signals from the controller, for displaying a view of the simulated universe based in part on the position of the simulated vehicle in the simulated universe;

a scenario development process, associated with the controller, for developing and storing information in the storage medium defining a scenario in response to a first user manipulating the at least one input device, wherein the first user records in the storage medium a path of a phantom vehicle in the simulated universe as part of the scenario, in terms of a position in the simulated universe at a particular time on the scenario clock, by directing the simulated vehicle along the path; and a scenario replay process, associated with the controller, that replays the scenario for a second user while the second user simultaneously directs the simulated vehicle through the simulated universe, wherein the scenario replay process replays the scenario by variably updating the scenario clock based upon the relative positions within the simulated universe of the simulated vehicle controlled by the second user and the phantom vehicle.

15. The vehicle simulation system of claim 14, wherein the scenario development process records in the storage medium, as part of the scenario, a programmed vehicle travelling along a path in the simulated universe in response to the first user directing the simulated vehicle along said path of said programmed while.

16. The vehicle simulation system of claim 15, wherein the path of the programmed vehicle is recorded in the storage medium in terms of the position in the simulated universe of the vehicle at a particular time on the scenario clock.

17. The vehicle simulation system of claim 14, wherein the scenario development process records in the storage medium, as part of the scenario, a plurality of programmed vehicles travelling along a plurality of different paths in response to the first user repeatedly directing the simulated vehicle along the plurality of paths using the at least one user operated input device.

18. The vehicle simulation system of claim 17, wherein the scenario development process replays the scenario, as previously recorded in the storage medium, on the display to the first user while the first user simultaneously directs the simulated vehicle along one of the plurality of paths to define the path of one of the plurality of programmed vehicles.

19. The vehicle simulation system of claim 18, wherein the phantom vehicle is visible to the first user on the display when the scenario is replayed for the first user and wherein the phantom vehicle is invisible to the second user on the display when the scenario is replayed for the second user.

20. The vehicle simulation system of claim 14, wherein the scenario development process records in the storage medium, as part of the scenario, a traffic control interval in response to the first user manipulating the at least one user operated input device to designate the traffic control interval for a period of time on the scenario clock wherein, during the traffic control interval, the scenario clock fixedly increases at a pre-selected rate when the scenario is replayed for said second user provided the simulated vehicle directed by said second user is within a pre-selected radius of the phantom vehicle.

21. The vehicle simulation system of claim 20, wherein the first user designates a traffic control interval, while directing the simulated vehicle to thereby record the phantom vehicle in the storage medium as part of the scenario, by manipulating the at least one user operated input device to identify a time period on the scenario clock comprising said traffic control interval wherein the scenario clock fixedly increases at a pre-selected rate when the scenario is replayed for the second user.

22. The vehicle simulation system of claim 21, wherein the first user designates the pre-selected radius for the traffic control interval by manipulating the at least one user operated device.

23. The vehicle simulation system of claim 14, wherein the simulated vehicle comprises a simulated automobile, the at least one user operated simulated input devices include a steering wheel, accelerator pedal, brake pedal and a plurality of input switches and the simulated universe includes a plurality of intersecting streets and at least one traffic light positioned at an intersection of two of the plurality of streets.

24. The vehicle simulation system of claim 22, wherein the development process programs the at least one traffic light to change states during the scenario in response to the first user directing the simulated vehicle to a position adjacent the position of the traffic light and then manipulating an input device to signal the controller to record the change state of the traffic light in the storage medium as part of the scenario.

25. A vehicle simulation system for a user of a simulated vehicle comprising:

a plurality of user operated input devices for controlling the operation of the simulated vehicle in a simulated universe having a plurality of streets, at least two of which intersect;

a central controller;

a memory engaged with the central controller which contains information defining the simulated universe and a scenario;

a video display, responsive to signals from the controller, for displaying a view of the simulated universe based at least in part on the position of the simulated vehicle in the simulated universe; and a scenario development process associated with the controller for developing and storing information in the storage medium defining the scenario, wherein the scenario development process records the changing of states of a traffic light located at an intersection of two of the streets in the simulated universe as part of the scenario and in response to the first user manipulating the plurality of input controls to direct the simulated vehicle to a location adjacent the traffic light.

26. The vehicle simulation system of claim 25, further comprising a scenario clock which provides timing signals to the central controller so that the scenario development process records the changing of the traffic light as occurring at a particular time on the scenario clock.

27. The vehicle simulation system of claim 26, further comprising a scenario play process which replays the scenario for a second user by incrementing the scenario clock.

28. The vehicle simulation system of claim 27, wherein the scenario development process records at least one programmed vehicle travelling through the simulated universe as part of the scenario in response to the first user directing the simulated vehicle along a path in the simulated universe using the plurality of user operated input devices.

29. The vehicle simulation system of claim 28, wherein the scenario development process records a phantom vehicle as part of the scenario in response to the first user directing the simulated vehicle along a path in the simulated universe.

30. The vehicle simulation system of claim 29, wherein the scenario clock variably increments based upon the relative positions in the simulated universe of the simulated vehicle controlled by the second user and the phantom vehicle.

31. The vehicle simulation system of claim 30, wherein the phantom vehicle is visible to the first user when the scenario is replayed for the first user but is invisible to the second user when the scenario is replayed for the second user.

32. A method for a vehicle simulation system having a central controller, simulated universe, input devices, storage medium and visual display, having the steps of:

displaying a simulated universe on the visual display to a first user;

the first user manipulating a plurality of input devices to direct a simulated vehicle to a particular location within the simulated universe;

manipulating at least one of the plurality of input devices to cause an event to occur within the simulated universe; and recording the event on a storage medium as part of a scenario to be replayed to a second user while the second user simultaneously controls a simulated vehicle in the simulated universe.

33. The method of claim 32, further comprising the steps of:

incrementing a scenario clock while said first user manipulates the plurality of input devices; and recording the event on the storage medium so as to occur at a particular time on the scenario clock.

34. The method of claim 33, wherein the event comprises a stoplight positioned at an intersection between two streets in the simulated universe changing from red to green.

35. The method of claim 33, further comprising the steps of:

directing the simulated vehicle along a path in the simulated universe while the scenario clock is incrementing; and recording the path of the simulated vehicle in the simulated universe on the storage medium in terms of the position of the vehicle in the simulated universe at a particular time on the scenario clock as a path of a programmed vehicle which is part of the scenario to be replayed to the second user.

36. The method of claim 35, further comprising the step of replaying the scenario in said vehicle simulation system for the second user.

37. The method of claim 36, wherein the step of replaying the scenario in said vehicle simulation system for the second user comprises:

displaying the simulated universe on the visual display to the second user; and incrementing the scenario clock to increment the display of the scenario for the second user while the second user simultaneously controls the simulated vehicle in the simulated universe.

38. The method of claim 37, further comprising the steps of:

the first user defining a phantom vehicle by directing the simulated vehicle along a path in the simulated universe;

recording the path of the phantom vehicle as part of the scenario; and variably incrementing the scenario clock when the scenario is being replayed for the second user based upon the relative positions of the simulated vehicle controlled by the second user and the phantom vehicle.

39. The method of claim 38, further comprising the step of the first user designating traffic control intervals wherein the scenario clock fixedly increments while the scenario is replayed for the second user provided that the simulated vehicle controlled by the second user is within a pre-selected distance of the phantom vehicle.

* * * * *

UNITED STATES PATENT AND TRADEMARK OFFICE
CERTIFICATE OF CORRECTION

PATENT NO. : 5,660,547

DATED : August 26, 1997

INVENTOR(S) : Norman S. Copperman

It is certified that error appears in the above-identified patent and that said Letters Patent is hereby corrected as shown below:

```
Column 51, line 25, please change "at plurality" to --a plurality--.

Column 52, line 11, please change "process fixedly" to --process will
      fixedly--.

Column 52, line 26, please change "change states at" to --change at
      a--.

Column 52, line 30, please change "the state of the light" to --the
      light--.

Column 52, line 37, please change "event comprises a programmed" to
      --event is comprised of the occurrence of a programmed--.

Column 52, line 42, please change "manipulating one or more of the
      plurality" to --manipulating the plurality--.

Column 52, line 49, please change "vehicle to travel along said" to
      --vehicle to occur--.

Column 53, line 20, please change "along said path of said programmed
      while" to --along the path--.

Column 53, line 60, please change "to identify a" to --to designate
      a--.

Column 53, line 60, please change "clock comprising said traffic
      control interval wherein" to --clock wherein--.

Column 54, line 20, please change "intersect;" to --intersect, wherein
      the simulated universe comprises a plurality of intersecting
      streets;--
```

UNITED STATES PATENT AND TRADEMARK OFFICE
CERTIFICATE OF CORRECTION

PATENT NO. : 5,660,547

DATED : August 26, 1997

INVENTOR(S) : Norman S. Copperman

It is certified that error appears in the above-identified patent and that said Letters Patent is hereby corrected as shown below:

Column 54, line 27, please change "based at least in part" to --based in part--.

Column 54, line 33, please change "changing of states of a traffic" to --changing of a traffic--.

Column 54, line 34, please change "intersection of two of" to --intersection between two--.

Column 54, line 36, please change "scenario and in" to --scenario in--.

Signed and Sealed this

Eighth Day of June, 1999

*Attest:*

Q. TODD DICKINSON

*Attesting Officer*　　　Acting Commissioner of Patents and Trademarks